(12) United States Patent
Yildiz et al.

(10) Patent No.: US 11,179,682 B2
(45) Date of Patent: Nov. 23, 2021

(54) SEGREGATION RESISTANT PEROVSKITE OXIDES WITH SURFACE MODIFICATION

(71) Applicant: MASSACHUSETTS INSTITUTE OF TECHNOLOGY, Cambridge, MA (US)

(72) Inventors: Bilge Yildiz, Cambridge, MA (US); Nikolai Tsvetkov, Cambridge, MA (US); Qiyang Lu, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 620 days.

(21) Appl. No.: 15/563,535

(22) PCT Filed: Mar. 30, 2016

(86) PCT No.: PCT/US2016/024893
§ 371 (c)(1),
(2) Date: Sep. 29, 2017

(87) PCT Pub. No.: WO2016/160917
PCT Pub. Date: Oct. 6, 2016

(65) Prior Publication Data
US 2018/0093229 A1    Apr. 5, 2018

Related U.S. Application Data

(60) Provisional application No. 62/140,009, filed on Mar. 30, 2015.

(51) Int. Cl.
*B01D 71/02* (2006.01)
*B01J 23/83* (2006.01)
(Continued)

(52) U.S. Cl.
CPC ............ *B01D 71/024* (2013.01); *B01J 23/83* (2013.01); *C25B 11/0773* (2021.01); *H01B 1/08* (2013.01);
(Continued)

(58) Field of Classification Search
CPC ................ B01J 2523/00; B01J 2523/24; B01J 2523/842; B01J 2523/845;
(Continued)

(56) References Cited

U.S. PATENT DOCUMENTS 5,519,235 A * 5/1996 Ramesh ................... H01L 28/75
257/295
6,146,445 A * 11/2000 Chen ..................... B01D 71/024
501/152
(Continued)

FOREIGN PATENT DOCUMENTS

WO    2014/038294 A1    3/2014

OTHER PUBLICATIONS

International Search Report dated Jun. 27, 2016, issued in International Application No. PCT/US2015/024893.
(Continued)

*Primary Examiner* — Anthony J Zimmer
*Assistant Examiner* — Syed T Iqbal
(74) *Attorney, Agent, or Firm* — Honigman LLP

(57) ABSTRACT

A method and a composition to stabilize the surface cation chemistry of the perovskite or related oxides, and thus, to minimize or completely avoid the detrimental segregation and phase separation of dopant cations at the surface can include modifying the surface with more oxidizable metal cations and/or more oxidizable metal oxides, thereby reducing the oxygen vacancy concentration at the very surface.

25 Claims, 53 Drawing Sheets

(51) Int. Cl.
*H01M 4/90* (2006.01)
*H01B 1/08* (2006.01)
*C25B 11/077* (2021.01)
*B01D 53/22* (2006.01)
*H01M 8/124* (2016.01)

(52) U.S. Cl.
CPC ....... *H01M 4/9025* (2013.01); *H01M 4/9033* (2013.01); *B01D 53/228* (2013.01); *B01J 2523/00* (2013.01); *B01J 2523/24* (2013.01); *B01J 2523/842* (2013.01); *B01J 2523/845* (2013.01); *C01P 2002/34* (2013.01); *H01M 2008/1293* (2013.01)

(58) Field of Classification Search
CPC . B01J 2523/3706; B01J 23/83; B01D 53/228; B01D 71/024; C01P 2002/34; C25B 11/0463; C25B 11/0773; H01B 1/08; H01M 2008/1293; H01M 4/9025; H01M 4/9033; Y02E 60/50
See application file for complete search history.

(56) References Cited

U.S. PATENT DOCUMENTS

| | | |
|---|---|---|
| 6,395,675 B1 | 5/2002 | Suga et al. |
| 7,795,170 B2 | 9/2010 | Tanaka et al. |
| 8,636,926 B2 | 1/2014 | Park et al. |
| 2014/0202527 A1* | 7/2014 | Jung .................. H01L 51/4226 136/255 |
| 2015/0217275 A1* | 8/2015 | Ito ..................... B01D 53/9413 502/303 |

OTHER PUBLICATIONS

Written Opinion of the International Searching Authority dated Jun. 27, 2016, issued in International Application No. PCT/US2015/024893.

Notification of Transmittal of The International Search Report and The Written Opinion of the International Searching Authority, or The Declaration dated Jun. 27, 2016, issued in International Application No. PCT/US2015/024893.

* cited by examiner

Measurement conditions:

1: 300 °C, 740 mTorr

2: 450 °C, 1e-6 Torr

3: 550 °C, 1e-6 Torr

4: 550 °C, 740 mTorr

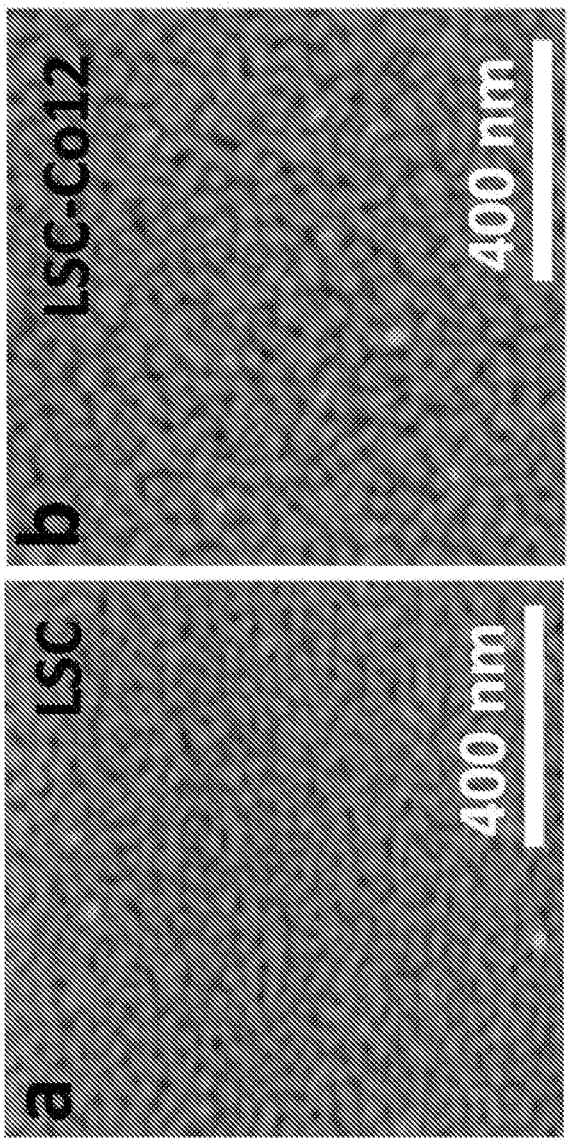
FIG. 20A / FIG. 20B
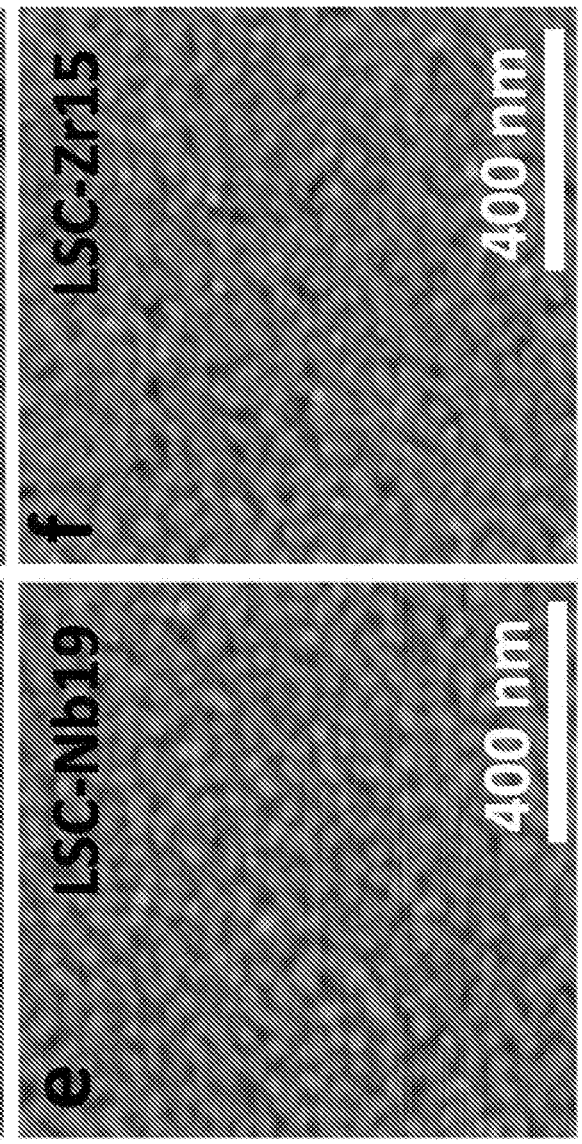
FIG. 20E / FIG. 20F

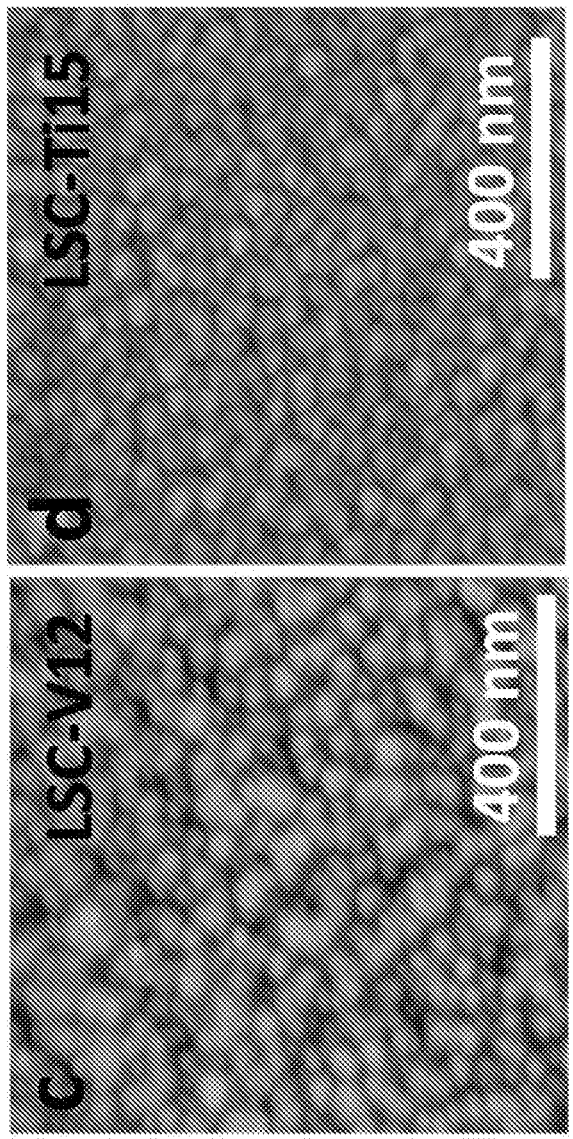
FIG. 20C
FIG. 20D
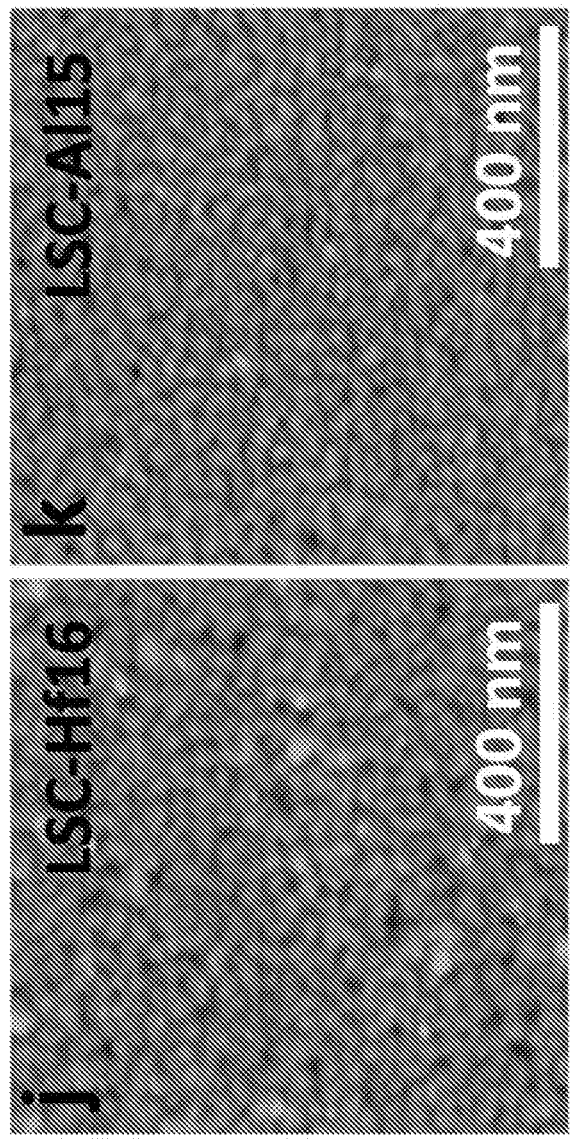
FIG. 20G
FIG. 20H

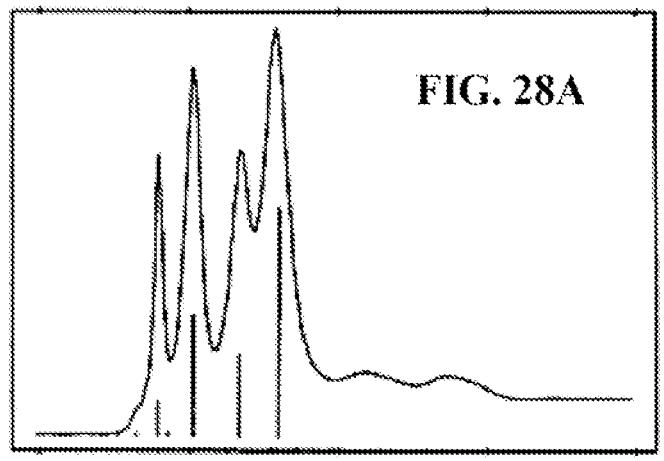
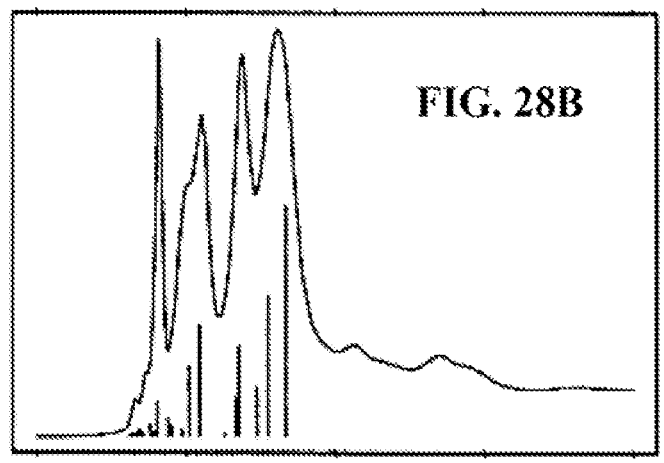
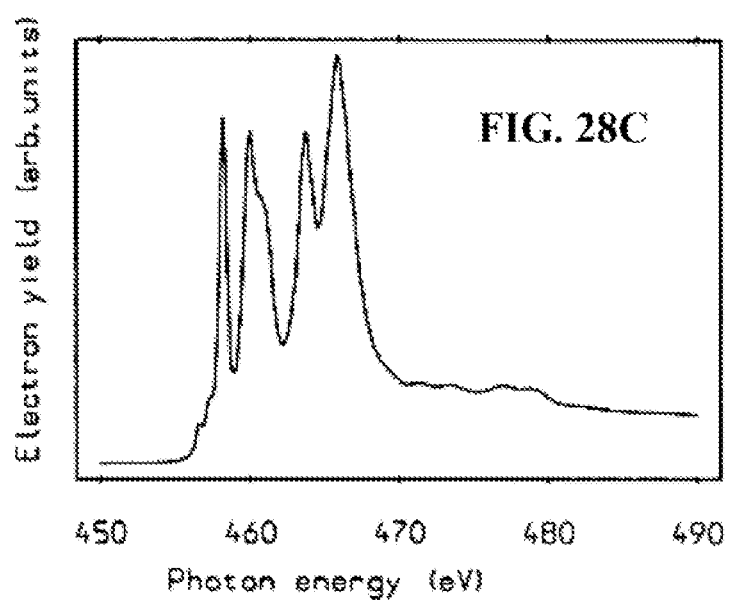

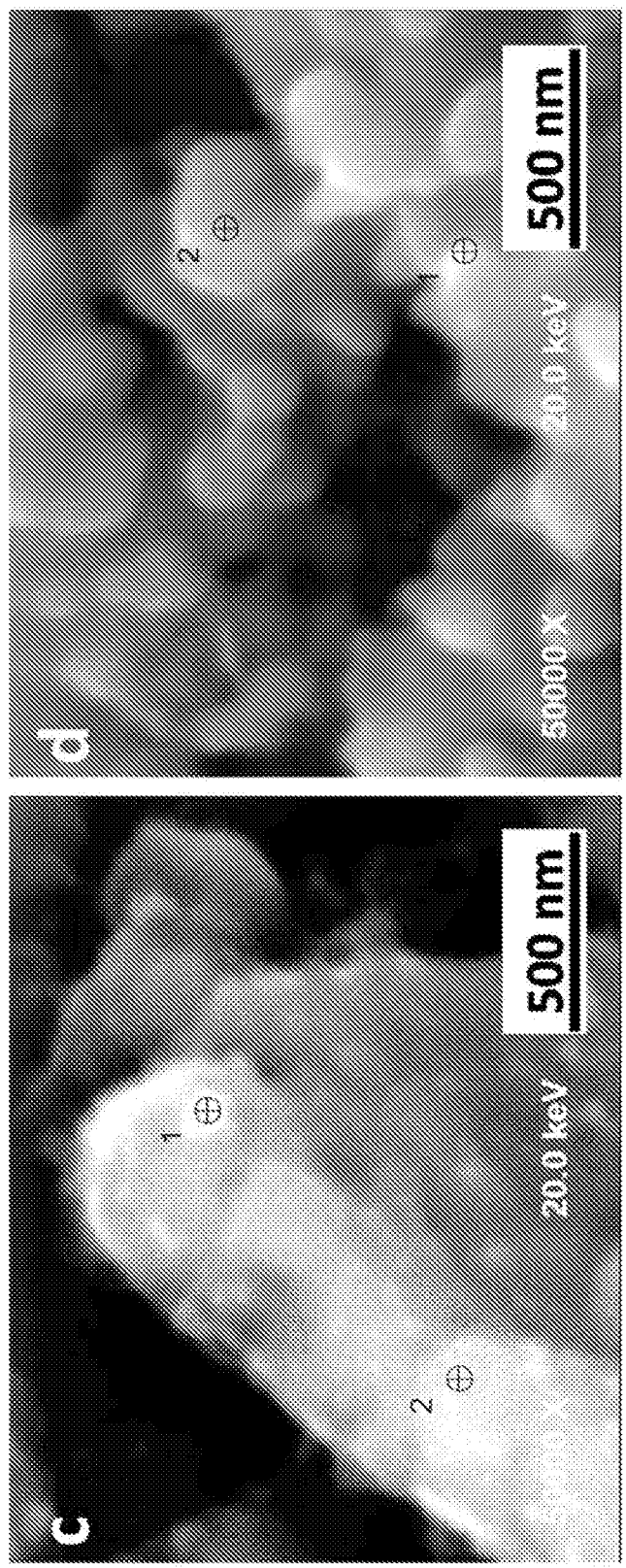

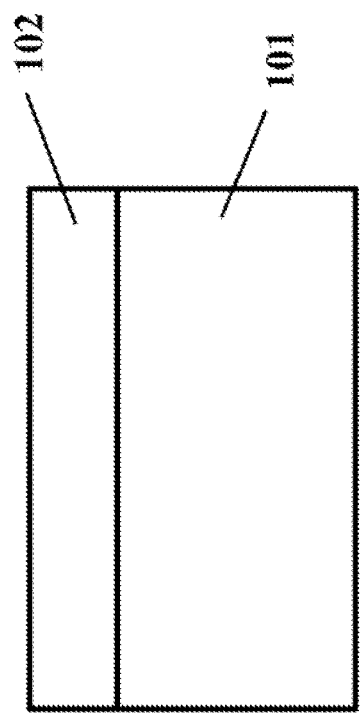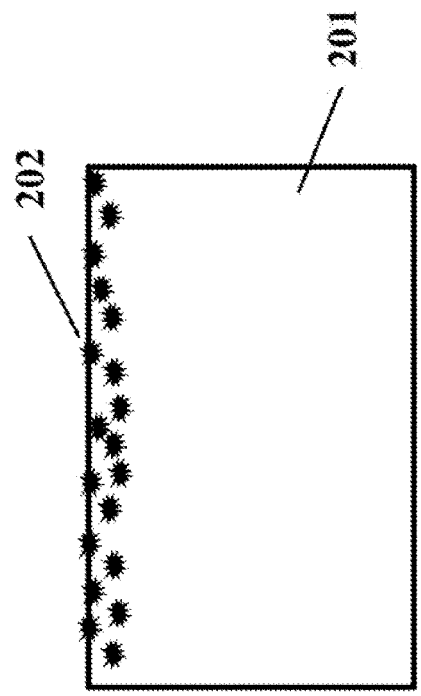
FIG. 33A
FIG. 33B

SEGREGATION RESISTANT PEROVSKITE OXIDES WITH SURFACE MODIFICATION

CLAIM OF PRIORITY

This application claims the benefit under 35 USC 371 to International Application No. PCT/US2016/024893, filed Mar. 30, 2016, which claims the benefit of prior U.S. Provisional Application No. 62/140,009, filed Mar. 30, 2015, each of which is incorporated by reference in its entirety.

STATEMENT REGARDING FEDERALLY SPONSORED RESEARCH OR DEVELOPMENT

This invention was made with Government support under Grant Nos. DMR1419807 and DMR1055583 awarded by the National Science Foundation and under Grant No. DE-SC0002633 awarded by the Department of Energy. The Government has certain rights in the invention.

TECHNICAL FIELD

This invention relates to functional oxides used in energy, chemical, electronic, computing and magnetic applications.

BACKGROUND

The chemical instability of the perovskite oxide surfaces due to cation segregation and phase precipitation limits the performance and durability in multiple applications, including solid oxide fuel and electrolysis cells (SOFC/SOEC), thermochemical and photo-assisted water splitting. See, Neagu, D., Tsekouras, G., Miller, D. N., Ménard, H. & Irvine, J. T. S. In situ growth of nanoparticles through control of non-stoichiometry. *Nat Chem* 5, 916-923, Lee, K. T. & Wachsman, E. D. Role of nanostructures on SOFC performance at reduced temperatures. *MRS Bulletin* 39, 783-791, Bork, A. H., Kubicek, M., Struzik, M. & Rupp, J. L. M. Perovskite $La_{0.6}Sr_{0.4}Cr_{1-x}Co_xO_{3-\delta}$ solid solutions for solar-thermochemical fuel production: strategies to lower the operation temperature. *Journal of Materials Chemistry A* 3, 15546-15557, and Hisatomi, T., Kubota, J. & Domen, K. Recent advances in semiconductors for photocatalytic and photoelectrochemical water splitting. *Chemical Society Reviews* 43, 7520-7535, each of which is incorporated by reference in its entirety.

Previous SOFC cathode materials, exemplified by $La_{0.6}Sr_{0.4}CoO_3$, $La_{0.6}Sr_{0.4}Co_{0.2}Fe_{0.8}O_3$(LSCF), and $Ba_{0.5}Sr_{0.5}Co_{0.8}Fe_{0.2}O_3$(BSCF) suffer from degradation of surface chemistry and oxygen reduction reaction (ORR) kinetics at elevated temperatures. See, Hayd, J., Yokokawa, H. & Ivers-Tiffée, E. Hetero-Interfaces at Nanoscaled (La, Sr)CoO$_{3-\delta}$ Thin-Film Cathodes Enhancing Oxygen Surface-Exchange Properties. *Journal of The Electrochemical Society* 160, F351-F359, Carter, S. et al. Oxygen transport in selected nonstoichiometric perovskite-structure oxides. *Solid State Ionics* 53, 597-605, Shao, Z. & Haile, S. M. A high-performance cathode for the next generation of solid-oxide fuel cells. *Nature* 431, 170-173, Cai, Z., Kubicek, M., Fleig, J. & Yildiz, B. Chemical Heterogeneities on $La_{0.6}Sr_{0.4}CoO_{3-\delta}$ Thin Films—Correlations to Cathode Surface Activity and Stability. *Chem. Mater.* 24, 1116-1127, Hjalmarsson, P., Søgaard, M. & Mogensen, M. Electrochemical performance and degradation of $(La_{0.6}Sr_{0.4})_{0.99}CoO_{3-\delta}$ as porous SOFC-cathode. *Solid State Ionics* 179, 1422-1426, Kubicek, M., Limbeck, A., Frömling, T., Hutter, H. & Fleig, J. Relationship between Cation Segregation and the Electrochemical Oxygen Reduction Kinetics of $La_{0.6}Sr_{0.4}CoO_{3-\delta}$ Thin Film Electrodes. *J. Electrochem. Soc.* 158, B727-B734, Lee, W., Han, J. W., Chen, Y., Cai, Z. & Yildiz, B. Cation Size Mismatch and Charge Interactions Drive Dopant Segregation at the Surfaces of Manganite Perovskites. *Journal of the American Chemical Society* 135, 7909-7925, Yi, J. & Schroeder, M. High temperature degradation of $Ba_{0.5}Sr_{0.5}Co_{0.8}Fe_{0.2}O_{3-\delta}$ membranes in atmospheres containing concentrated carbon dioxide. *Journal of Membrane Science* 378, 163-170, and Zhu, X. et al. Development of $La_{0.6}Sr_{0.4}Co_{0.2}Fe_{0.8}O_{3-\delta}$ cathode with an improved stability via $La_{0.8}Sr_{0.2}MnO_{3-\delta}$ film impregnation. *International Journal of Hydrogen Energy* 38, 5375-5382, each of which is incorporated by reference in its entirety. Segregation and phase separation of aliovalent dopants on perovskite oxide (ABO$_3$) surfaces is detrimental to the performance of energy conversion systems such as solid oxide fuel/electrolysis cells and catalysts for thermochemical H$_2$O and CO$_2$ splitting.

SUMMARY

In general, a composition can include a base layer including a material of formula (I), (II) or (III), wherein the formula (I), (II) and (III) are:

$$A_xA'_{1-x}B_yB'_{1-y}O_{3\pm\delta} \quad (I)$$

$$(A_xA'_{1-x})_2(B_yB'_{1-y})_2O_5 \quad (II)$$

$$(A_xA'_{1-x})_{n+1}(B_yB'_{1-y})_nO_{3n+1} \quad (III)$$

where each of A and A', independently, is a rare earth metal or an alkaline earth metal, x is in the range of 0 to 1, each of B and B', independently, is a transition metal, y is in the range of 0 to 1, $\delta$ is in the range of 0 to 1, and n is a number of the layers and a surface layer including a metal, a metal cation or an oxide of one or more metal elements, or a combination thereof.

Alternatively, a composition can include a layer including a material of formula (I), (II) or (III), wherein the formula (I), (II) and (III) are:

$$A_xA'_{1-x}B_yB'_{1-y}O_{3\pm\delta} \quad (I)$$

$$(A_xA'_{1-x})_2(B_yB'_{1-y})_2O_5 \quad (II)$$

$$(A_xA'_{1-x})_{n+1}(B_yB'_{1-y})_nO_{3n+1} \quad (III)$$

wherein each of A and A', independently, is a rare earth metal or an alkaline earth metal, x is in the range of 0 to 1, each of B and B', independently, is a transition metal, y is in the range of 0 to 1, $\delta$ is in the range of 0 to 1, and n is a number layers, where a surface of the layer includes a metal, a metal cation or an oxide of one or more metal elements, or a combination thereof.

In certain embodiments, the cation and the oxide of one or more metal element are more oxidizable, or more difficult to reduce, than the material of the formula (I, II, or III).

In certain embodiments, the material includes a perovskite oxide or a perovskite-related oxide. The material can be a brownmillerite or a Ruddlesden Popper.

In certain embodiments, the rare earth metal includes Sc, Y, La, Ce, Pr, Nd, Pm, Sm, Eu, Gd, Tb, Dy, Ho, Er, Tm, Yb or Lu.

In certain embodiments, wherein the alkaline earth metal includes Be, Mg, Ca, Sr, Ba or Ra.

In certain embodiments, the metal element includes Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Hg, Ce, or La or any combinations thereof.

In certain embodiments, the metal element includes Ti, Hf, Zr, Nb, Cr, Mn, Fe, Al, Mg, or any combinations thereof.

In certain embodiments, the oxide of a metal element includes a binary oxide of the metal element.

In certain embodiments, the oxide of a metal element includes $TiO_2$, $HfO_2$, $ZrO_2$, $Nb_2O_5$, $Cr_2O_3$, $MnO_2$, $FeO$, $Fe_2O_3$, $Al_2O_3$, $MgO$, or any combinations of thereof.

In certain embodiments, the composition has the formula $La_{0.8}Sr_{0.2}CoO_3$.

In certain embodiments, the metal element is Ti or Hf.

In certain embodiments, the oxide of a metal element is $TiO_2$ or $HfO_2$.

The composition can be included in various structures including, but not limited to, a solar cell, an electrode, a catalyst, an electrocatalyst, an oxygen permeation membrane, an electrical device including a resistive, memristive or magnetic structure.

A method of making such a structure can include forming a base layer including a material of formula (I)), (II) or (III), wherein the formula (I), (II) and (III) are:

$$A_xA'_{1-x}B_yB'_{1-y}O_{3\pm\delta} \quad (I)$$

$$(A_xA'_{1-x})_2(B_yB'_{1-y})_2O_5 \quad (II)$$

$$(A_xA'_{1-x})_{n+1}(B_yB'_{1-y})_nO_{3n+1} \quad (III)$$

where each of A and A', independently, is a rare earth metal or an alkaline earth metal, x is in the range of 0 to 1, each of B and B', independently, is a transition metal, y is in the range of 0 to 1, δ is in the range of 0 to 1, and n is a number of layers, and depositing a cation or an oxide of one or more metal element, or a combination thereof on a surface of the base layer.

Other aspects, embodiments, and features will be apparent from the following description, the drawings, and the claims.

BRIEF DESCRIPTION OF THE DRAWINGS

FIG. 13A shows the oxygen surface exchange coefficient, $k^q$, quantified from electrochemical impedance spectroscopy measurements over time at 530° C. in air, for the LSC and LSC-Me films. FIG. 13B shows atomic force microscopy images on the LSC, LSC-V12, LSC-Nb19, LSC-Ti15, LSC-Hf16, and LSC-Al15 films that were electrochemically tested as shown in FIG. 12A.

FIG. 14A shows $[Sr]_{Total}/([La]+[Sr])$, FIG. 14B shows $[Sr]_{Non-lattice}/([La]+[Sr])$, and FIG. 14C shows $[Sr]_{lattice}/[Co]$ ratios at the surface of the LSC thin films measured in situ at different temperature and oxygen partial pressures by ambient pressure X-ray photoelectron spectroscopy (APXPS). FIG. 14D shows Ex situ atomic force microscopy images of the LSC and LSC-Me films after the APXPS measurements in FIG. 14A.

FIG. 15A shows Co $L_{2,3}$-edge X-ray absorption spectra on LSC-Hf16 at different temperatures and oxygen partial pressures. FIG. 15B shows the Co $L_3$-edge peak positions at 300° C., 0.76 Torr for LSC, LSC-Ti3, LSC-Ti15, and LSC-Hf16 are shown by the solid symbols.

FIGS. 16A-16B show evolution of the valence band structure from X-ray photoelectron spectra measured in situ on LSC (FIG. 16A) and LSC-Hf16 (FIG. 16B). FIGS. 16C-16D show O K-edge spectra of LSC (FIG. 16C) and LSC-Hf16 (FIG. 16D) films at different temperatures and oxygen partial pressures.

FIGS. 20A-20H shows surface topography characterized by atomic force microscopy on the LSC (FIG. 20A), LSC-Co12 (FIG. 20B), LSC-V12 (FIG. 20C), and LSC-Ti15 (FIG. 20D), LSC-Nb14 (FIG. 20E), LSC-Zr15 (FIG. 20F), LSC-Hf16 (FIG. 20G), and LSC-Al15 (FIG. 20H) after the deposition of the metals from the chloride solutions as described in Table 2.

(FIG. 25A) and 450° C. (FIG. 25B) in ultra-high vacuum.

FIGS. 28A-28C show Ti $L_{2,3}$ XAS of $SrTiO_3$ (FIG. 28A), rutile $TiO_2$ (FIG. 28B), and anatase $TiO_2$ (FIG. 28C).

FIGS. 32A-32D show typical SEM micrograph of (a,b) fresh LSCF/LSCF-Hf particles (FIGS. 32A-32B) and LSCF (FIG. 32C) and LSCF-Hf (FIG. 32D) particles subjected to redox cycling at up to 1000° C.

FIG. 33A shows a schematic of a device including a binary layer of a base layer and a surface layer. FIG. 33B shows a schematic of a device including the deposited elements dissolved into the perovskite lattice at/near the surface.

DETAILED DESCRIPTION

Figure 1B:
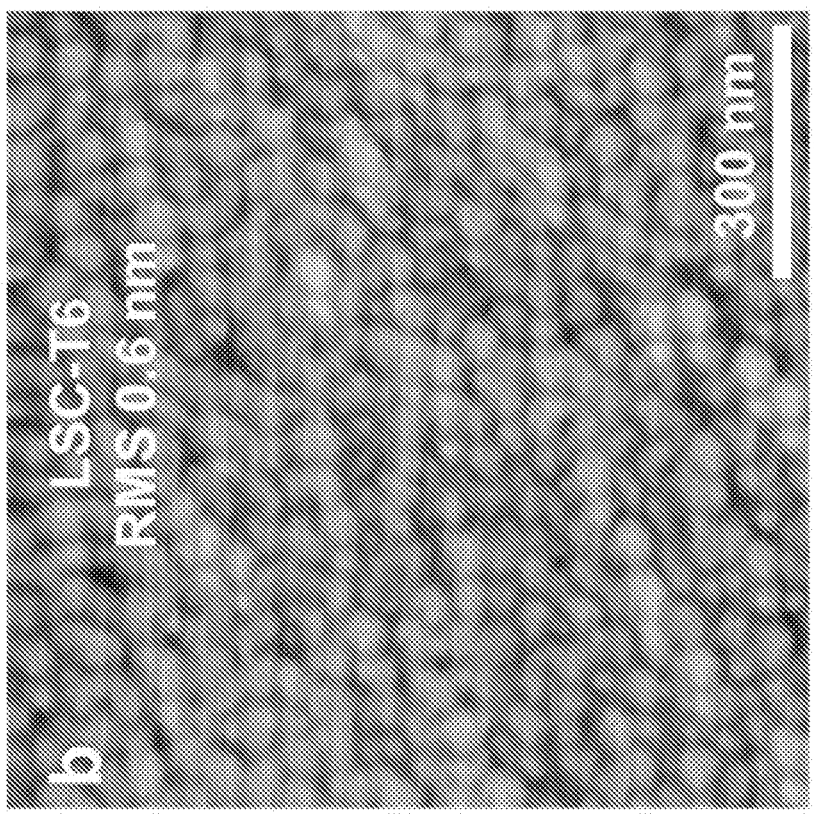
FIGS. 1A-1F show surface topography characterized by atomic force microscope on the LSC (FIG. 1A), LSC-T6 (FIG. 1B), LSC-T10 (FIG. 1C), and LSC-T13 (FIG. 1D). Secondary electron microscopy images of LSC-T10 (FIG. 1E) and LSC-T13 films (FIG. 1F).

The surface chemical composition of perovskite oxides is an important factor that determines the surface reaction kinetics and affects the performance in multiple applications, including solid oxide fuel and electrolysis cells (SOFC, SOEC), thermochemical splitting of $H_2O$ and CO2, oxygen permeation membranes, batteries, and magnetic and catalytic devices.

However, recent work in the area of SOFC/SOEC applications has shown that the surface of such perovskite oxides is not stable, and undergoes segregation and phase separation of dopant oxides, typically at temperatures above 400° C. See, Z. Cai, M. Kubicek, J. Fleig and B. Yildiz, Chemistry of Materials, 2012, 24, 1116-1127, M. Kubicek, Z. Cai, W. Ma, B. Yildiz, H. Hutter and J. Fleig, ACS Nano, 2013, 7, 3276-3286, and W. Lee, J. W. Han, Y. Chen, Z. Cai and B. Yildiz, Journal of the American Chemical Society, 2013, 135, 7909-7925, each of which is incorporated by reference in its entirety. Similar chemical degradation of perovskite oxide surfaces was observed also for other applications of these materials, such as in magnetism, superconductors or memristors. See, H. Dulli, E. W. Plummer, P. A. Dowben, J. Choi and S. H. Liou, Applied Physics Letters, 2000, 77, 570-572, H. Dulli, P. A. Dowben, S. H. Liou and E. W. Plummer, Phys. Rev. B, 2000, 62, R14629-R14632, J. Druce, H. Tellez, M. Burriel, M. D. Sharp, L. J. Fawcett, S. N. Cook, D. S. McPhail, T. Ishihara, H. H. Brongersma and J. A. Kilner, Energy & Environmental Science, 2014, 7, 3593-3599, H.-S. Lee, C.-S. Park and H.-H. Park, Applied Physics Letters, 2014, 104, and R. Waser and M. Aono, Nat Mater, 2007, 6, 833-840, each of which is incorporated by reference in its entirety. The consequence of such surface chemical degradation can be severely detrimental, because what forms at the surface is a layer that blocks charge transfer. For example on $La_{0.6}Sr_{0.4}CoO_3$ film cathodes for SOFCs, the polarization resistance of surface was found to increase by up to 2 orders of magnitude within 50 hours at 550° C., correlated with the segregation and separation of SrO-related insulating phases at the surface. See, M. Kubicek, A. Limbeck, T. Fromling, H. Hutter and J. Fleig, J. Electrochem. Soc., 2011, 158, B727-B734, H. Dulli, P. A. Dowben, S. H. Liou and E. W. Plummer, Phys. Rev. B, 2000, 62, R14629-R14632, S. Jiang, J. Solid State Electrochem., 2007, 11, 93-102, H. Jalili, J. W. Han, Y Kuru, Z. Cai and B. Yildiz, J. Phys. Chem. Lett., 2011, 2, 801-807, T. T. Fister, D. D. Fong, J. A. Eastman, P. M. Baldo, M. J. Highland, P. H. Fuoss, K. R. Balasubramaniam, J. C. Meador and P. A. Salvador, Appl. Phys. Lett., 2008, 93, 151904-151903, and K. Katsiev, B. Yildiz, K. Balasubramaniam and P. A. Salvador, Appl. Phys. Lett., 2009, 95, 092106-092103, each of which is incorporated by reference in its entirety.

This degradation is because of Sr segregation and separation of SrO-like insulating phases at the perovskite surface, sometimes in the form of complete coverage of the surface by SrO, blocking the electron transfer and oxygen exchange pathways and leaving a dopant-poor sub-surface region. See, Cai, Z., Kubicek, M., Fleig, J. & Yildiz, B. Chemical Heterogeneities on $La_{0.6}Sr_{0.4}CoO_{3-\delta}$ Thin Films-Correlations to Cathode Surface Activity and Stability. *Chem. Mater.* 24, 1116-1127, Lee, W., Han, J. W., Chen, Y., Cai, Z. & Yildiz, B. Cation Size Mismatch and Charge Interactions Drive Dopant Segregation at the Surfaces of Manganite Perovskites. *Journal of the American Chemical Society* 135, 7909-7925, Chen, Y. et al. Segregated Chemistry and Structure on (001) and (100) Surfaces of $(La_{1-x}Sr_x)_2CoO_4$ Override the Crystal Anisotropy in Oxygen Exchange Kinetics. *Chemistry of Materials* 27, 5436-5450, Druce, J. et al. Surface termination and subsurface restructuring of perovskite-based solid oxide electrode materials. *Energy & Environmental Science* 7, 3593-3599, Dulli, H., Dowben, P. A., Liou, S. H. & Plummer, E. W. Surface segregation and restructuring of colossal-magnetoresistant manganese perovskites $La_{0.65}Sr_{0.35}MnO_3$. *Phys. Rev. B* 62, R14629-R14632 (2000), Tellez, H., Druce, J., Kilner, J. A. & Ishihara, T. Relating surface chemistry and oxygen surface exchange in $LnBaCo_2O_{5+\delta}$ air electrodes. *Faraday Discussions* (2015), Druce, J. et al. Surface termination and subsurface restructuring of perovskite-based solid oxide electrode materials. *Energy & Environmental Science* 7 (2014), and Chen, Y. et al. Impact of Sr segregation on the electronic structure and oxygen reduction activity of $SrTi_{1-x}Fe_xO_3$ surfaces. *Energy Environ. Sci.* 5, 7979-7988 (2012, each of which is incorporated by reference in its entirety. The consequence is detrimental for electrochemical performance, by up to two orders of magnitude loss in ORR kinetics. See, Hjalmarsson, P., Søgaard, M. & Mogensen, M. Electrochemical performance and degradation of $(La_{0.6}Sr_{0.4})_{0.99}CoO_{3-\delta}$ as porous SOFC-cathode. *Solid State Ionics* 179, 1422-1426, and Kubicek, M., Limbeck, A., Fromling, T., Hutter, H. & Fleig, J. Relationship between Cation Segregation and the Electrochemical Oxygen Reduction Kinetics of $La_{0.6}Sr_{0.4}CoO_{3-\delta}$ Thin Film Electrodes. *J. Electrochem. Soc.* 158, B727-B734, each of which si incorporated by reference in its entirety.

Several recent studies have attempted to prevent the surface segregation and electrochemical degradation in SOFC cathodes. See, D. Lee, Y.-L. Lee, A. Grimaud, W. T. Hong, M. D. Biegalski, D. Morgan and Y. Shao-Horn, *The Journal of Physical Chemistry C*, 2014, 118, 14326-14334, X. Zhu, D. Ding, Y. Li, Z. Lü, W. Su and L. Zhen, *International Journal of Hydrogen Energy*, 2013, 38, 5375-5382, and C. A. F. Vaz, D. Prabhakaran, E. I. Altman and V. E. Henrich, *Physical Review B*, 2009, 80, 155457, each of which is incorporated by reference in its entirety. One of the proposed ways is the coating of $La_{0.8}Sr_{0.2}CoO_3$ or $La_{0.6}Sr_{0.4}Co_{0.2}Fe_{0.8}O_3$ electrodes with $La_{0.8}Sr_{0.2}MnO_3$. See, S. Estrade, J. Arbiol, F. Peiro, L. Abad, V. Laukhin, L. Balcells and B. Martinez, *Appl. Phys. Lett.,* 2007, 91, 252503-252503, and D. Lee, Y.-L. Lee, A. Grimaud, W. T. Hong, M. D. Biegalski, D. Morgan and Y. Shao-Horn, *The Journal of Physical Chemistry C*, 2014, 118, 14326-14334, each of which is incorporated by reference in its entirety. It was also shown that coating of the $La_{0.8}Sr_{0.2}CoO_3$ surface with a 1-3 nm thick $ZrO_2$ layer helps to stabilize the surface and improve electrochemical performance. See, D. Lee, Y.-L. Lee, A. Grimaud, W. T. Hong, M. D. Biegalski, D. Morgan and Y. Shao-Horn, *The Journal of Physical Chemistry C*, 2014, 118, 14326-14334, which is incorporated by reference in its entirety. However the exact mechanisms on how these surface modifications improve the cathode stability have not yet been made clear, making it difficult to go beyond these empirical observations.

The key driving forces behind the instability of perovskite oxide surfaces and dopant segregation at perovskite oxide surfaces are the elastic and electrostatic interactions of the dopant with the surrounding lattice, i.e. is the electrostatic attraction of the negatively charged A-site dopants ($Sr_{La}'$) by the positively charged oxygen vacancies ($V_O^{\cdot\cdot}$) enriched at the surface. See, W. Lee, J. W. Han, Y. Chen, Z. Cai and B. Yildiz, *Journal of the American Chemical Society,* 2013, 135, 7909-7925, which is incorporated by reference in its entirety. The size mismatch between the dopant and host cations and the associated elastic energy minimization push the larger or smaller dopants to free surfaces or interfaces. See, S. Estrade, J. Arbiol, F. Peiro, I. C. Infante, F. Sanchez, J. Fontcuberta, F. de la Pena, M. Walls and C. Colliex, *Appl. Phys. Lett.,* 2008, 93, 112505-112503, S. Estrade, J. M. Rebled, J. Arbiol, F. Peiro, I. C. Infante, G. Herranz, F. Sanchez, J. Fontcuberta, R. Cordoba, B. G. Mendis and A. L. Bleloch, *Appl. Phys. Lett.,* 2009, 95, 072507-072503, A. Lussier, J. Dvorak, S. Stadler, J. Holroyd, M. Liberati, E. Arenholz, S. B. Ogale, T. Wu, T. Venkatesan and Y. U. Idzerda, *Thin Solid Films,* 2008, 516, 880-884, and S. Estrade, J. Arbiol, F. Peiro, L. Abad, V. Laukhin, L. Balcells and B. Martinez, *Appl. Phys. Lett.,* 2007, 91, 252503-252503, each of which is incorporated by reference in its entirety. On the other hand, oxygen vacancies and the net positive charge at the surface of perovskite oxides[38] drive the negatively charged dopants in the form of point defects, such as $Sr_{La}'$, or $Ba_{La}'$, to the surface. See, W. C. Chueh and S. M. Haile, *Annual Review of Chemical and Biomolecular Engineering,* 2012, 3, 313-341, which is incorporated by reference in its entirety. The method and the composition disclosed herein are based on the understanding of these two key mechanisms that a lower concentration of oxygen vacancies can improve the surface stability and ORR kinetics and the secondary phase segregation can be hindered by choosing suitable dopants.

The method disclosed herein based on the idea that the decrease of the surface oxygen vacancy concentration can suppress the electrostatic driver to this detrimental process is contradictory to the well-established understanding that oxygen vacancies facilitate ORR and other reactions of small molecules on transition metal oxides shown in Kuklj a, M. M., Kotomin, E. A., Merkle, R., Mastrikov, Y. A. & Maier, J. Combined theoretical and experimental analysis of processes determining cathode performance in solid oxide fuel cells. *Physical Chemistry Chemical Physics* 15, 5443-5471 (2013), Bikondoa, O. et al. Direct visualization of defect-mediated dissociation of water on $TiO_2(110)$. *Nat Mater* 5, 189-192 (2006), Diebold, U. The surface science of titanium dioxide. Surface Science Reports 48, 53-229, and Schaub, R. et al. Oxygen Vacancies as Active Sites for Water Dissociation on Rutile $TiO_2$. *Physical Review Letters* 87, 266104 (2001), each of which is incorporated by reference in its entirety. However, significant degradation of the ORR kinetics because of dopant segregation and phase separation is also associated with surface oxygen vacancies. See, Lee, W., Han, J. W., Chen, Y., Cai, Z. & Yildiz, B. Cation Size Mismatch and Charge Interactions Drive Dopant Segregation at the Surfaces of Manganite Perovskites. *Journal of the American Chemical Society* 135, 7909-7925 (2013), which is incorporated by reference in its entirety.

Disclosed herein is a method and a composition to reduce the surface $V_O^{\cdot\cdot}$ concentration significantly that improves the oxygen surface exchange kinetics and stability, albeit contrary to the well-established understanding that surface oxygen vacancies facilitate reactions with $O_2$ molecules. It was hypothesized that the perovskite oxide surface stability can be tuned as a function of the reducibility of the surface. Taking $La_{0.8}Sr_{0.2}CoO_3$ (LSC) as a model perovskite oxide system, its surface was systematically modified with additive cations, whose binary oxides have lower (V) or higher (Nb, Ti, Zr, Hf, and Al) enthalpy of oxygen vacancy formation compared to that of LSC. See, Ganduglia-Pirovano, M. V., Hofmann, A. & Sauer, J. Oxygen vacancies in transition metal and rare earth oxides: Current state of understanding and remaining challenges. *Surface Science Reports* 62, 219-270, Carrasco, J., Lopez, N. & Illas, F. First Principles Analysis of the Stability and Diffusion of Oxygen Vacancies in Metal Oxides. *Physical Review Letters* 93, 225502 (2004), Janotti, A. et al. Hybrid functional studies of the oxygen vacancy in TiO$_2$. *Physical Review B* 81, 085212 (2010), Kofstad, P. & Anderson, P. B. Gravimetric studies of the defect structure of α-Nb$_2$O$_5$. *Journal of Physics and Chemistry of Solids* 21, 280-286 (1961), Zheng, J. X., Ceder, G., Maxisch, T., Chim, W. K. & Choi, W. K. First-principles study of native point defects in hafnia and zirconia. *Physical Review B* 75, 104112 (2007), and Mizusaki, J., Mima, Y., Yamauchi, S., Fueki, K. & Tagawa, H. Nonstoichiometry of the perovskite-type oxides La$_{1-x}$Sr$_x$CoO$_{3-\delta}$. *Journal of Solid State Chemistry* 80, 102-111, (1989), each of which is incorporated by reference in its entirety. These additives were introduced to the LSC surface at sub-monolayer coverages by a simple method using metal chloride solutions. See, Moodenbaugh, a. et al. Hole-state density of La$_{1-x}$Sr$_x$CoO$_{3-\delta}$ (0~x~0.5) across the insulator/metal phase boundary. *Physical Review B* 61, 5666-5671 (2000), which is incorporated by reference in its entirety. See Examples and Table 2 for details. The results show that the more oxidizable cations, i.e. Hf, Ti, Zr, Nb or Al, improve the oxygen exchange kinetics and stability on LSC, while V and excess Co lead to stronger degradation. Ambient-pressure X-ray photoelectron spectroscopy (AP-XPS) and X-ray absorption spectroscopy (AP-XAS) (see, Feng, Z. A., El Gabaly, F., Ye, X., Shen, Z.-X. & Chueh, W. C. Fast vacancy-mediated oxygen ion incorporation across the ceria-gas electrochemical interface. *Nature Communications* 5 (2014), and Grass, M. E. et al. New ambient pressure photoemission endstation at Advanced Light Source beamline 9.3.2. *Review of Scientific Instruments* 81, 053106 (2010), each of which is incorporated by reference in its entirety) measurements up to 550° C. revealed that these oxidizable cations decrease the surface oxygen vacancy concentration, leading to a smaller electrostatic driving force for Sr segregation. Finally, the results revealed a "volcano" relation between the oxygen exchange kinetics and the oxygen vacancy formation enthalpy of the binary oxides of the additive cations. This volcano relation highlights the existence of an optimum surface oxygen vacancy concentration that balances the gain in oxygen exchange kinetics and the chemical stability loss.

A functional oxide for energy, chemical electronic, computing and magnetic applications can include a perovskite (ABO$_3$ unit formula) and related family of oxides, where the A-site is occupied by the rare-earth and alkaline earth elements, and the B-site is occupied by various transition metals, and O is for oxygen.

In certain embodiment, a perovskite oxide can have the formula (I):

$$A_xA'_{1-x}B_yB'_{1-y}O_{3\pm\delta} \qquad (I)$$

where each of A and A', independently, is a rare earth or alkaline earth metal, x is in the range of 0 to 1, each of B and B', independently, is a transition metal, y is in the range of 0 to 1, and δ is in the range of 0 to 1. δ can represent the average number of oxygen-site vacancies (i.e., −δ) or surpluses (i.e., +δ); in some cases, δ is in the range of 0 to 0.5, 0 to 0.25, 0 to 0.15, 0 to 0.1, or 0 to 0.05. For clarity, it is noted that in formula (I), B and B' do not represent the element boron, but instead are symbols that each independently represent a transition metal. In some cases, δ can be approximately zero, i.e., the number of oxygen-site vacancies or surpluses is effectively zero. The material can in some cases have the formula AB$_y$B'$_{1-y}$O$_3$ (i.e., when x is 1 and δ is 0); A$_x$A'$_{1-x}$BO$_3$ (i.e., when y is 1 and δ is 0); or ABO$_3$ (i.e., when x is 1, y is 1 and δ is 0).

Rare earth metals include Sc, Y, La, Ce, Pr, Nd, Pm, Sm, Eu, Gd, Tb, Dy, Ho, Er, Tm, Yb, and Lu. Alkaline earth metals include Be, Mg, Ca, Sr, Ba, and Ra. Transition metals include Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Pt, Au, Hg, Ce and La. Particularly useful rare earth metals can include La. Particularly useful alkaline earth metals can include Ca, Sr, and Ba. Particularly useful transition metals can include first-row transition metals, for example, Cr, Mn, Fe, Co, Ni, and Cu. Representative materials of formula (I) include SrTiO$_3$, La$_{1-x}$Sr$_x$CoO$_3$ (LSC), (Ba$_{1-x}$Sr$_x$)(Co$_{1-y}$Fe$_y$)O$_3$, (La$_{1-x}$Sr$_x$)(Co$_{1-y}$Fe$_y$)O$_3$ and Pr$_{1-x}$Ca$_x$MnO$_3$ (PCMO), LaCrO$_3$, LaMnO$_3$, LaFeO$_3$, LaCoO$_3$, LaNiO$_3$, LaNi$_{0.5}$Mn$_{0.5}$O$_3$, LaCu$_{0.5}$Mn$_{0.5}$O$_3$, La$_{0.5}$Ca$_{0.5}$MnO$_{3-\delta}$, La$_{0.5}$Ca$_{0.5}$FeO$_{3-\delta}$, La$_{0.75}$Ca$_{0.25}$FeO$_{3-\delta}$, La$_{0.5}$Ca$_{0.5}$CoO$_{3-\delta}$, LaMnO$_{3+6}$, and Ba$_{0.5}$Sr$_{0.5}$Co$_{0.8}$Fe$_{0.2}$O$_{3-\delta}$.

In certain embodiments, a brownmillerite can have the formula (II):

$$(A_xA'_{1-x})_2(B_yB'_{1-y})_2O_5 \qquad (II)$$

where each of A and A', independently, is a rare earth metal or an alkaline earth metal, x is in the range of 0 to 1, each of B and B', independently, is a transition metal, and y is in the range of 0 to 1.

In certain embodiments, a Ruddlesden Popper can have the formula (III):

$$(A_xA'_{1-x})_{n+1}(B_yB'_{1-y})_nO_{3n+1} \qquad (III)$$

where each of A and A', independently, is a rare earth metal or an alkaline earth metal, x is in the range of 0 to 1, each of B and B', independently, is a transition metal, y is in the range of 0 to 1, δ is in the range of 0 to 1, and n is a number of layers.

A method to stabilize the surface cation chemistry of the perovskite oxide, and thus, to minimize or completely avoid the detrimental segregation and phase separation of dopant cations (such as Sr, Ba, Ca) at the surface can include modifying a perovskite oxide surface with more oxidizable (i.e. less reducible, more difficult to reduce) metal cations or metal oxides than the perovskite oxide, thereby reduce the oxygen vacancy concentration at the very surface. In other words, metal cations or metal oxides that are less difficult to reduce compared to the perovskite oxide whose surface is being modified can be used to modify the surface of the perovskite oxide.

In certain embodiments, a composition including a perovskite oxide or a perovskite-related oxide can include a base layer and a surface layer (FIG. 33A). In certain embodiments, the surface layer can be added to the base layer. FIG. 33A shows a device 100 including a base layer 101 and a surface layer 102.

The base layer 101 can include a material, such as a perovskite oxide or related oxides, such as a brownmillerite or a Ruddlesden Popper. As used herein, the term "brownmillerite" is given its ordinary meaning in the art and refers to a material with the brownmillerite structure, of general formula of (A$_x$A'$_{1-x}$)$_2$(B$_y$B'$_{1-y}$)$_2$O$_5$, where each of A and A', independently, is a rare earth metal or an alkaline earth metal, x is in the range of 0 to 1, each of B and B', independently, is a transition metal, and y is in the range of 0 to 1, possessing a perovskite-related structure with a large number of oxygen vacancies. As used herein, the term "Ruddlesden Popper" is given its ordinary meaning in the art and refers to a material with a Ruddlesden Popper phase, of the general formula of is (A$_x$A'$_{1-x}$)$_{n+1}$(B$_y$B'$_{1-y}$)$_n$O$_{3n+1}$, where each of A and A', independently, is a rare earth metal or an alkaline earth metal, x is in the range of 0 to 1, each of B and B', independently, is a transition metal, y is in the range of 0 to 1, δ is in the range of 0 to 1, and n is a number of layers. In certain embodiments, n is a number of layers of octahedra in the perovskite-like stack.

The surface layer 102 can include a cation or an oxide of one or more metal element, or a combination thereof, where the metal cation and/or the metal oxide in the surface layer are more oxidizable than the perovskite oxide in the base layer. In this case, the surface layer stays in form of a binary oxide layer (such as $TiO_2$, $HfO_2$, $ZrO_2$, $Nb_2O_5$, $Cr_2O_3$, $MnO_2$, FeO, $Fe_2O_3$, $Al_2O_3$, MgO, etc.). In certain embodiment, the surface layer completely covers the surface of the base layer. In certain other embodiment, the surface layer partially covers the surface of the base layer.

In certain embodiments, a composition including a perovskite oxide can include a layer 201 including a perovskite oxide, wherein a surface of the layer includes a deposited element 202 including a cation or an oxide of one or more metal element, or a combination thereof (FIG. 33B). In this case, the deposited elements (such as Ti, Hf, Zr, Nb, Cr, Mn, Fe, Al, Mg, etc.) can dissolve into the perovskite lattice at/near the surface (FIG. 33B). FIG. 33B shows a device 200 including a layer 201 and the deposited elements 202 dissolved into the perovskite lattice at/near the surface.

In certain embodiments, the composition can be included in a device including, but not limited to, a solar cell, an electrode, a catalyst, an electrocatalyst, an oxygen permeation membrane, or an electrical device including a resistive, memristive, or magnetic element (FIGS. 33A and 33B). The magnetic element can be a flux element and can be included in ReRAM, CMOS devices or magnetic tunnel junctions. In certain embodiments, the composition can be included in computing applications of a perovskite.

The perovskite oxide can include but not limited to $SrTiO_3$, $La_{1-x}Sr_xCoO_3$ (LSC), $(Ba_{1-x}Sr_x)(Co_{1-y}Fe_y)O_3$, $(La_{1-x}Sr_x)(Co_{1-y}Fe_y)O_3$ and $Pr_{1-x}Ca_xMnO_3$ (PCMO). The surface layer can be can be modified by depositing metal elements, including Ti, Hf, Zr, Nb, Cr, Mn, Fe, Al and Mg.

By variation of the synthesis conditions, the perovskite oxide surface with optimal chemical cation compositions can be fabricated. This method is applicable to both a dense model perovskite oxide and a porous perovskite oxide. Specifically, the method is applicable to a dense model perovskite oxides in bulk or thin film form, and to porous layers, as well as micro- or nano-scale particles made of perovskite oxides.

A perovskite oxide can be chemically modified from a solution bath process (see Chinese Patent Application Publication No. CN 101346191 A, which is incorporated by reference in its entirety), or other deposition methods. The perovskite surface modification allows improving the stability of the surface chemistry, while functioning at temperatures above 300° C. The method can impact multiple applications of perovskite oxide materials, including solid oxide fuel and electrolysis cells (SOFC, SOEC), catalysts for thermochemical splitting of $H_2O$ and $CO_2$, oxygen permeation membranes and chemical looping, batteries, and magnetic, memory and catalytic devices.

EXAMPLES

Example 1. Ti-Modification of $La_{0.8}Sr_{0.2}CoO_3$ Surface

The degradation of the surface chemistry on perovskite ($ABO_3$) oxides is a critical issue for their performance in energy conversion systems such as solid oxide fuel/electrolysis cells and in splitting of $H_2O$ and $CO_2$ to produce fuels. This degradation is typically in the form of segregation and phase separation of dopant cations from the A-site, driven by elastic and electrostatic energy minimization and kinetic demixing. In this study, deposition of Ti at the surface was found to hinder the dopant segregation and the corresponding electrochemical degradation on a promising SOFC cathode material, $La_{0.8}Sr_{0.2}CoO_3$ (LSC). The surface of the LSC films was modified by Ti (denoted as LSC-T) deposited from a chemical bath of $TiCl_4$ solution. The LSC and LSC-T thin films were investigated by electrochemical impedance spectroscopy, nano-probe Auger electron spectroscopy, and x-ray photoelectron spectroscopy (XPS), upon annealing at 420-530° C. in air up to about 90 hours. The oxygen exchange coefficient, $k^q$, on LSC-T cathodes was found to be up to 8 times higher than that on LSC cathodes at 530° C. and retained its stability. Sr-rich insulating particles formed at the surface of the annealed LSC and LSC-T films, but with significantly less coverage of such particles on the LSC-T. From this result, it appears that modification of the LSC surface with Ti reduces the segregation of the blocking Sr-rich particles at the surface, and a larger area on LSC surface (with a higher Sr doping level in the lattice) is available for the oxygen reduction reaction. The stabilization of the LSC surface through Ti-deposition can open a new route for designing surface modifications on perovskite oxide electrodes for high temperature electro- and thermo-chemical applications.

Surface Morphology on the LSC Films with Chemical Bath Deposition of $TiO_2$

The effect of Ti treatment on the surface morphology of LSC films by imaging these surfaces with SEM and AFM. The XPS measurements at 45° emission angle on the LSC-T films treated with $TiCl_4$ for 5, 10, 20 and 30 sec have Ti content of 2%, 6%, 10% and 13%, respectively, quantified as Ti/(La+Sr+Co+Ti) in their as-prepared state. These samples are denoted as LSC-T2, LSC-T6, LSC-T10, and LSC-T13. Even though surface roughness is relatively small and consistent among the samples (FIGS. 1A-1F), it is comparable to the IMPF of the Ti photo-electrons measured in this work. Therefore, one can expect an underestimation of the actual Ti content compared to what it should be at the very top surface, especially for low takeoff angle measurements. Thus, for quantification of Ti, the XPS results are taken as "trends" and "lower bounds" rather than actual quantities.

Surface morphology of LSC-T2, T6 and T10 films is similar to that on LSC films treated only with HCl (FIGS. 1A-1C and 1E). The inset in FIG. 1F marked with solid lines shows the magnified image of the area marked with the dashed lines. As seen in the AFM images (FIGS. 1A-1C), these surfaces do not show any detectable Ti-induced morphological features. Thus, the Ti can be deposited in the form of either a thin and smooth wetting layer of Ti-oxide, or very small nanoparticles with sizes below the instrumental resolution of ~1 nm, or is dissolved into the surface lattice layer of the LSC film. This observation is also in line with the measured root mean square (RMS) roughness values which are almost the same for the LSC and the LSC-T2, LSC-T6 and LSC-T10 films. Further increase in Ti content up to 13% leads to an increase in the film RMS roughness. The increase of the film's roughness is also accompanied by the visible formation of the nanoparticles with diameter of 3-10 nm at the LSC-T13 surface. It is likely that the particles observed on LSC-T13 are $TiO_2$.

Surface Oxygen Exchange Kinetics Over Time

Figure 1A:
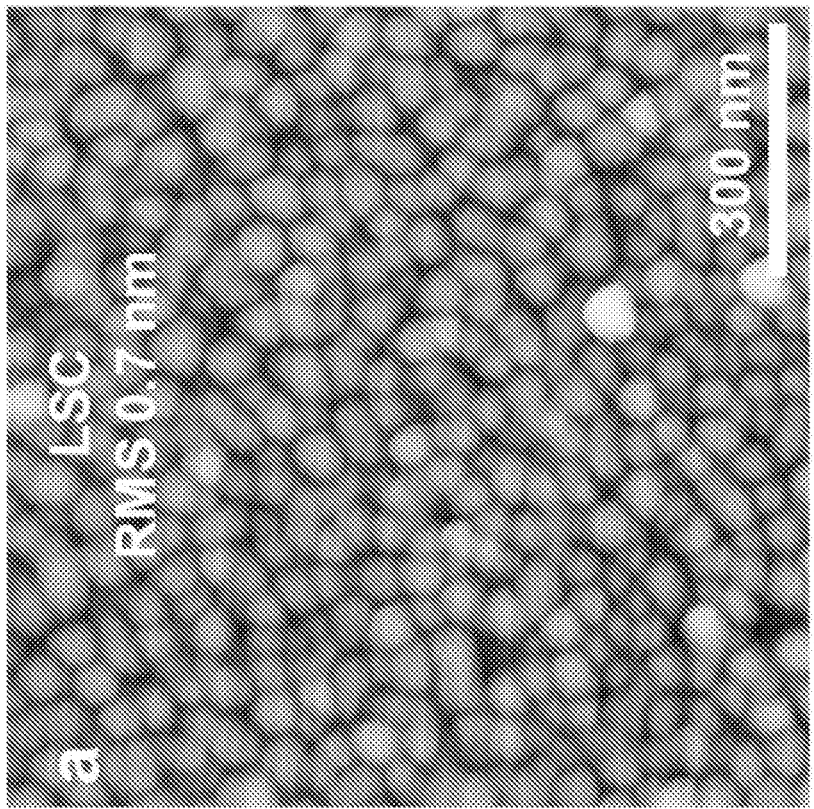
Figures 1C, 1D:
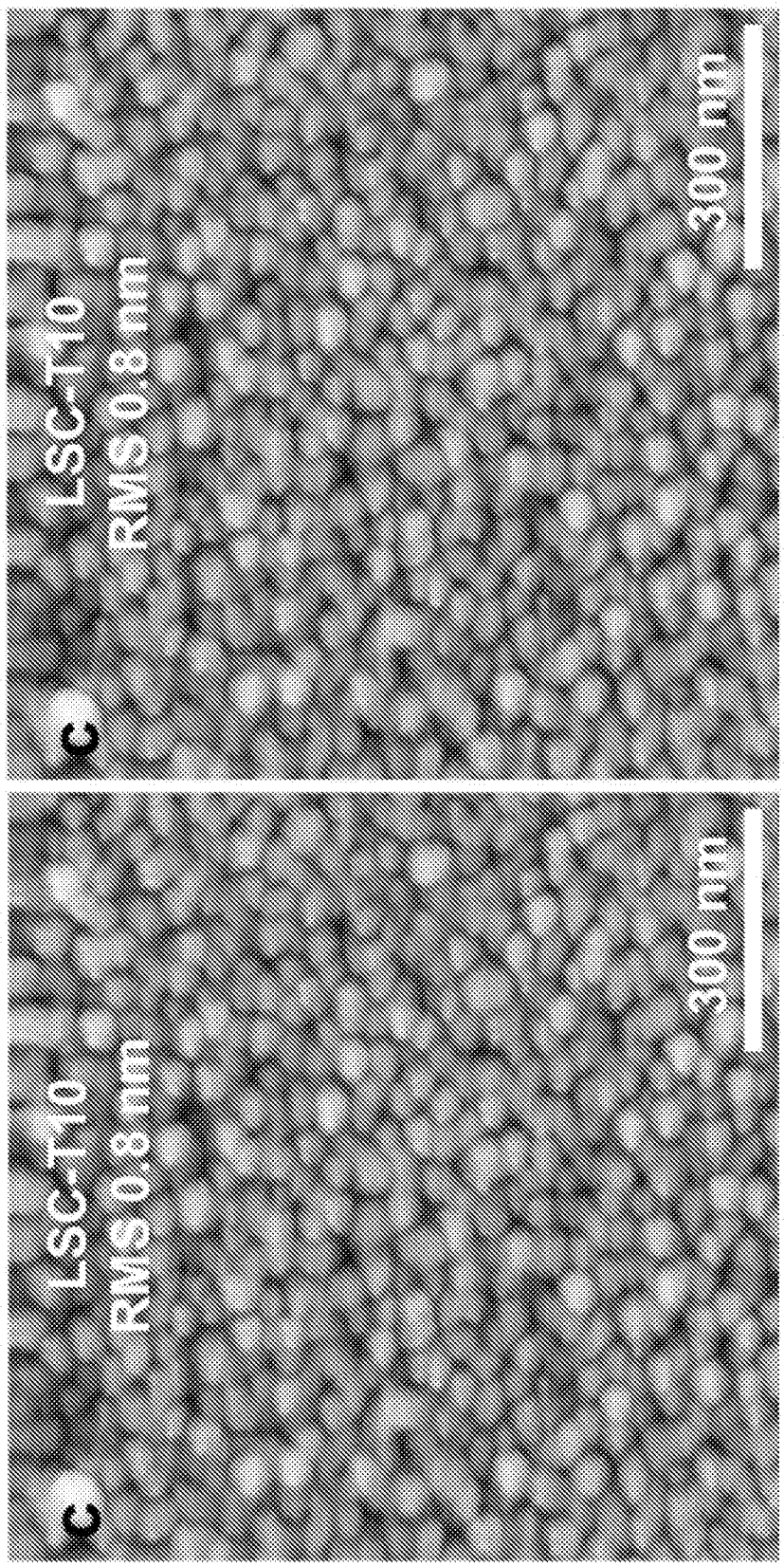
Figures 1E, 1F:
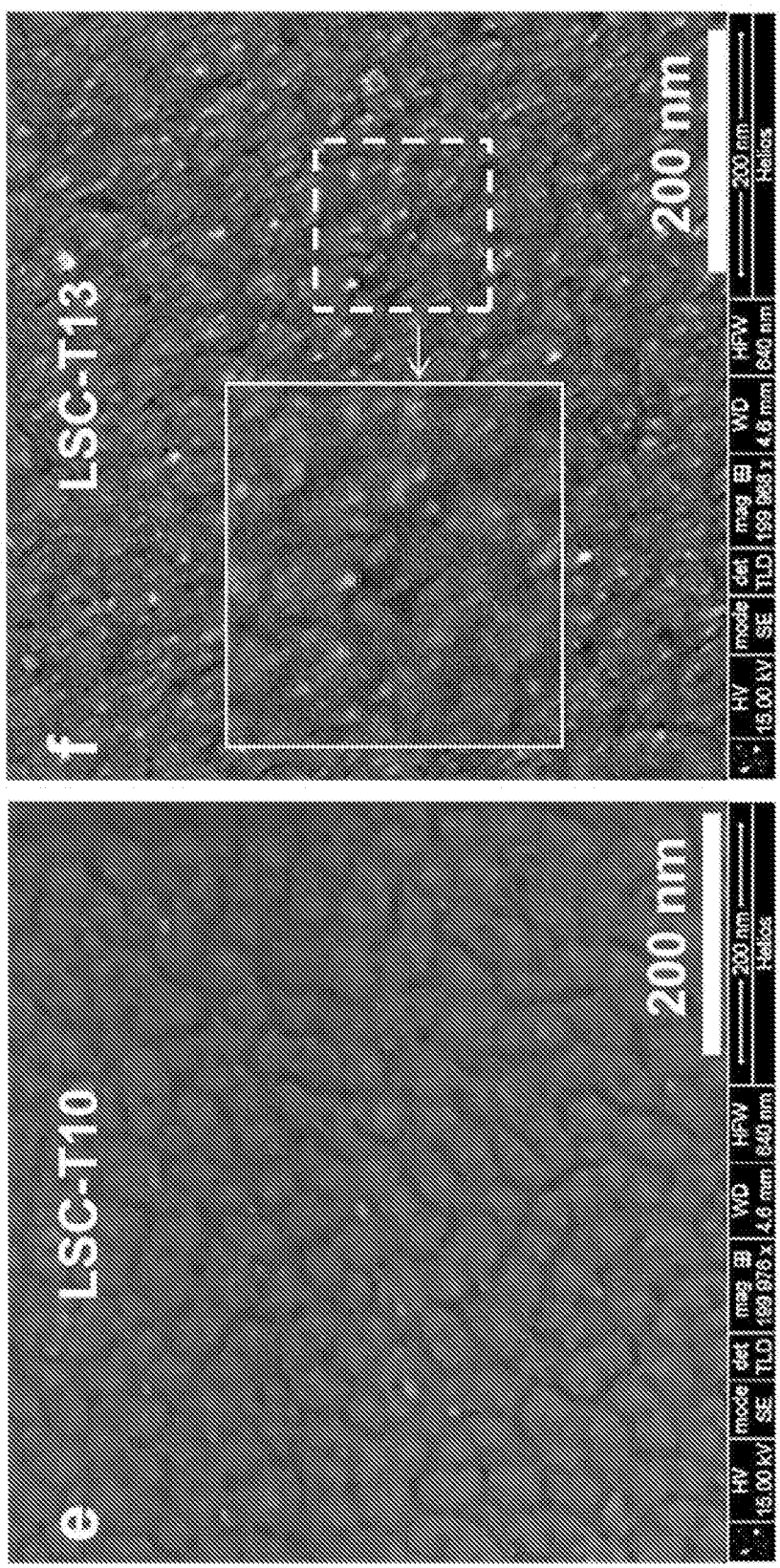

The surface oxygen exchange coefficients, $k^q$, on LSC and LSC-T thin films were compared as a function of time and temperature. The stabilized $k^q$ values of LSC-T films are 2-8 times higher than that of LSC at 420-530° C., respectively, with the best results for LSC-T10. A typical impedance response of the cells with the LSC and LSC-T10 thin film electrodes, and the equivalent circuit (see S. B. Adler, *Chem. Rev.*, 2004, 104, 4791-4844, and J. Jamnik and J. Maier, *Phys. Chem. Chem. Phys.*, 2001, 3, 1668-1678, each of which is incorporated by reference in its entirety) used for modeling the EIS data is shown in FIG. 1A. The surface polarization resistance, $R_S$, values were obtained from the low frequency impedance response, and used those values to calculate the surface oxygen exchange coefficient, $k^q$, as:

$$k^q = \frac{k_B T}{4e^2 c_0 R_S},$$

where $k_B$ is the Boltzmann constant, T is the temperature, e is the electronic charge, and $c_o$ is the total concentration of lattice oxygen determined according to data from the study of Mizusaki et al. See, F. S. Baumann, J. Fleig, H.-U. Habermeier and J. Maier, *Solid State Ionics*, 2006, 177, 1071-1081, and J. Mizusaki, Y. Mima, S. Yamauchi, K. Fueki and H. Tagawa, *J. Solid State Chem.*, 1989, 80, 102-111, each of which is incorporated by reference in its entirety.

Figure 2A:
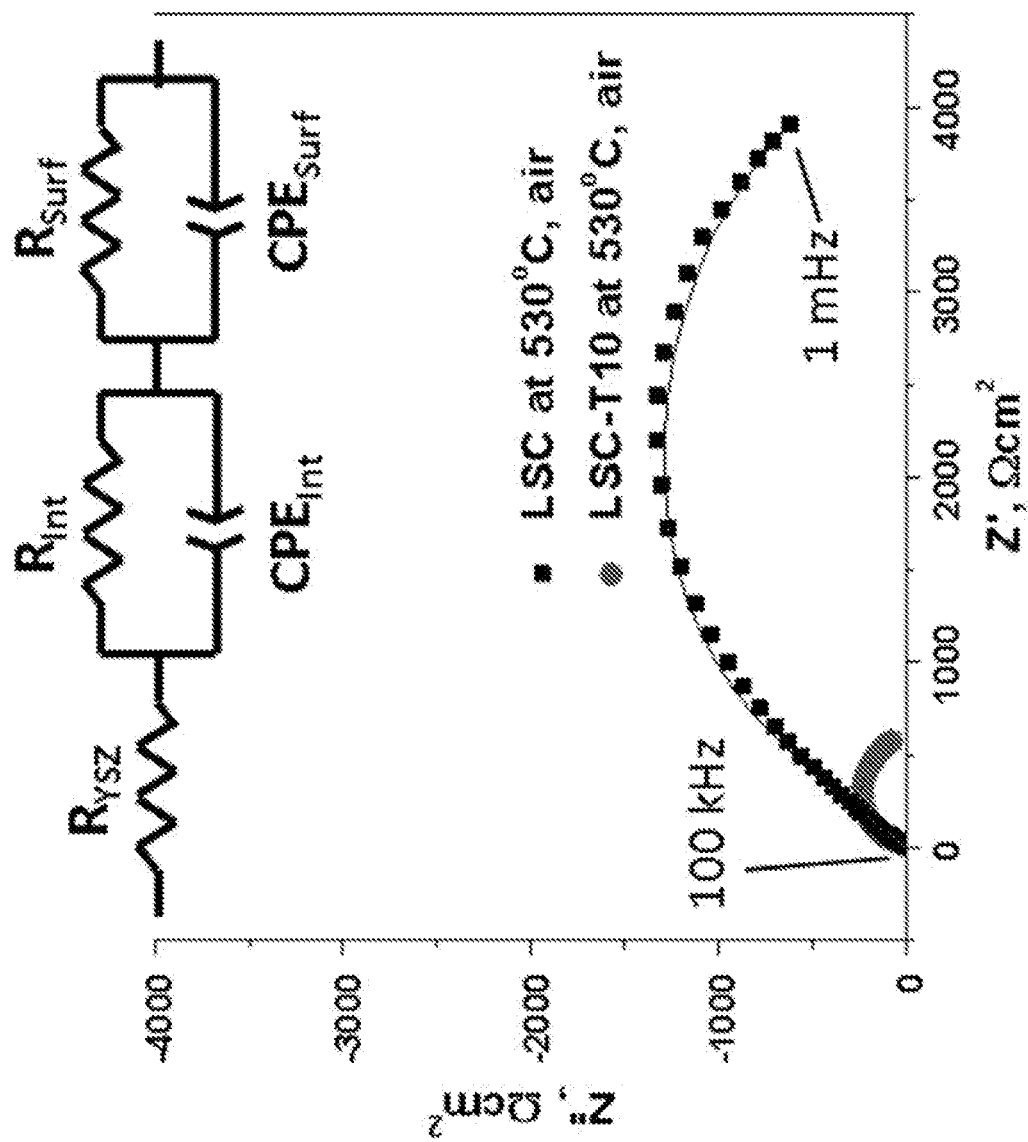
FIG. 2A shows representative electrochemical impedance spectra of the cells with the LSC and LSC-T10 thin film electrodes at 530° C. in air, and an equivalent circuit used to fit the experimental data. Solid lines were obtained by fitting the equivalent circuit parameters to the data.
Figure 2B:
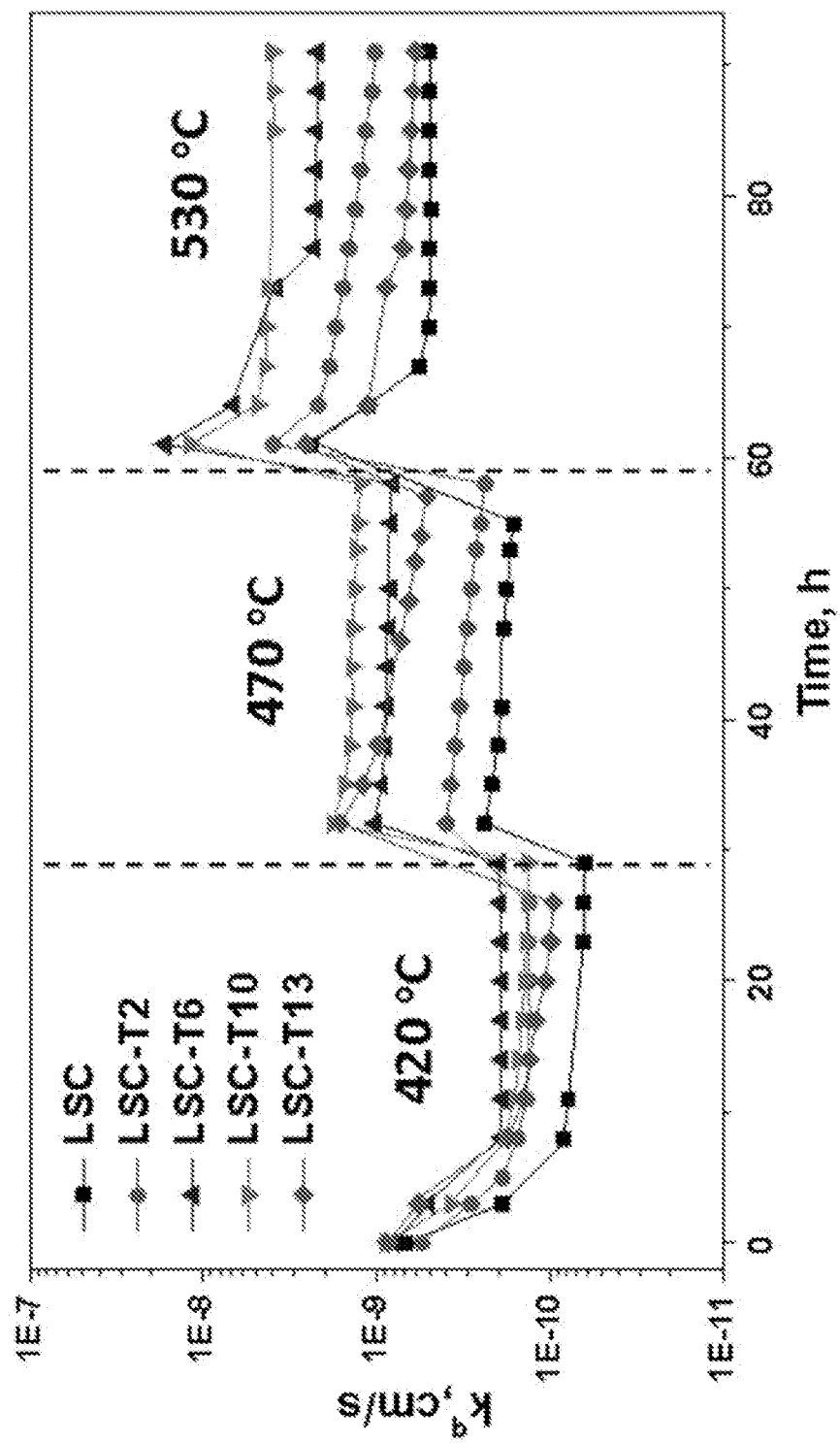
FIG. 2B shows the oxygen surface exchange coefficient, $k^q$, over time at 420-530° C., for LSC and LSC-T films with 2-13% Ti at the surface. Solid lines in FIG. 2B are a guide to the eye.

The measured $k^q$ values as a function of time and annealing temperature are given in FIG. 2B. At the beginning, at 420° C., all the samples have similar $k^q$ values. Within the first few hours of annealing, the surface exchange kinetics degrades, and the $k^q$ values decrease on all specimens. The LSC electrodes degrade most severely, with almost one order of magnitude decrease of $k^q$ within the first 30 hours at 420° C. The stability of $k^q$ improves by increasing the Ti content from 2% to 10% on LSC-T films. The LSC-T10 cathodes were the most stable and showed the highest $k^q$, which were 2 and 8 times higher than that on LSC at 420 and 530° C., respectively. Increasing the Ti content from 10 to 13% degrades the stability of the LSC surface again. This loss in the improvement of stability can be related to the formation of the small $TiO_2$ particles at the surface, as was shown in FIGS. 1D and 1F. When the Ti content is in the range of 2-10%, the Ti-deposition uniformly wets and affects the LSC surface, preventing the degradation of the LSC-T. With the increase in Ti content, the $TiO_2$ at the surface is aggregated into nanoparticles (FIGS. 1D and 1F), which may not provide complete surface coverage and cannot prevent surface degradation. The next section explains that the stability and improvement in the surface oxygen exchange kinetics is correlated to the relatively better stability of the surface cation chemistry.

Surface Chemistry of LSC and LSC-T Films at High Temperature

In order to evaluate the changes in the surface cation chemistry and phase composition upon annealing at elevated temperatures, combined SEM and AES analysis were performed on the LSC and LSC-T films. Sr-rich and Co-poor particles that were found at the surface of the films served as LSC cathodes. For the LSC, LSC-T2, and LSC-T13 films which demonstrated the lowest $k^q$, the surfaces were largely covered with Sr-rich particles with sizes varying from several tens up to several hundreds of nanometers. The LSC-T10 surface which demonstrated the highest electrochemical performance and stability had significantly less particle coverage and higher Sr content within the particle-free (non-segregated) areas of the surface.

TABLE 1

Sr/(La + Sr) and (Sr + La)/Co ratios on particles and on particle-free regions on the LSC and LSC-T film cathodes after electrochemical testing at up to 530° C. The values given in table are averages of several AES measurements at different points. The ± ranges represent the composition variations among different measurement points. The Sr/(La + Sr) and (Sr + La)/Co ratios are 0.20 ± 0.02 and 1.09 ± 0.09 respectively, on all the as-prepared samples before annealing and electrochemical testing up to 530° C. Because of spatial resolution limits of the surface chemical analysis by the nanoprobe AES, the Sr/(La + Sr) and (Sr + La)/Co ratios on the particles should be taken as lower bounds.

| Sample | Sr/(Sr + La) (particle-free zone) | Sr/(Sr + La) (particle) | (Sr + La)/Co (particle-free zone) | (Sr + La)/Co (particle) |
|---|---|---|---|---|
| LSC | 0.19 ± 0.02 | 0.51 ± 0.04 | 1.19 ± 0.10 | 2.1 ± 0.5 |
| LSC-T2 | 0.16 ± 0.03 | 0.46 ± 0.06 | 1.30 ± 0.11 | 2.5 ± 0.9 |
| LSC-T6 | 0.23 ± 0.02 | 0.66 ± 0.04 | 1.11 ± 0.07 | 2.6 ± 0.5 |
| LSC-T10 | 0.25 ± 0.04 | 0.55 ± 0.04 | 1.04 ± 0.12 | 2.3 ± 0.5 |
| LSC-T13 | 0.16 ± 0.04 | 0.43 ± 0.06 | 1.53 ± 0.11 | 2.8 ± 0.9 |

Figures 3A, 3B:
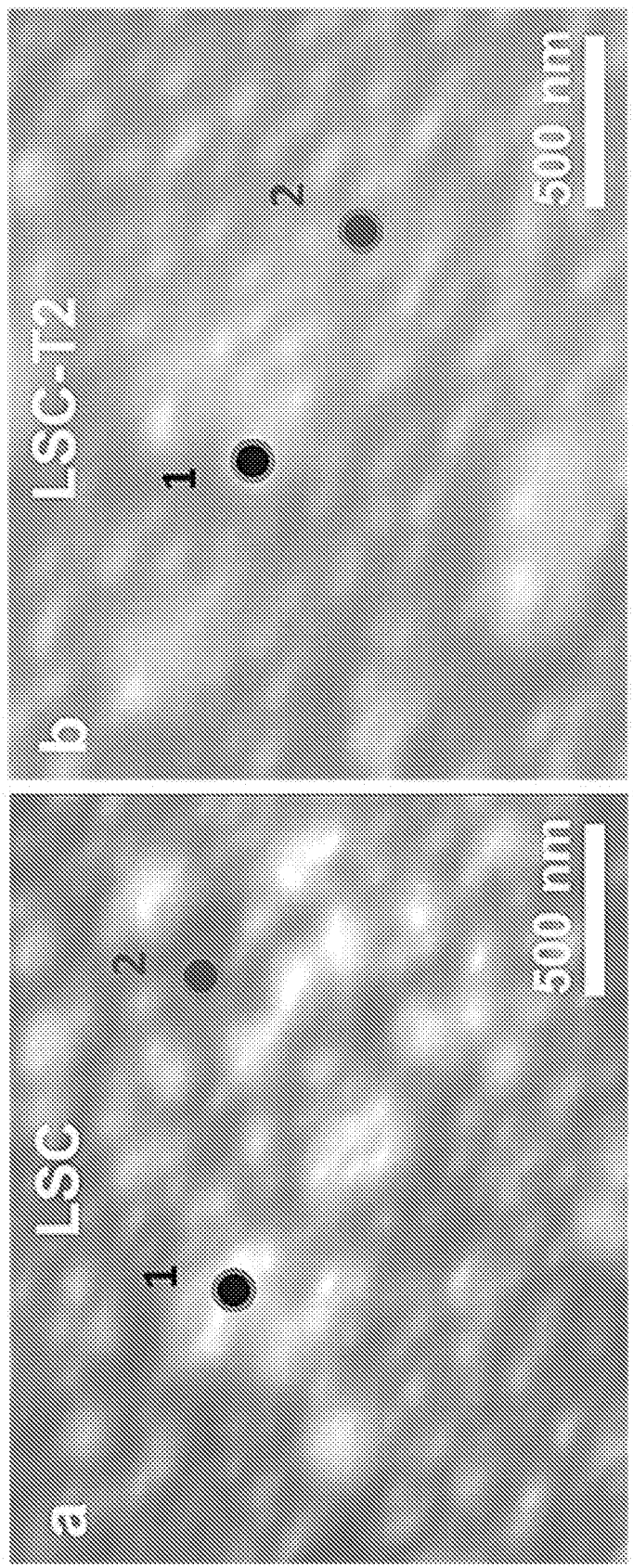
FIGS. 3A-3E show scanning electron microscopy images of the surface morphology of LSC (FIG. 3A), LSC-T2 (FIG. 3B), LSC-T6 (FIG. 3C), LSC-T10 (FIG. 3D), and LSC-T13 (FIG. 3E) film cathodes after electrochemical testing up to 530° C. Points 1 and 2 on each image indicate the particles and particle-free zones of the surface, respectively, where the chemical composition was probed by auger electron spectroscopy as summarized in Table 1.
Figure 3C:
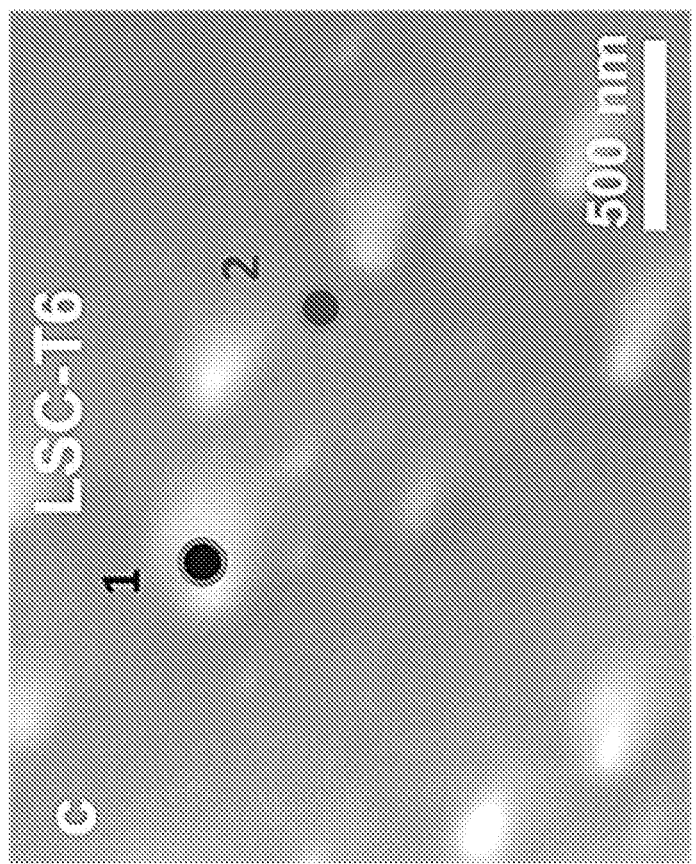
Figures 3D, 3E:
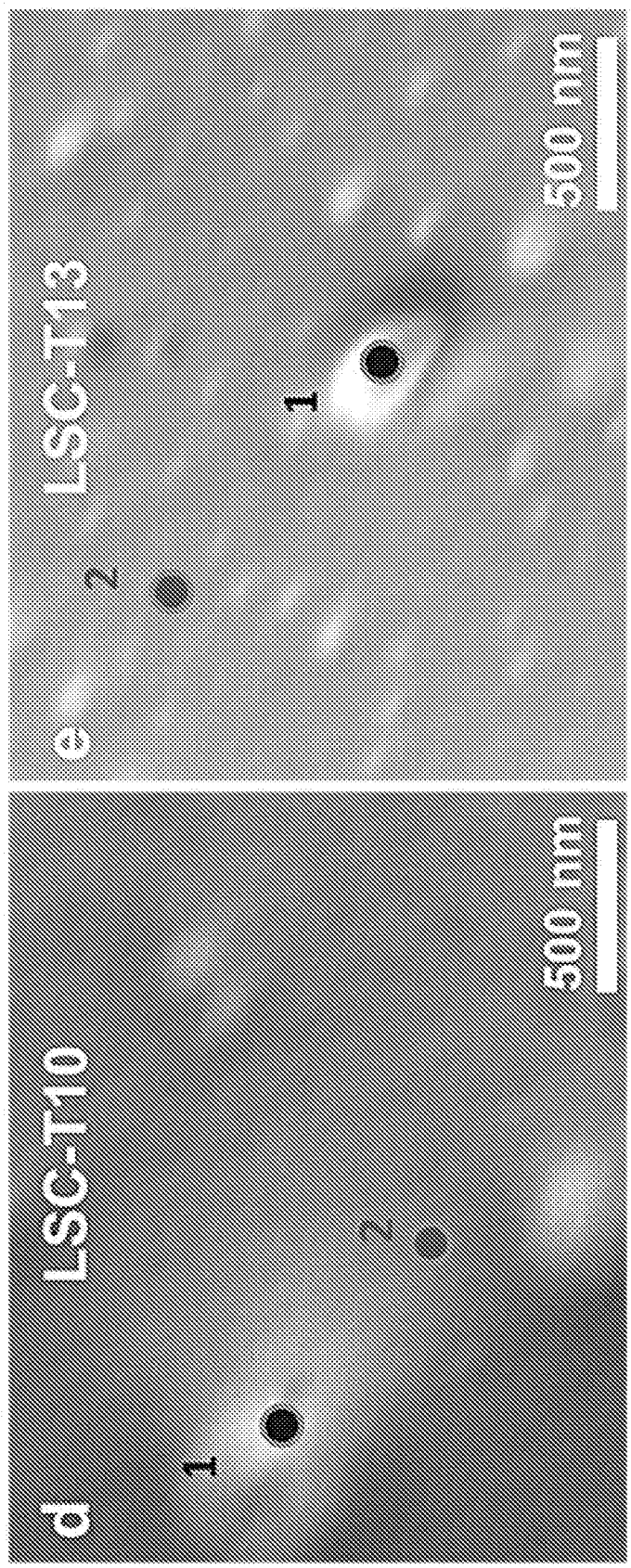

FIGS. 3A-3E shows the SEM images of the surface morphology on LSC and LSC-T films after annealing up to 530° C. in air. These are the same specimens whose surface exchange kinetics were measured by electrochemical impedance spectroscopy, as shown in FIGS. 2A-2B. The average Sr/(Sr+La) and (Sr+La)/Co ratios deduced from the AES analysis on particles and on particle-free regions at the LSC and LSC-T surfaces are summarized in Table 1. While the as-deposited films (FIGS. 1A-1F) had a homogeneous surface morphology and chemistry, the annealed LSC and LSC-T film surfaces show the presence of Sr-rich and Co-poor particles (FIGS. 3A-3E). The segregated particle size varies from few tens up to several hundreds of nm. The Co content was lower and the Sr content was higher within particle-free zones compared to that on the as-fabricated LSC films or the particle-free zones of the annealed films, with the (Sr+La)/Co ratio in the particles measured as 2-3. Because of the difficulty of focusing the AES analysis volume due to sample drift and vibrations, the Sr/(La+Sr) and (Sr+La)/Co ratios on the particles reported in Table 1 should be taken as lower bounds to what the actual ratios should be on the particles. The LSC, LSC-T2, and LSC-T13 films which demonstrated the lowest $k^q$ (FIGS. 2A-2B) are largely covered with such Sr-rich particles (FIGS. 3A, 3B and 3E). The LSC-T10 film, which has the fastest surface oxygen exchange kinetics (FIGS. 2A-2B), had the most stable surface chemistry with the lowest coverage of the Sr-rich particles (FIG. 3D). This film also has a higher Sr fraction within the particle-free areas of the surface, indicating that a higher Sr fraction may remain within the LSC lattice. By combining the results shown in FIGS. 2A-2B and 3A-3E and in Table 1, the phase separated Sr-rich particles block the surface and increase its resistance toward ORR. This chemical and electrochemical stability at the surface of LSC is enhanced significantly by providing a small amount of Ti to the surface.

Mechanism Behind the Degradation of Surface Oxygen Kinetics Upon Surface Segregation An evident effect of the segregated particles, as seen in FIGS. 3A-3E, is the blockage of the LSC surface by an insulating Sr-rich phase that is inactive to ORR. In addition, formation of such Sr-rich particles decreases the Sr doping level within the LSC films. Such a decrease of the Sr doping level within the near surface region of LSC is expected to reduce the availability of oxygen vacancies within LSC and slows down the ORR kinetics. To test this degradation mechanism, $k^q$ was measured as a function of $pO_2$.

Figure 4B:
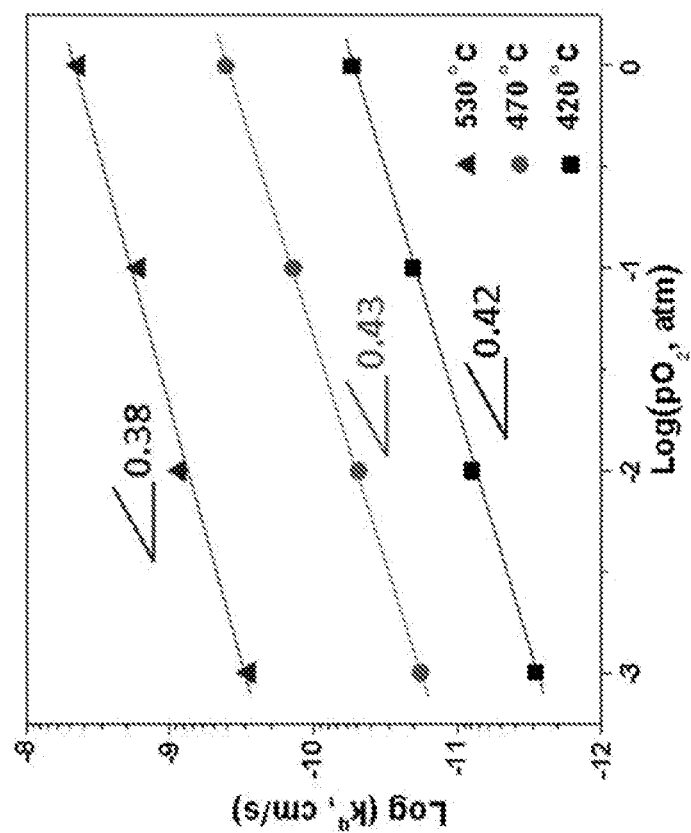
FIGS. 4A-4B show the oxygen exchange coefficient, $k^q$, as a function of oxygen partial pressure, $pO_2$, for LSC (FIG. 4A) and LSC-T10 (FIG. 4B) cathodes at temperatures increasing from 420° C. to 530° C.
Figure 4A:
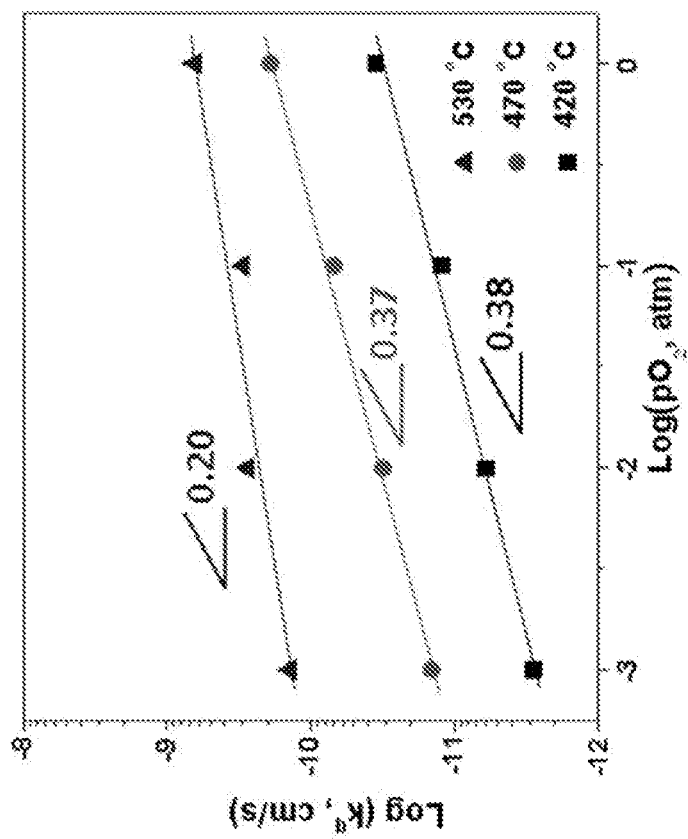

The double-logarithmic plots of the $k^q$ vs $pO_2$ for the LSC and LSC-T10 cathodes are given in the FIGS. 4A-4B. Before each $pO_2$ dependent measurement, the samples were kept at corresponding temperatures for 32 h in air as shown in FIGS. 2A-2B. At 420° C., the slope of the log-log plots for the LSC and the LSC-T10 cathodes are 0.38 and 0.43, respectively. These values are close to the previously reported slopes of $k^q$ vs $pO_2$ as 0.41-0.43 on LSC. See, R. E. van Doorn, I. C. Fullarton, R. A. de Souza, J. A. Kilner, H. J. M. Bouwmeester and A. J. Burggraaf, Solid State Ionics, 1997, 96, 1-7, and P. Hjalmarsson, M. Søgaard and M. Mogensen, Solid State Ionics, 2008, 179, 1422-1426, each of which is incorporated by reference in its entirety. The overall reaction order of around 0.4 can be predicted from the contribution of individual reaction components. According to mass action laws, a slope of 0.4 arises when the ORR rate limiting step depends on the availability of both the adsorbed oxygen species and of oxygen vacancies. If the rate determining step is governed only by availability of the adsorbed oxygen, the slope of $k^q$ vs $pO_2$ of 0.5 is expected. At the same time the oxygen vacancy concentration in LSC depends on $pO_2$ with a power of around –0.1. See, J. Jamnik and J. Maier, Phys. Chem. Chem. Phys., 2001, 3, 1668-1678, which is incorporated by reference in its entirety. By combining contributions from both the adsorbed oxygen species and the oxygen vacancy availability as reaction components, the overall reaction order of 0.4 can be deduced.

In the case of LSC in FIGS. 4A-4B, the change of the slope from 0.38 to 0.20 after annealing at higher temperatures is due to the increased effect of the oxygen vacancy availability as the rate limiting step. Indeed, previous studies on LSC showed that the power in the dependence of oxygen vacancy concentration on $pO_2$ becomes stronger with decreasing Sr fraction in LSC: from –0.06 for $La_{0.3}Sr_{0.7}CoO_3$ to –0.50 for $LaCoO_3$. See, J. Mizusaki, Y. Mima, S. Yamauchi, K. Fueki and H. Tagawa, J. Solid State Chem., 1989, 80, 102-111, which is incorporated by reference in its entirety. Thus, with the lowering of the Sr content within the LSC lattice upon Sr-rich particle separation (FIGS. 3A-3E and Table 1), the ORR rate limiting step, and consequently, $k^q$, depends more significantly on the oxygen vacancy availability. This effectively decreases the power in the dependence of $k^q$ on $pO_2$ while slowing down the ORR kinetics at high oxygen partial pressure.

Ti Distribution in LSC Films

Figure 5:
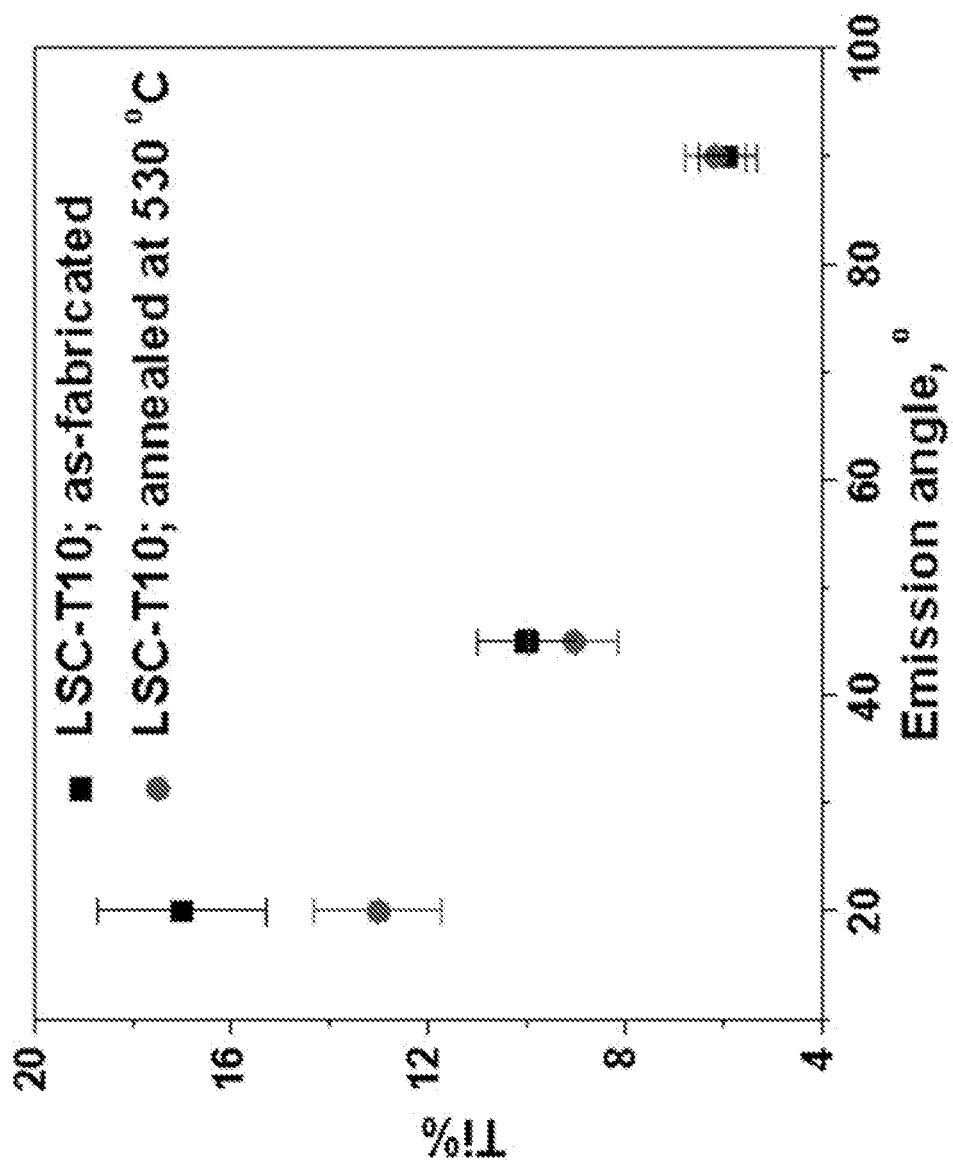
FIG. 5 shows Ti content quantified from the angle-resolved x-ray photoelectron spectroscopy measurements for the LSC-T10 in the as-prepared condition and after annealing at 530° C. in air for 32 h.

FIG. 5 shows the Ti content as a function of probing depth (photoelectron emission angle) for LSC-T10 in their as-fabricated conditions (described in Methods). Increasing the emission angle represents deeper probing depth from the surface. Error bars reflect 10% error generally associated with XPS measurements. It shows that even after annealing during 32 h, the Ti tends to stay mostly at the film surface. However, there is some decrease in the Ti content at the very surface layer. The possible reason can be the dissolution of Ti into LSC lattice or the screening of Ti photoelectrons by the segregated particles at low angles of emission. More work is needed to uncover the exact structure that Ti sits into at the LSC surface.

In summary, the chemical and electrochemical stability of the LSC surface can be improved by modifying the surface with Ti. Two different forms of surface modification were observed. When Ti content is below 10%, the deposited Ti stays in the form of a wetting layer, either dissolved into LSC, or in the form of a thin conformal $TiO_2$ layer. Higher Ti concentration leads to formation of dispersed $TiO_2$ nanoparticles at the surface. The Ti surface content up to 10% (quantified by XPS) on LSC improved the surface oxygen exchange kinetics up to 8 times by hindering the detrimental segregation of Sr-rich phases at 530° C. in air. The Sr-rich phase segregation slows the oxygen exchange kinetics, both by blocking the LSC surface with insulating particles and by decreasing the Sr-doping level and the oxygen vacancy availability within the LSC lattice. The presence of a small amount of Ti that dissolves into the LSC lattice at the surface decreases the oxygen vacancy concentration, and this effect decreases the electrostatic attraction of the negatively charged $Sr_{La}'$ from bulk towards the LSC surface. As a result, the cation chemistry on LSC-T10 is more stable and gives rise to faster oxygen exchange kinetics. Ti-modification of the surface is proposed as one candidate for enabling better chemical stability and reaction kinetics on cobaltite based catalyst and electrocatalyst materials.

Experimental Section

Dense LSC films were deposited onto substrates using pulsed laser deposition (PLD) method with a KrF excimer laser of 248 nm wavelength. The $La_{0.8}Sr_{0.2}CoO_3$ target was purchased from MTI Corp., USA. The films were deposited at 650° C. under oxygen pressure of 10 mTorr on the single crystalline $Yr_{0.08}Zr_{0.92}O_2$(YSZ) substrates (MTI Corp., USA) with 20 nm $Gd_{0.2}Ce_{0.8}O_2$ interlayer grown with the same conditions as LSC films. The LSC film thickness was around 40 nm. After the growth process, the films were cooled down to room temperature in 2 Torr oxygen. To remove excess Sr and to deposit Ti at the surface of LSC thin films the samples were dipped in to the 2 mM $TiCl_4$ solution for 5-30 sec at room temperature. See, N. A. Tsvetkov, L. L. Larina, O. Shevaleevskiy, E. A. Al-Ammar and B. T. Ahn, Prog. Photovolt: Res. Appl., 2012, 20, 904-911, and P. M. Sommeling, B. C. O'Regan, R. R. Haswell, H. J. P. Smit, N. J. Bakker, J. J. T. Smits, J. M. Kroon and J. A. M. van Roosmalen, J. Phys. Chem. B, 2006, 110, 19191-19197, each of which is incorporated by reference in its entirety. For samples which were not treated with Ti, the excess surface Sr-rich phase formed during the PLD process was removed by dipping of the films into a 0.1 M HCl aqueous solution for 10 sec at room temperature. See, M. Kubicek, A. Limbeck, T. Fromling, H. Hutter and J. Fleig, J. Electrochem. Soc., 2011, 158, B727-B734, which is incorporated by reference in its entirety.

The Helios Nanolab 600 dual beam scanning electron microscope (SEM) operated at a beam voltage of 15 keV and a current of 86 pA was used for imaging the surface morphology. A Veeco/Digital Instrument Nanoscope IV was used to perform tapping mode atomic force microscopy (AFM) for characterizing the surface morphology.

A Physical Electronics Model 700 scanning nanoprobe Auger electron spectroscopy (AES) instrument was used to identify lateral heterogeneities in cation compositions with high spatial resolution at the surface. Electron beam settings of 20 keV and 10 nA were used for both SEM imaging and the Auger electron excitation. The La MNN, Sr LMM, and Co LMM Auger emissions were measured for quantifying the surface cation composition of the LSC films. The sampling depths of these Auger electrons are ~8.0 nm for Sr LMM, ~4.0 nm for La MNN, and ~4.5 nm for Co LMM. The sampling depths for both the Auger and x-ray photoelectrons are estimated based on 3 times the inelastic mean free path (3×IMFP) of emitted electrons. However, the Auger electron and photoelectron spatial profiles are exponentially dependent on the distance to the surface, so the data is always more sensitive to the near-surface region. It was not possible to quantify Ti due to low Ti content and overlapping of the most intense Ti Auger emissions with secondary Auger emissions of Sr and La. The smoothing and differentiation of the AES spectra collected were carried out using the SavitskyGolay algorithm. Quantification of the AES differential spectra is performed using peak-to-peak intensities of the tight-scans of the noted emissions from the constituent cations. The AES sensitivity factors were obtained by using the fractured surface of the LSC target as an internal standard of stoichiometry.

X-ray photoelectron spectroscopy (XPS) measurements have been performed in order to estimate the surface cation composition using Perkin-Elmer PHI-5500 ESCA Spectrometer with monochromated Al Kα (1486.65 eV) X-ray radiation under a base pressure of $10^{-9}$ Torr. Angle-resolved XPS measurements were performed by changing of emission angle from 0° to 70° relative to the surface normal. The probing depth (3×IMFP) at 0° was 6 nm, 5 nm, 4 nm and 4 nm for Sr 3d, Ti 2p, La 3d, and Co 2p, respectively. Tilting the sample to the higher emission angle, α, decreases the effective probing depth by sin(a). For example, tilting the sample to 70° decreases the probing depth down to 2.0, 1.7, 1.4, and 1.4 nm for Sr 3d, Ti 2p, La 3d, and Co 2p, respectively. The quantitative analysis of the Co 2p, La 3d, Sr 3d, and Ti 2p XPS spectra was performed using Multipack 9.0 software.

Electrochemical impedance spectroscopy (EIS) measurements were performed on asymmetrical cells with the LSC thin film electrodes grown on YSZ single crystal substrates. Dense platinum current collectors in the form of a grid (which covers 75% of electrode surface with 25 μm×25 μm openings) were deposited on the LSC thin films by means of photolithography and RF sputtering. Porous Ag layer served as the counter electrode. Due to high electrical conductivity of LSC (see, J. X. Wang, J. Shao, Y. K. Tao and W. G. Wang, ECS Transactions, 2009, 25, 595-600, and E. Koep, D. S. Mebane, R. Das, C. Compson and M. Liu, Electrochem. Solid-State Lett., 2005, 8, A592-A595, each of which is incorporated by reference in its entirety), a significant potential gradient is not expected across the LSC film from one Pt grid to the next. Furthermore, the key point of this example is the chemical segregation process and its effect on the electrochemical performance. The stage of the experiments that involve surface cation segregation is simply annealing at open circuit voltage, so no effect of electrochemical potential is involved on the segregation itself in this work. Parstat 2273 potentiostat was used to perform the EIS measurements in the frequency range of 100 kHz to 1 mHz with AC amplitude of 5 mV and 0 V DC bias from 420° C. to 470° C. and to 520° C. in air. After measuring the EIS response of each film at a given temperature in air for 32 hours, the dependence of the surface exchange resistance on oxygen partial pressure was measured in the range of 1 atm to $10^{-3}$ atm at the same temperature. Then, the temperature was increased up to the next level and the same measurement sequence was repeated. ZView software was used for the data fitting and analysis.

Example II. Modification of the Perovskite Oxide Surface with Various Metal Oxides To minimize the electrostatic driver to the surface, the excess positive charge of the surface must be reduced. While the oxygen vacancies at the surface are important in determining the total reactivity to oxygen exchange reactions (see, M. M. Kuklj a, E. A. Kotomin, R. Merkle, Y. A. Mastrikov and J. Maier, *Physical Chemistry Chemical Physics*, 2013, 15, 5443-5471, which is incorporated by reference in its entirety), they also contribute to attracting the aliovalent dopants, such as $Sr_{La}'$, or $Ba_{La}'$ defects, to the surface. The reducibility of the B-site cation on the perovskite is directly related to the amount of the oxygen vacancies that can be equilibrated at the material surface. The results show that the stability LSC cathode surfaces can be greatly improved by the decreasing the surface oxygen vacancy concentration at the surface. This means that the surface positive charge is reduced by putting more oxidizable metal cations to the surface, and thus, the electrostatic attraction of the $Sr_{La}'$ to the surface is weakened.

As an example, LSC surface was stabilized chemically. A simple chemical bath method was applied for deposition of the transition metal cations from a metal chloride solution (see, *J. Phys. Chem. B*, 2006, 110, 19191; *Prog. Photovolt: Res. Appl.*, 2012, 20, 904, which is incorporated by reference in its entirety) on to the perovskite oxide thin film surfaces. This approach was demonstrated on LSC dense thin films, and on LSCF thick porous films. LSC dense thin films served as a model system for us to demonstrate the new concept and to explain the mechanisms that lead to performance improvement. LSCF thick porous films have a microstructure closer to that in real operational SOFCs. These surface-modified LSC and LSCF were tested as SOFC cathodes at elevated temperatures in air and various oxygen pressures, and compared to the unmodified LSC and LSCF cathode. The results show that the stability of the modified cathodes is superior in compare of that of unmodified LSC and LSCF cathodes.

Figure 6:
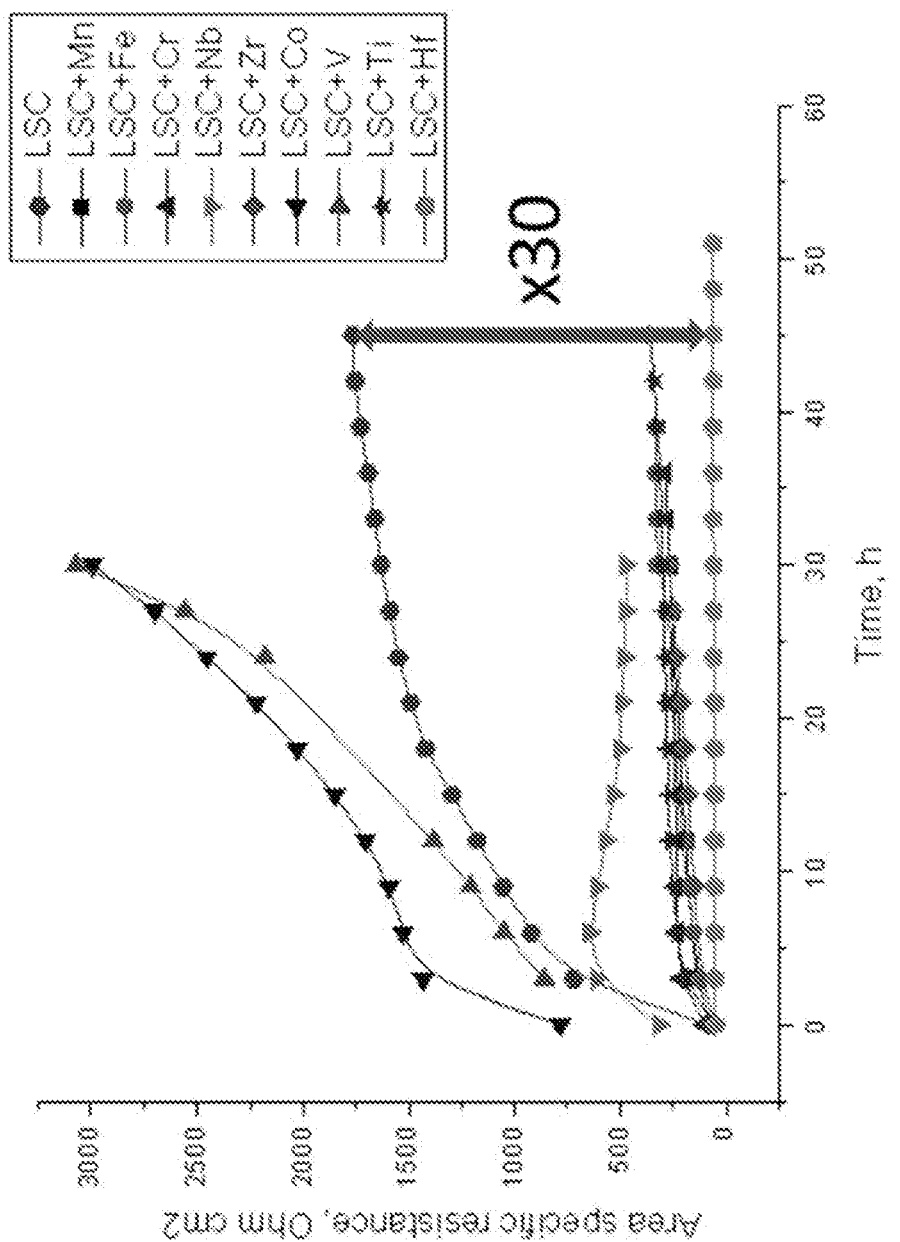
FIG. 6 shows the area specific resistance to surface oxygen exchange reaction at 530° C. in air as a function of time on LSC thin film cathodes with the different elements (Mn, Fe, Cr, Nb, Zr, Co, V, Ti, Hf) deposited at the surface and on the bare unmodified LSC.

FIG. 6 shows the results of the area specific resistance to surface oxygen exchange reaction at 530° C. in air as a function of time on LSC thin film cathodes with the different metal elements (Mn, Fe, Cr, Nb, Zr, Co, V, Ti, Hf) deposited at the surface and on the bare unmodified LSC. Note that the oxygen exchange reaction rate is inversely proportional to the plotted area specific resistance. As it can be seen from FIG. 6, by choosing the suitable surface additive cation, the stability of the LSC surface can be improved and the final surface oxygen exchange reaction coefficient increased up to 30 times at 530° C. while operating air. Here, the best result was achieved with Hf added to the LSC surface. This is a significant gain for SOFC energy conversion efficiency when using LSC as a cathode, and also suggests significant improvement of the surface charge transfer properties that are important for other applications.

In addition to Ti-modification of the LSC surface described in the previous Example I, the effect of presence of other transition metal additives on the stability of LSC dense thin film electrode was investigated. The variations of the cathode resistance with different metal cation additives are given in FIG. 6. According to the findings, the deposition of cations that are more oxidizable than (or equivalently, less reducible than) the host B-site cation (in this case the Co in LSC), improves the stability of the LSC surface chemistry (see Example I) and accelerates the oxygen exchange reaction (by up to 30 times as demonstrated so far in FIG. 6). At the same time, the deposition of Co or a more reducible metal, such as V, degrades the surface stability and degrades the oxygen exchange reaction kinetics.

Figure 7:
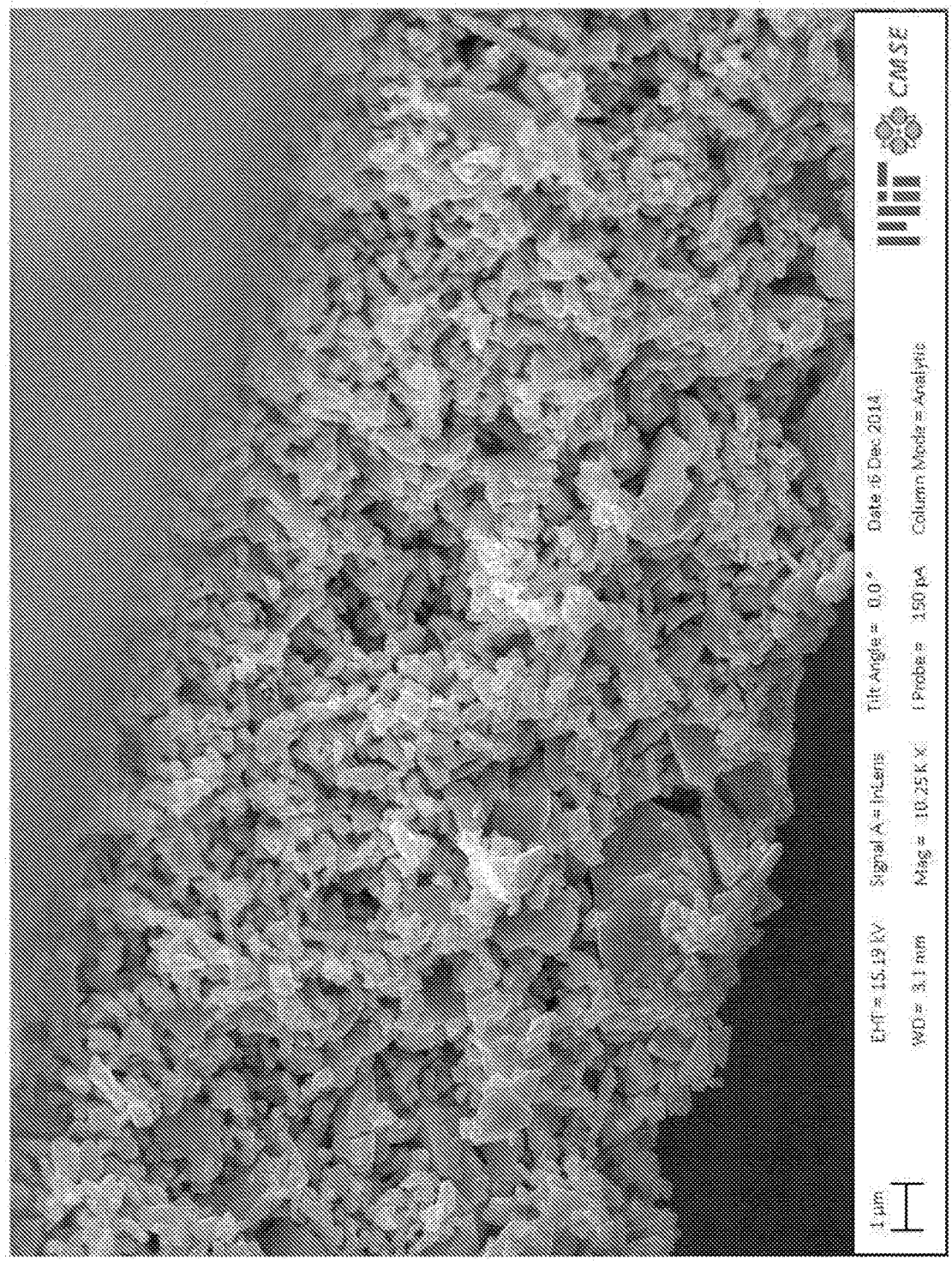
FIG. 7 shows cross sectional secondary electron microscopy (SEM) image of the porous LSCF thick film cathode layer.

The perovskite stability for porous LSCF films were also investigated. Porous LSCF thick film morphology is close to that used in real high temperature electrochemical devices such as SOFCs. The dense films reported above have been model systems to demonstrate the new concept and explain the governing mechanisms behind the new concept. The morphology of the porous LSCF thick film cross section and the cathode surface oxygen exchange resistance over time are given in FIGS. 7 and 8A-8B.

Figures 8A, 8B:
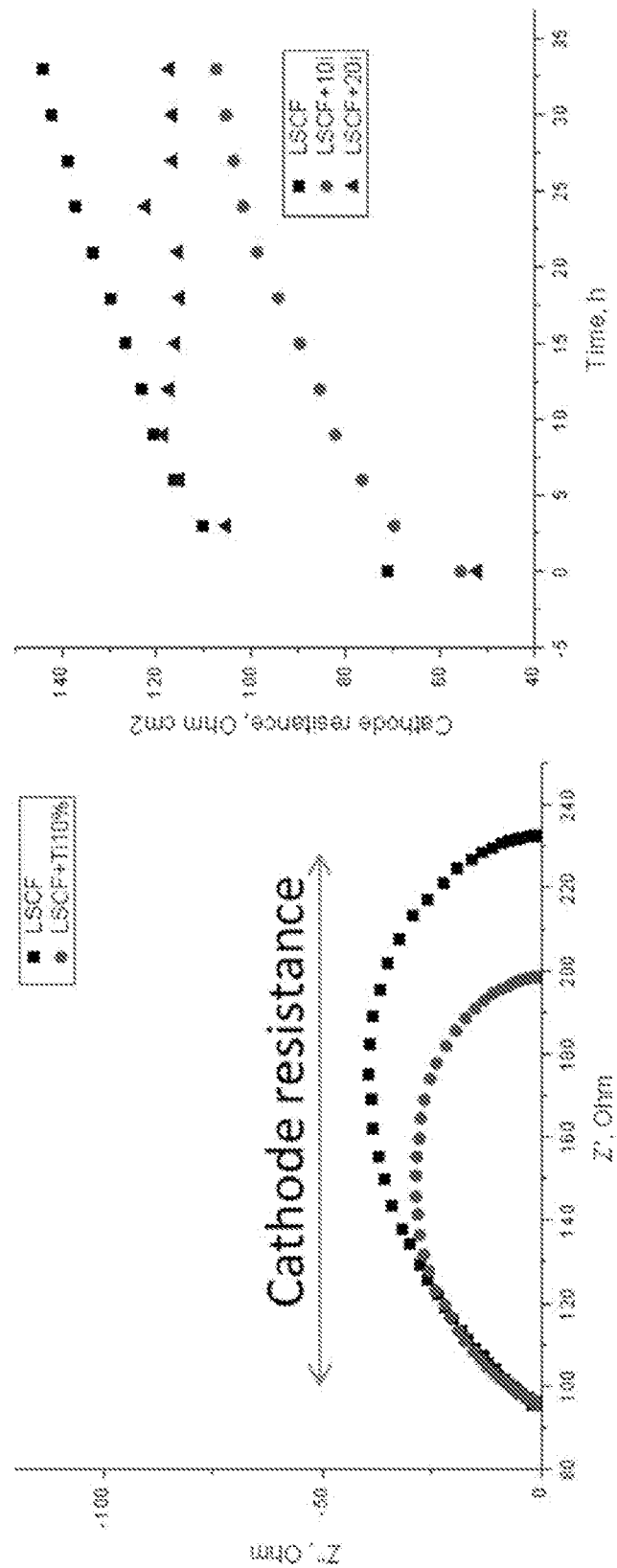
FIG. 8A shows representative electrochemical impedance spectra of the LSCF/CeO2/YSZ/Ag and LSCF-Ti/CeO2/YSZ/Ag cells with porous LSCF and LSCF-Ti cathodes, measured at 530° C. in air.
FIG. 8B shows rhe oxygen exchange resistance at the cathode surface over time at 530° C. in air, for LSCF and LSCF-Ti cathodes.

The improvement of performance when the LSCF surface is modified by Ti from the chemical bath solution is again clear (seen by the reduction of the surface oxygen exchange resistance, or the cathode resistance in FIG. 8A). However, because the solution containing Ti has to penetrate through the pores to completely wet the LSCF surface inside the pores, and because the solution viscosity itself is not optimized yet, the performance improvement gain is less than demonstrated on the LSC dense thin films above in FIG. 6. This is because the currently used Ti solution did not penetrate to the entire LSCF surface (into the pores). The real Ti concentration on LSCF surface into as a function of distance from the top surface is currently not known.

Figure 9:
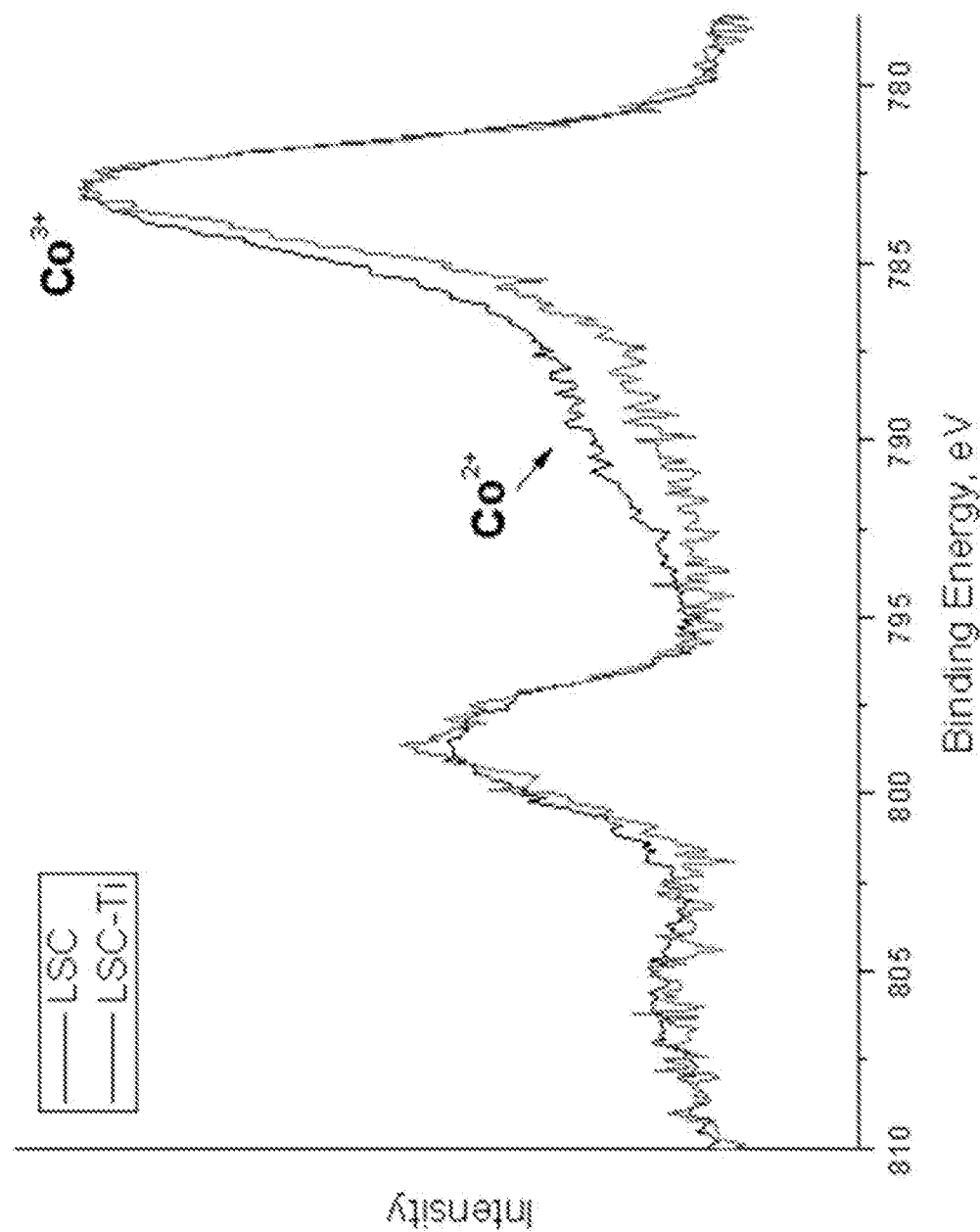
FIG. 9 shows Co 2p photoelectron spectra on LSC and LSC-Ti films recorded at 450° C. at $10^{-6}$ Torr oxygen pressure.

Example III. In-Situ Measurements of the Chemical Composition and Co Reducibility on the Unmodified and Modified LSC Surfaces at Elevated Temperatures Co Reducibility in the Presence of Ti or Hf at LSC Surface The reducibility and the net positive charge at the surface of LSC can be one of the drivers to Sr segregation, by electrostatically attracting the negatively charged $Sr_{La}'$ point defects toward surface. To test the reducibility of the bare LSC films and films modified with Ti (LSC-Ti), the Co 2p photoelectron spectrum was measured on LSC and LSC-Ti films at 450° C. at low oxygen partial pressure ($\sim 10^{-6}$ Torr). The two spectra are compared in FIG. 9. The two spectra are compared in FIG. 9. Three features can be distinguished in the Co 2p spectrum: main $Co^{3+}$ peak at around 783 eV and two small satellites at around 792 eV and 787 eV. The first satellite points out the presence of $Co^{3+}$ in intermediate or high spin configuration and the satellite at 787 eV is known to be fingerprint of the $Co^{2+}$ specie. The intensity of $Co^{2+}$ satellite peak is higher on LSC compared to that on LSC-Ti. This result shows that Co is less reducible on LSC-T10 compared to that on LSC, and thus, the surface of LSC-Ti has a lower concentration of oxygen vacancies. From this, it can be concluded that the LSC-Ti is less positive and provides a weaker electrostatic attraction of the negatively charged $Sr_{La}'$ point defects toward surface, and as a result, is chemically more stable. It is also known that oxygen vacancies are important for the reactivity of LSC to oxygen reduction. However, the result here shows having less oxygen vacancies at the surface can actually improve the chemical stability of the LSC surface and result in higher overall performance.

Figure 10:
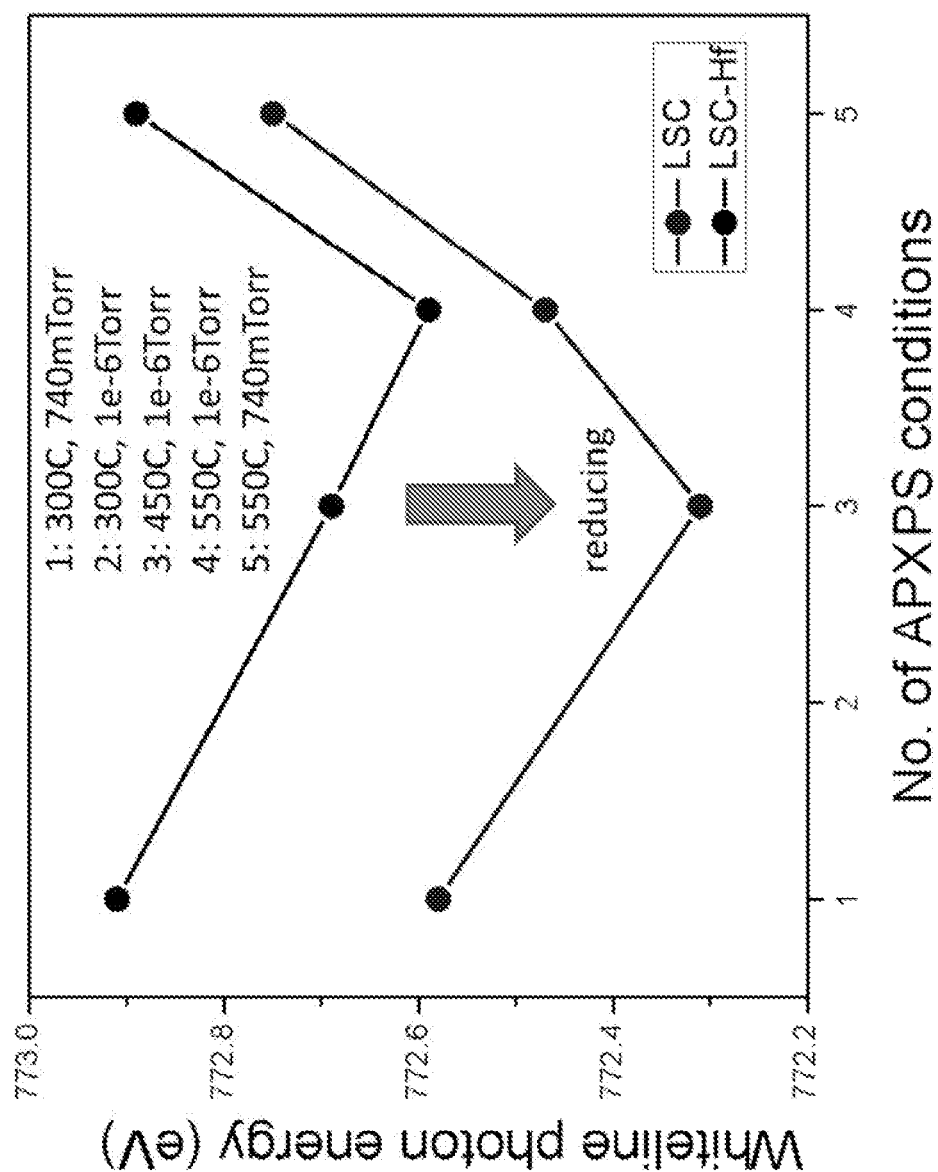
FIG. 10 shows the variation of the Co L2,3 absorption edge (=whiteline photon energy), from x-ray absorption spectroscopy measurements at different conditions on the LSC and LSC-Hf dense films.

The hypothesis about lower Co oxidation state in the modified films was further supported by in-situ x-ray absorption spectroscopy (XAS) measurements. FIG. 10 shows the variations of the position of the Co $L_{2,3}$ absorption edge at different measurements conditions. The decrease in the Co $L_{2,3}$ edge white-line photon energy indicates the reduction of the Co cation. As it can be seen in FIG. 10, the Co in the LSC-Hf films are less reducible than in the bare LSC (i.e. seen from the Co $L_{2,3}$ edge energy being higher for the LSC-Hf surface compared to the bare LSC surface). Another reason why Co in LSC is less reducible in the presence of Hf is related with the fact the surface of the LSC-Hf is more stable against Sr segregation (also consistent with the idea of keeping the Sr in the lattice and not to phase separate it out of the perovskite lattice).

Figures 11A, 11B:
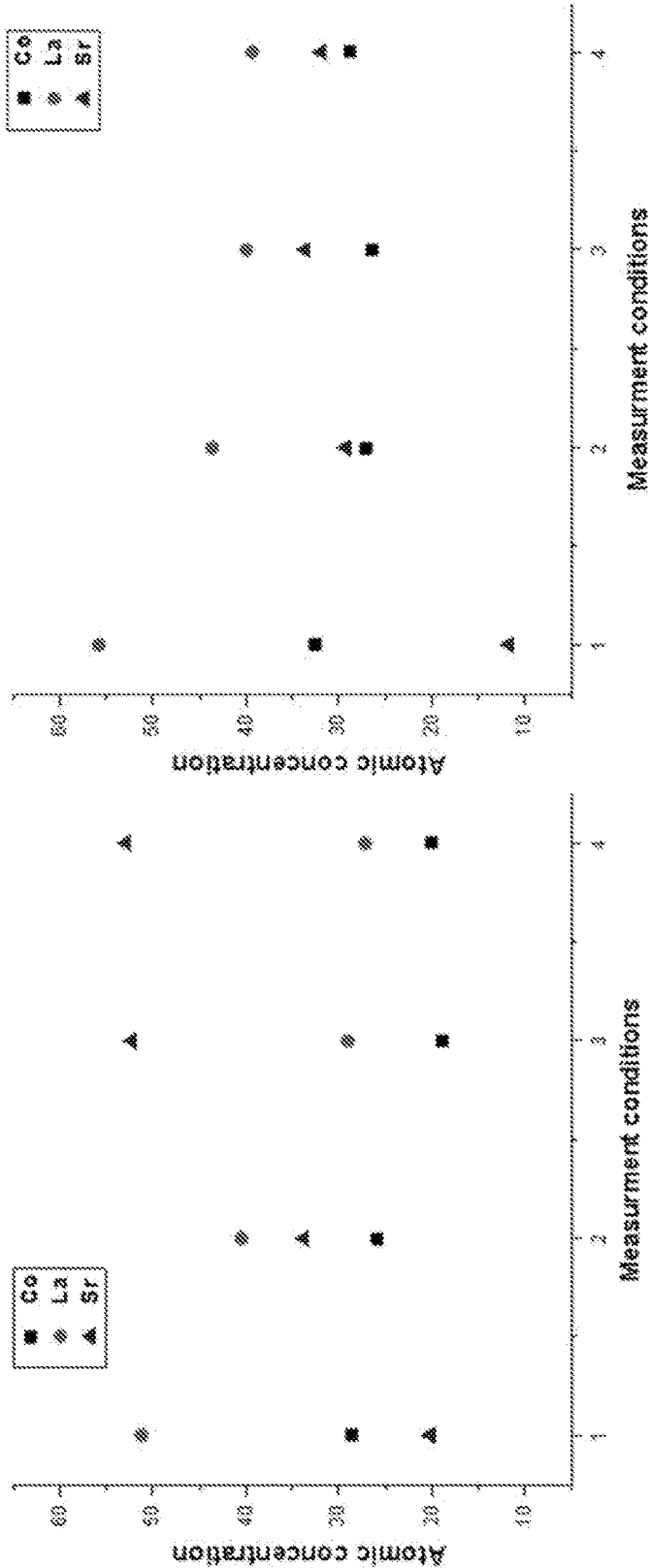
FIGS. 11A-11C show the variations of the atomic concentrations of the La, Co and Sr determined from the La 4d, Sr 3d, and Co 3p photoelectron peaks in XPS at the surface of the (a) LSC (FIG. 11A), LSC-Ti (FIG. 11B), and LSC-Hf films (FIG. 11C).
Figure 11C:
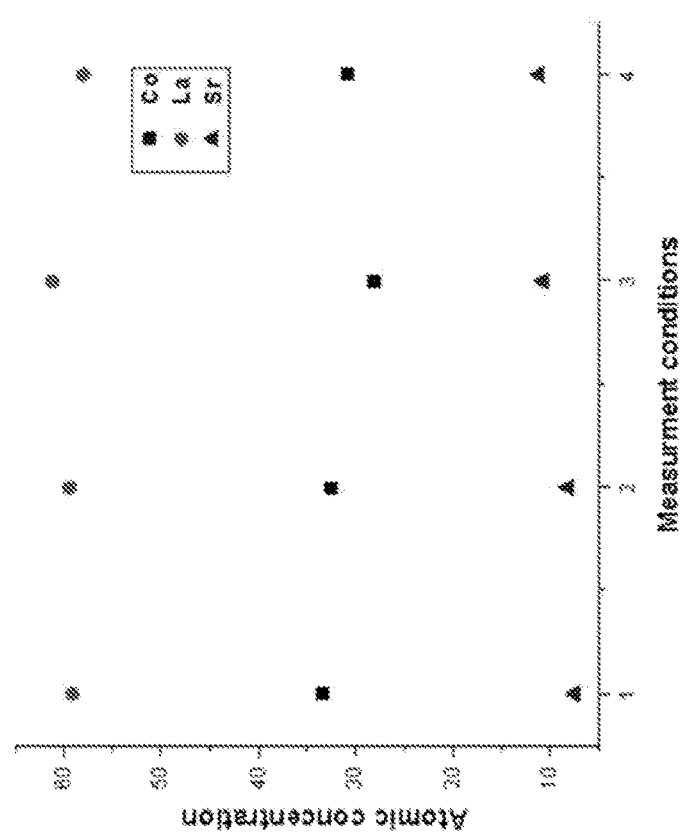

Less Sr Segregation and Phase Separation Found at the Surface of Modified LSC Films The variation of the chemical composition at the different measurement conditions was investigated by x-ray photoelectron spectroscopy (XPS). Atomic concentrations calculated from the areas of the La 4d, Sr 3d, and Co 3p photoelectron peaks, which reflect the surface cation composition, are given in FIG. 11. It can be seen that the Sr segregation at the surface is the highest for the unmodified LSC films, and lower for LSC-Ti and lowest for LSC-Hf. Also, Sr segregation is taking place even at such low temperatures as 300° C., and it is becoming even more severe at higher temperatures especially on LSC, due to Sr out diffusion from the film bulk. The better chemical stability (i.e. suppressed segregation and phase separation of Sr) at the surface of the LSC-Ti films was also shown and explained in Example I.

Figure 12B:
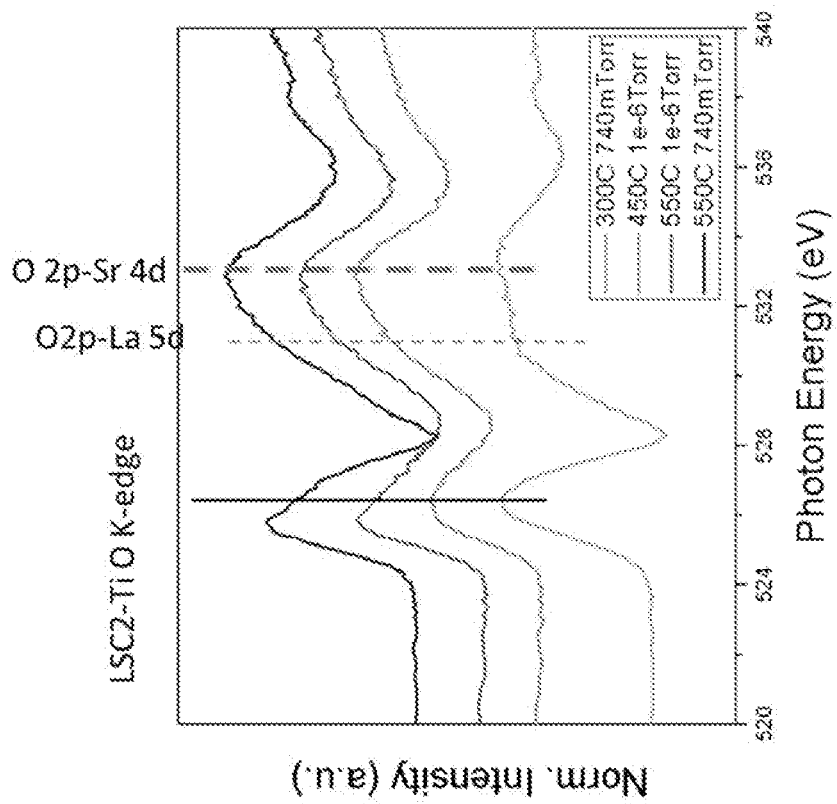
FIGS. 12A-12C show the variations of the O K XAS peak shape at the surface of LSC (FIG. 12A), LSC-Ti (FIG. 12B), and LSC-Hf films (FIG. 12C).
Figure 12A:
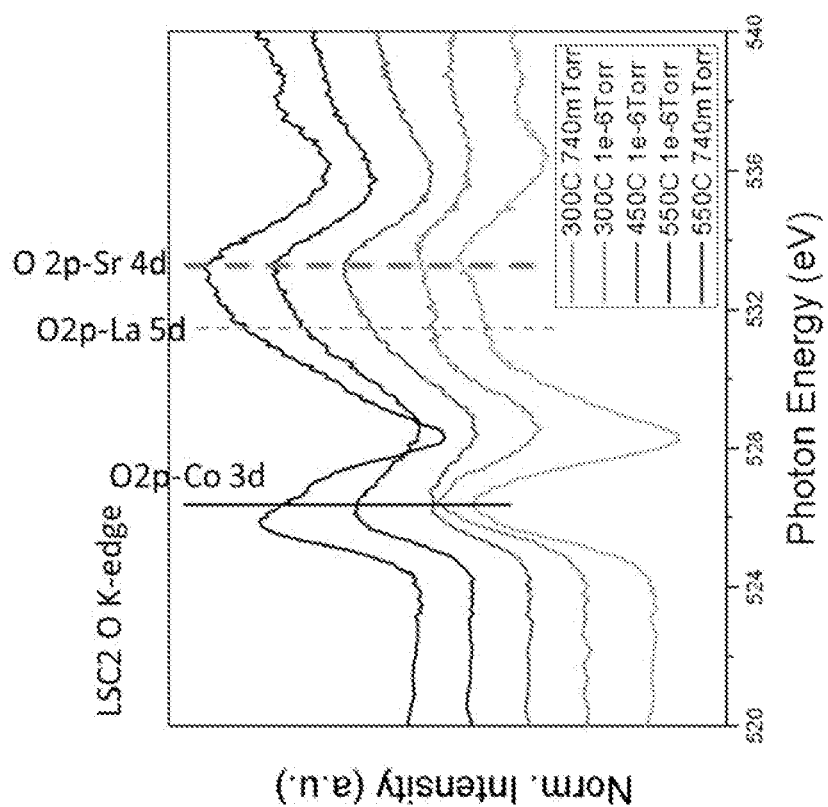
Figure 12C:
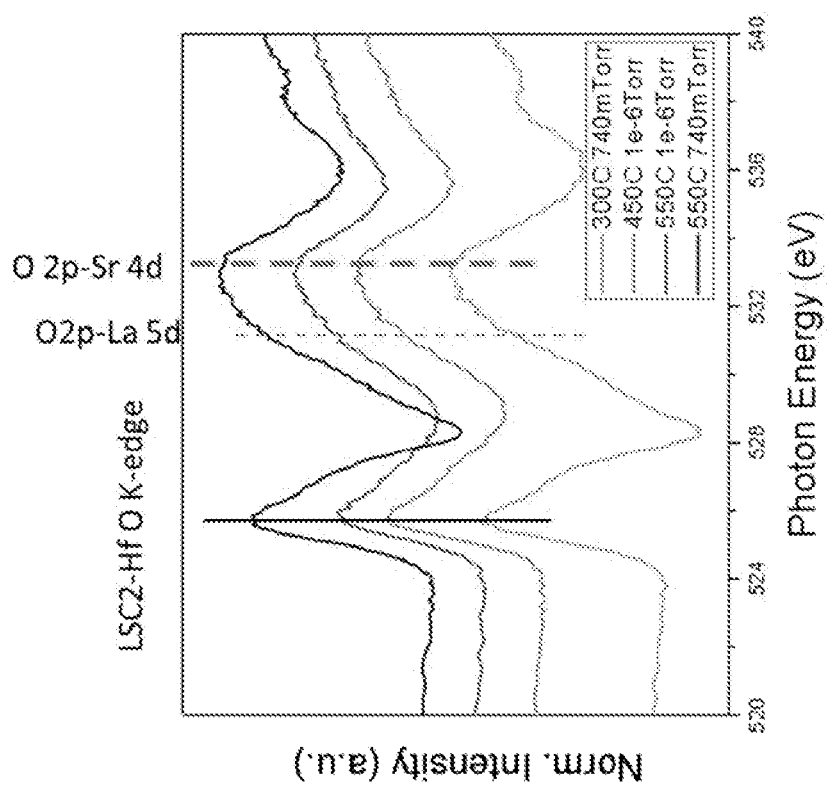

The increase of the Sr content at the surface of LSC film is supported by XAS measurements of the O K edge. The feature at about 534 eV represents the O 2p-Sr 4d orbital hybridization, and is related with the Sr content. As seen in FIGS. 12A-12C, this feature at 534 eV is continuously increasing with temperature for the LSC film while it remains almost unchanged in the LSC-Hf film.

Example IV. Hf-Modification of $La_{0.8}Sr_{0.2}CoO_3$ Surface

Electrochemical Performance of LSC with Surface Chemical Modifications

Figure 13A:
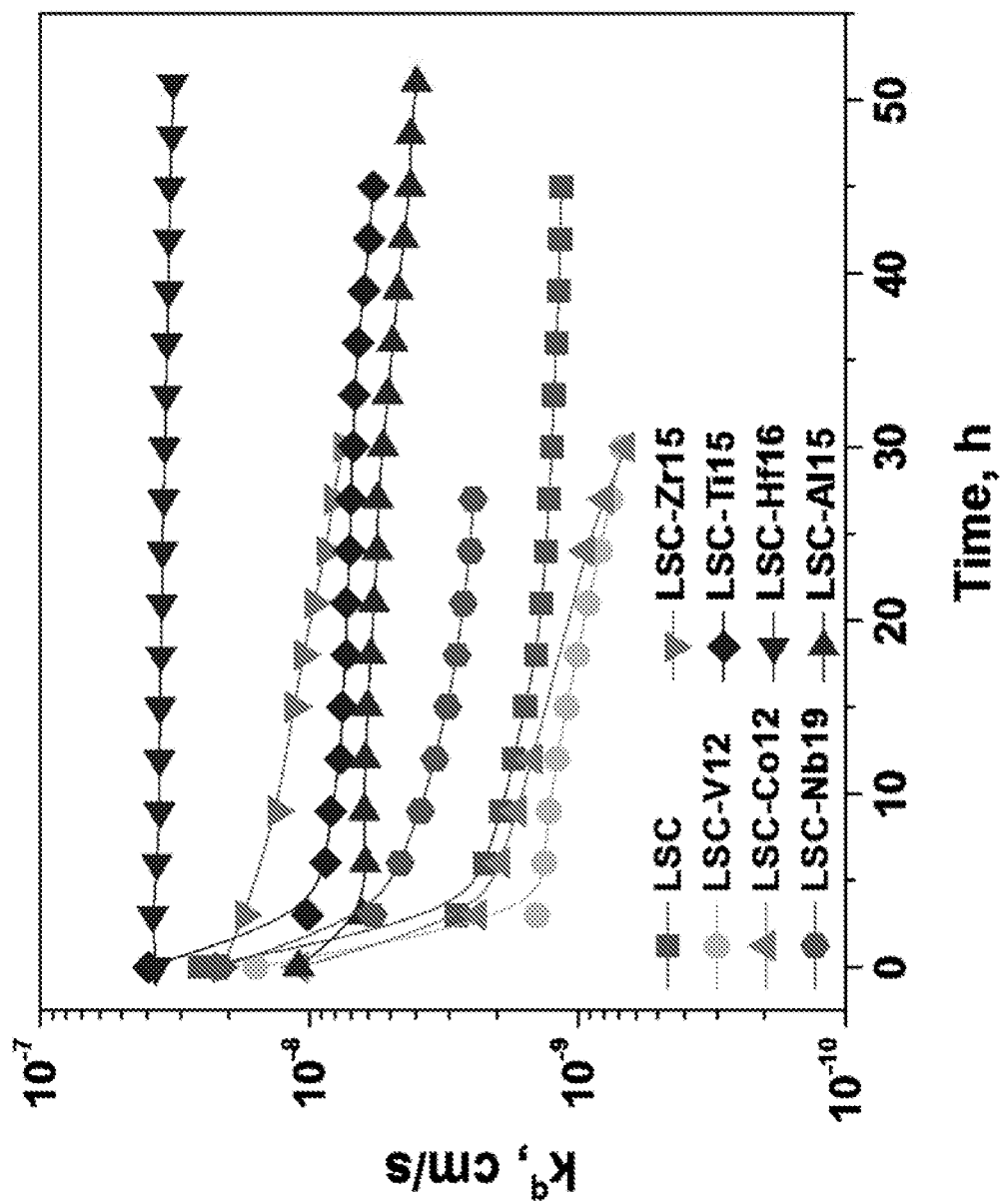
FIG. 13A-13B show surface oxygen exchange kinetics and stability on LSC dense thin film cathodes.

The evolution of the surface oxygen exchange coefficients, $k^q$, were compared, which represents the oxygen reduction reactivity of LSC cathodes as a function of time at 530° C. in air. The LSC films treated with chloride solutions of Co, V, Nb, Zr, Ti, Hf, and Al are denoted as LSC-Co12, LSC-V12, LSC-Nb19, LSC-Zr15, LSC-Ti15, LSC-Hf16 and LSC-Al15, respectively. The numbers indicate the Me/(La+Sr+Co+Me) ratio at/near the film surface with Me being the added metal cation at the surface. The $k^q$ obtained from electrochemical impedance spectroscopy are given in FIG. 13A. Initially, all the samples have similar $k^q$ values. Within the first few hours of the measurements, the surface exchange kinetics degraded with varying extents on the different samples. The LSC, LSC-Co12, and LSC-V12 electrodes degraded most severely, with almost 1.5 orders of magnitude decrease of $k^q$ within the 30 hours of testing. The LSC-Ti15, LSC-Zr15, LSC-Hf16, LSC-Nb19 and LSC-Al15 cathodes were more stable, with the best performance by LSC-Hf16 having more than 30 times faster oxygen exchange kinetics than that on LSC after 54 hours.

Figure 13B:
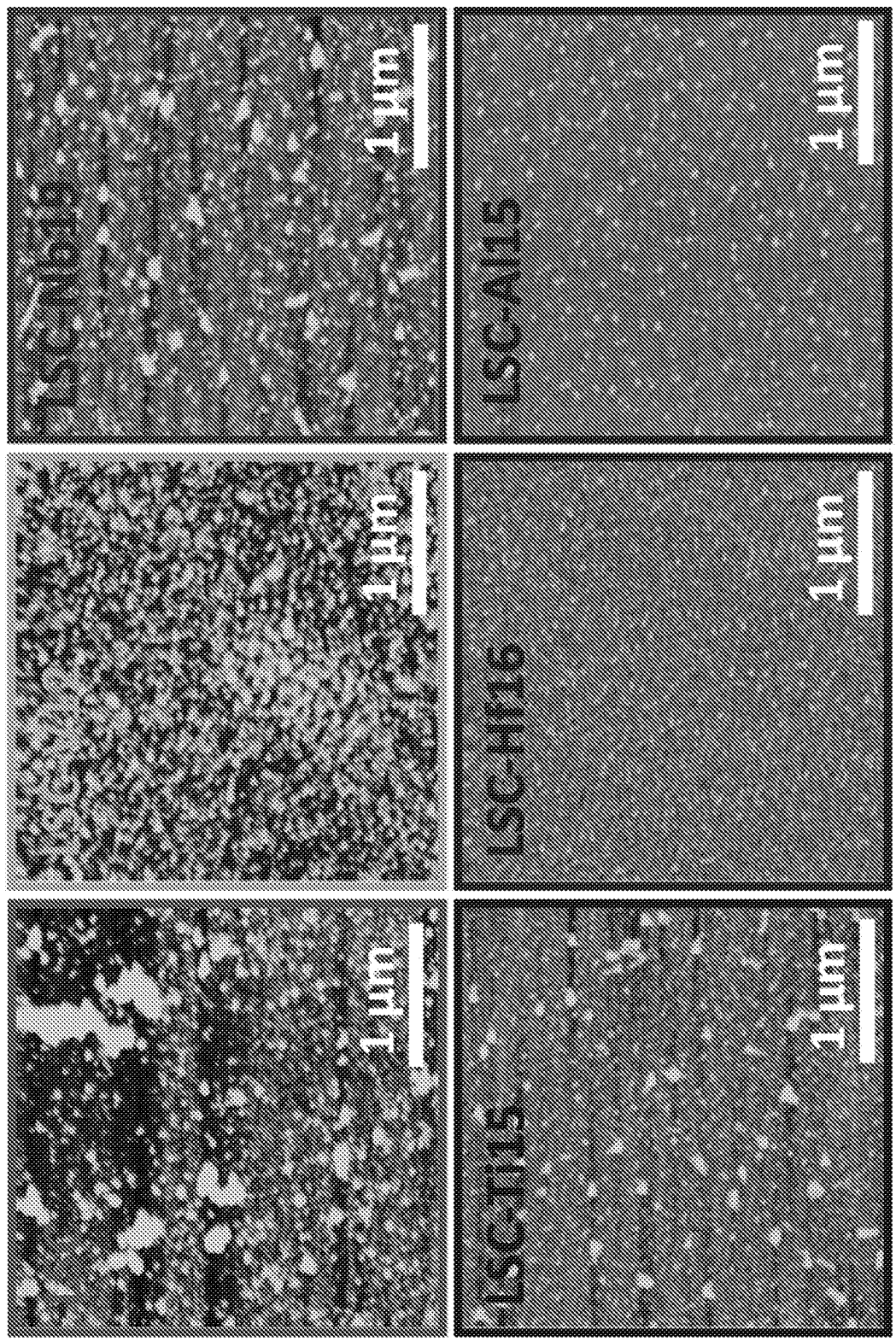

The morphology of the electrochemically tested cathode surfaces, shown in FIG. 13B, indicates the correlation of the electrochemical stability to the surface chemical stability. On the films with fast degradation of $k^q$, i.e., LSC and LSC-V12, a large surface roughness and particle coverage is evident. Electrochemically stable films such as LSC-Ti15, LSC-Al15 and LSC-Hf16 have more stable surface morphology with significantly lower roughness. The previous investigation on the nature of these segregated particles on cobaltites identified them as an insulating SrO-related phase which degrades the surface oxygen exchange (see, Cai, Z., Kubicek, M., Fleig, J. & Yildiz, B. Chemical Heterogeneities on $La_{0.6}Sr_{0.4}CoO_{3-\delta}$ Thin FilmsCorrelations to Cathode Surface Activity and Stability. *Chem. Mater* 24, 1116-1127 (2012), and Chen, Y. et al. Segregated Chemistry and Structure on (001) and (100) Surfaces of $(La_{1-x}Sr_x)_2CoO_4$ Override the Crystal Anisotropy in Oxygen Exchange Kinetics. *Chemistry of Materials* 27, 5436-5450 (2015), each of which is incorporated by reference in its entirety). From these results, it is clear that the addition of the more oxidizable cations prevents the segregation of insulating Sr-rich phases, and improves the electrochemical stability and kinetics significantly (>10x) compared to pristine LSC.

Evolution of Surface Chemical Composition

Figure 21:
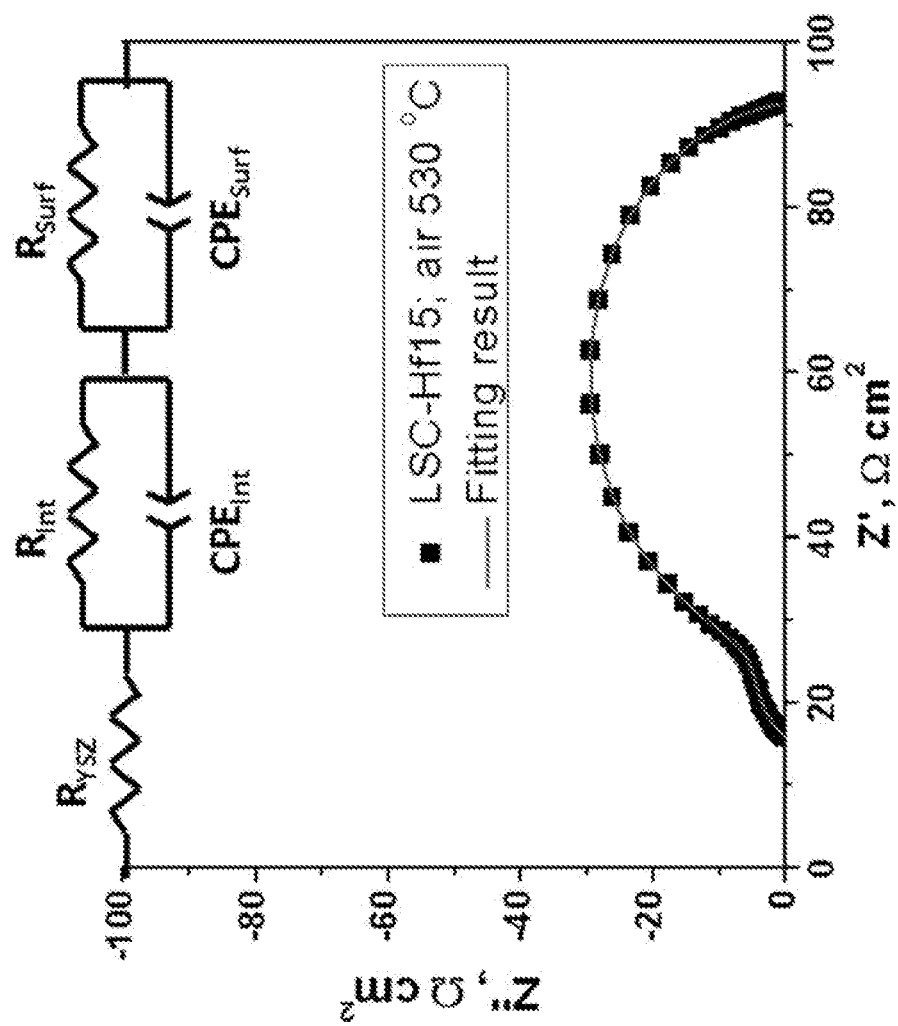
FIG. 21 shows representative electrochemical impedance spectrum of the cell with the LSC-Hf16 thin film electrode at 530° C. in air, and an equivalent circuit used to fit the experimental data.

APXPS on the pristine LSC and the LSC-Ti3, LSC-Ti15, and LSC-Hf16 films provided more detailed assessment of the surface chemical stability. The experiments were conducted in oxygen pressure ($pO_2$) from $10^{-6}$ Torr to 0.76 Torr and up to 550° C. The analysis of the Sr 3d photoelectron spectra allows to quantify the atomic concentration of Sr at the film surface, and also the Sr binding environments in the perovskite lattice and in a non-lattice phase at the surface ($[Sr]_{Lattice}$ and $[Sr]_{Non-lattice}$, respectively) (FIG. 21). See, Crumlin, E. J. et al. Surface strontium enrichment on highly active perovskites for oxygen electrocatalysis in solid oxide fuel cells. *Energy & Environmental Science* 5, 6081-6088 (2012), which is incorporated by reference in its entirety. The chemical composition analysis showed that the total Sr content and the non-lattice Sr concentration is higher on LSC compared to that on LSC-Ti3, LSC-Ti15, and LSC-Hf16. LSC-Ti15 and LSC-Hf16 have significantly more stable surface Sr composition compared to LSC. $[Sr]_{Total}/([Sr]+[La])$ at the film surfaces is shown in FIG. 14A. The LSC-Hf16 and LSC-Ti15 films showed only a small increase in the Sr content up to 550° C. Under the same conditions, $[Sr]_{Total}/([Sr]+[La])$ significantly increased on the bare LSC and on LSC-Ti3. In SI, the environment temperature and oxygen pressure govern the Sr-chemistry evolution shown in FIG. 14, and not temporal variations at each condition (FIG. 23).

Figure 14B:
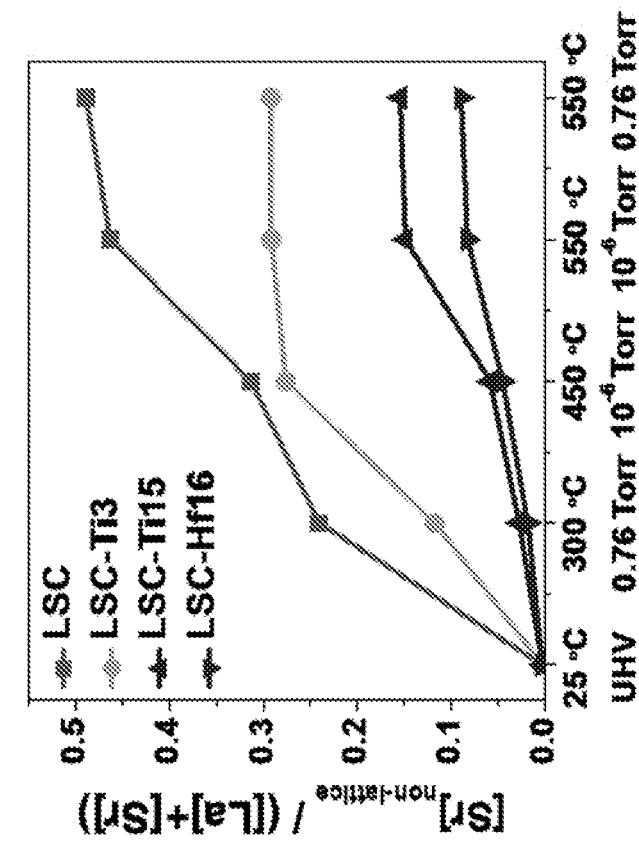
FIGS. 14A-14D show surface chemical stability on LSC dense thin films.
Figure 14A:
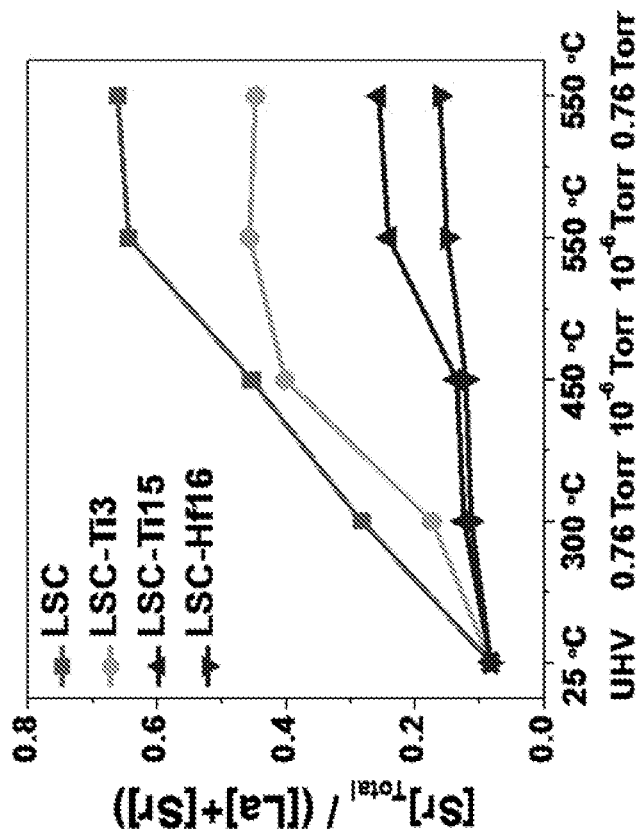
Figure 14C:
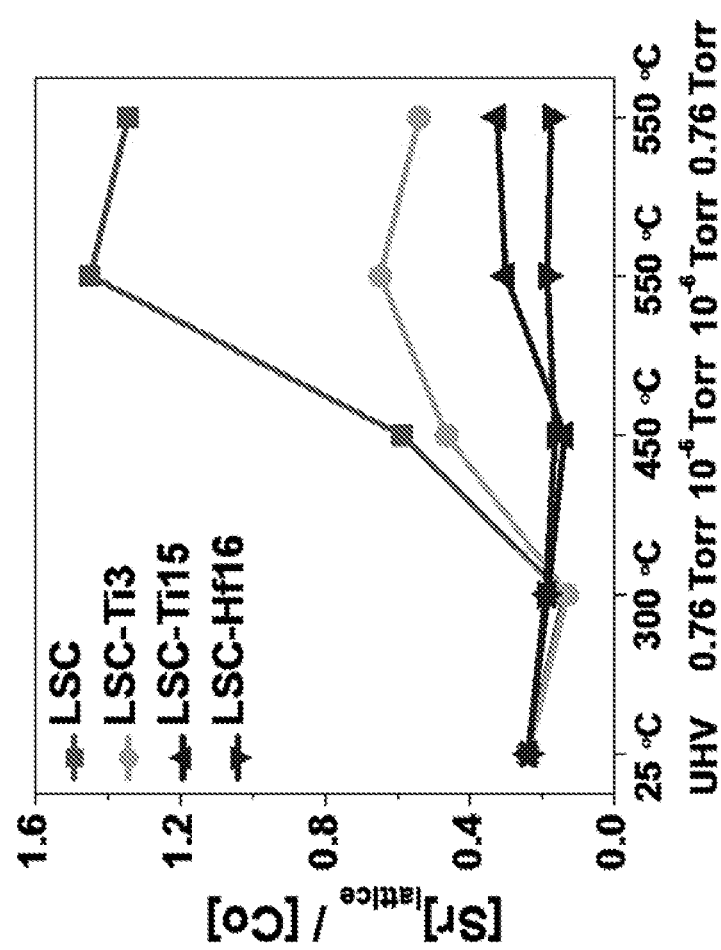
Figure 14D:
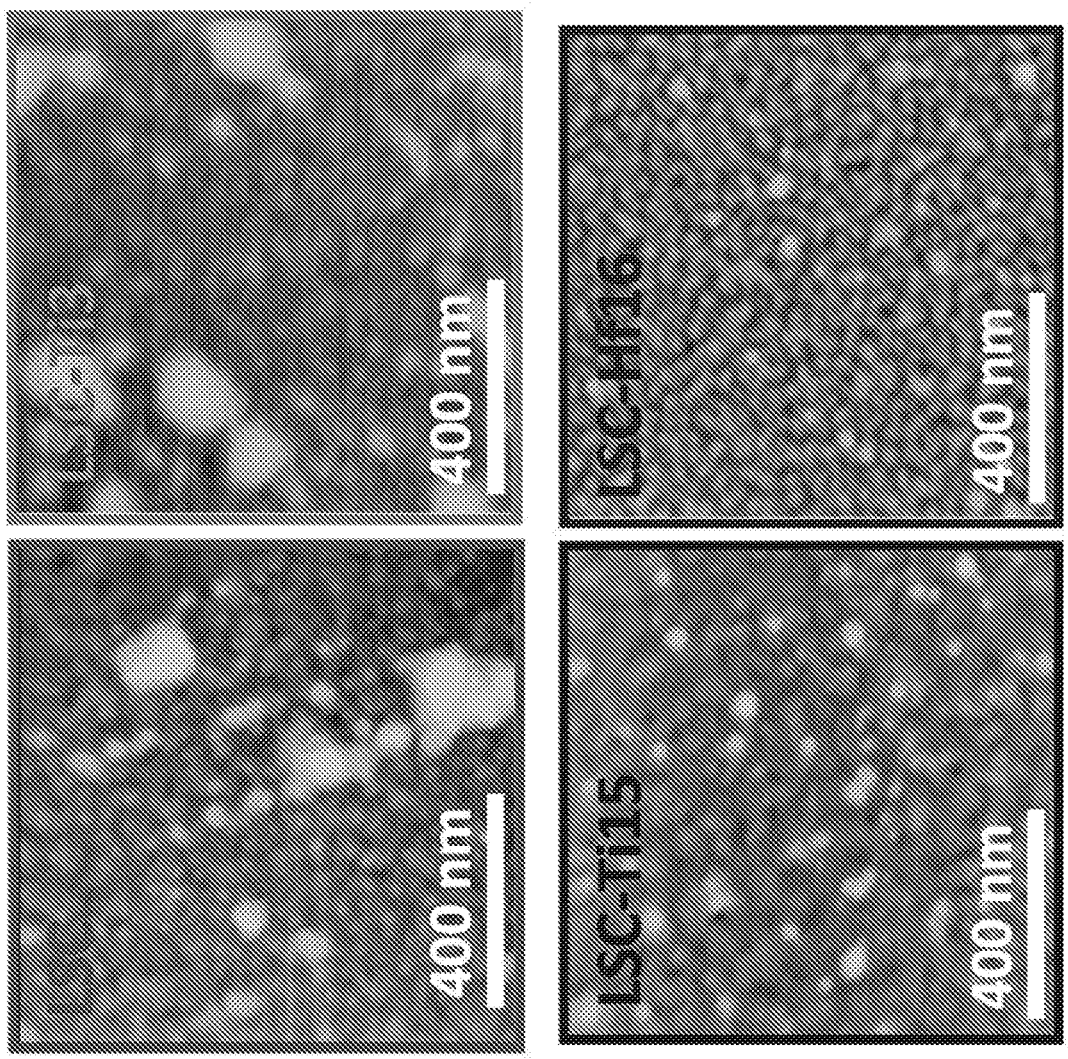

The large amount of $[Sr]_{Non-lattice}$ on the LSC and LSC-Ti3 films (FIG. 14B) are in good agreement with the large coverage of their surface with the segregated particles detected from ex situ AFM (FIGS. 14A-14D). Thus, the $[Sr]_{Non-lattice}$ signal can be reasonably attributed to the signal from SrO-rich phase separated areas of the films. See, Cai, Z., Kubicek, M., Fleig, J. & Yildiz, B. Chemical Heterogeneities on $La_{0.6}Sr_{0.4}CoO_{3-\delta}$ Thin Films—Correlations to Cathode Surface Activity and Stability. *Chem. Mater* 24, 1116-1127 (2012), and Chen, Y. et al. Segregated Chemistry and Structure on (001) and (100) Surfaces of $(La_{1-x}Sr_x)_2CoO_4$ Override the Crystal Anisotropy in Oxygen Exchange Kinetics. *Chemistry of Materials* 27, 5436-5450 (2015), each of which is incorporated by reference in its entirety. The LSC-Hf16 and LSC-Ti15 samples have a significantly smaller amount of $[Sr]_{Non-lattice}$ (FIG. 14B), a much more stable surface chemistry, with relatively very small amount of phase-separated particles at the surface (FIG. 14D). Lastly, it is known that the extent of Sr segregation depends on $pO_2$ (see Lee, W., Han, J. W., Chen, Y, Cai, Z. & Yildiz, B. Cation Size Mismatch and Charge Interactions Drive Dopant Segregation at the Surfaces of Manganite Perovskites. *Journal of the American Chemical Society* 135, 7909-7925 (2013), which is incorporated by reference in its entirety), and the $pO_2$ present in the APXPS and the electrochemical measurements are different. The impact of more oxidizable cation additives on the LSC surface chemical and electrochemical stability follow the same trend (i.e. more stable on LSC-Hf16 and LSC-Ti15) in these two different oxygen pressure environments.

Figure 15B:
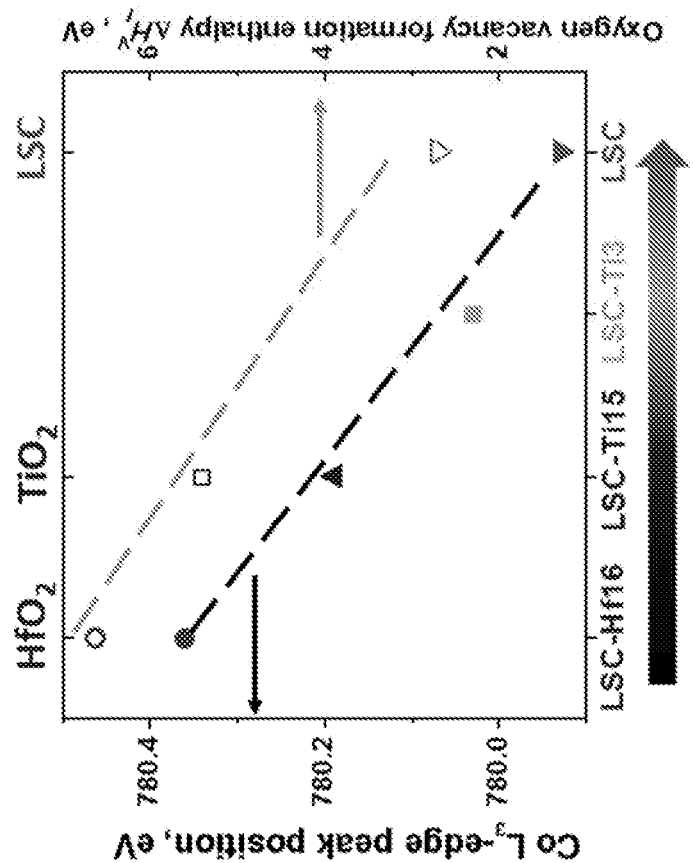
FIGS. 15A-15B show oxidation state of Co based on Co $L_{2,3}$-edge XAS on LSC dense thin films.
Figure 15A:
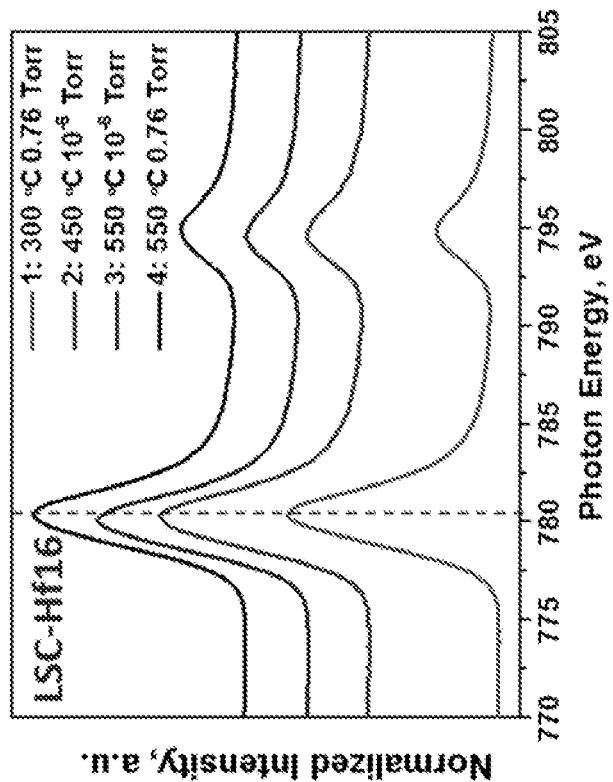
Figure 16A:
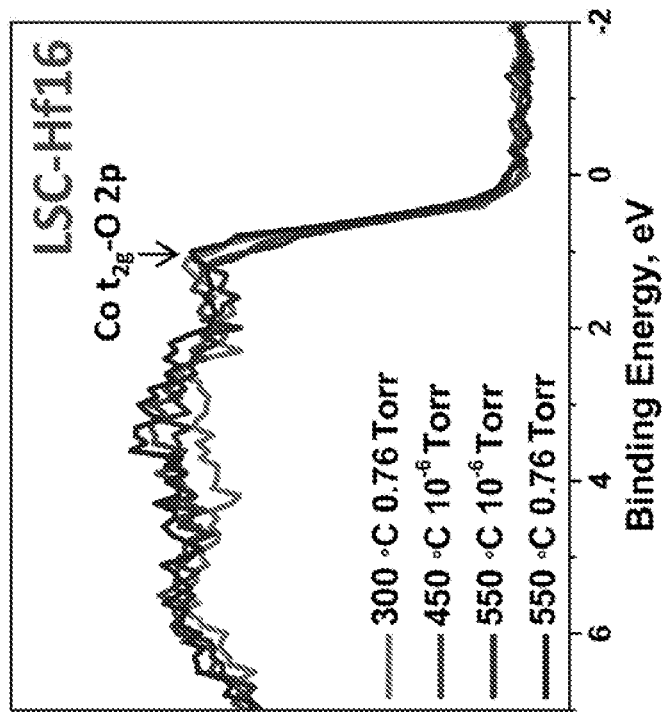
FIGS. 16A-16D show oxidation state on LSC based on valence band and O K-edge.
Figure 16B:
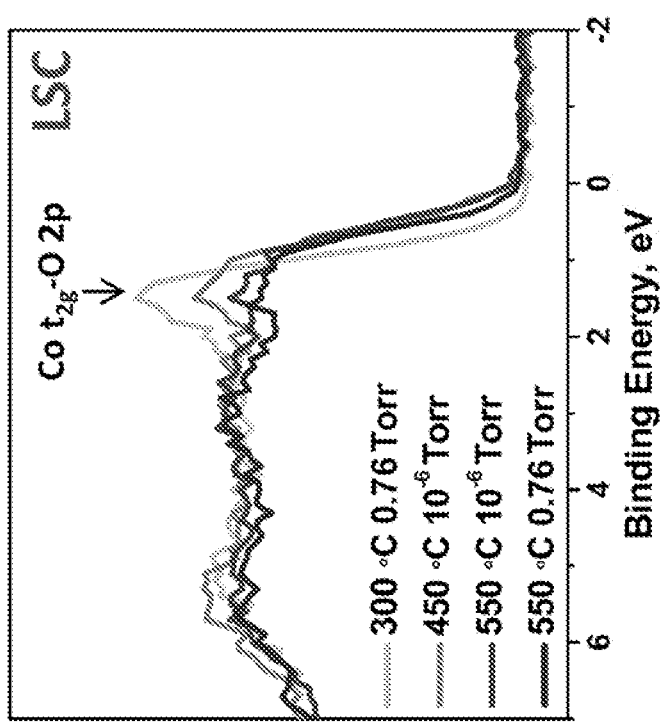

Electronic Structure and Vacancy Concentration on LSC-Me Surfaces Relative to LSC In order to reveal the mechanism for improved LSC surface stability with the more oxidizable cations, the X-ray absorption spectra were measured near the Co $L_{2,3}$ and O K-edges and the valence band (VB) structure, from $10^{-6}$ Torr to 0.76 Torr of $pO_2$ and up to 550° C. The Co $L_{2,3}$-edge spectra recorded at different conditions for the LSC-Hf16 film are given in FIG. 15A as an example. The line marks the Co $L_3$-edge main peak at 300° C. and 0.76 Torr as a reference, to monitor the relative changes in Co oxidation state. Chemical shifts of the Co $L_3$-edge main peak were used for estimating the change in the Co oxidation state. FIG. 15B summarizes the Co $L_3$-edge position on for LSC, LSC-Ti3, LSC-Ti15, and LSCF-Hf16 measured at 300° C., 0.76 Torr. The arrow under the x-axis shows the direction of decreasing Co oxidation state, i.e. increasing oxygen vacancy concentration. The open symbols represent the oxygen vacancy formation enthalpy for binary oxides $HfO_2$, $TiO_2$ and also LSC. The dashed lines in FIG. 15B are a guide to the eye and do not imply a quantitative linearity. The x-axis in FIG. 15B, from left to right, points towards an expected lowering of the oxygen vacancy formation enthalpy, or equivalently an expected increase of the oxygen vacancy concentration (based on the effects of Hf and of Ti at different amounts). The variations of the Co $L_3$-edge positions on these four samples at different conditions are provided in FIGS. 23A-23F. An increase by +1 in the Co valence, for instance, from $Co^{3+}$ to $Co^{4+}$, shifts the $L_3$-edge position by about 1 eV towards higher photon energies. See, K. Katsiev, B. Yildiz, K. Balasubramaniam and P. A. Salvador, *Appl. Phys. Lett.,* 2009, 95, 092106-092103, which is incorporated by reference in its entirety. Comparing the peak positions of Co $L_3$-edge in FIG. 15B, a clear difference in Co valence state among these samples can be seen. At 300° C., 0.76 Torr, the Co oxidation state increases from LSC to LSC-Ti3, LSC-Ti15, and LSC-Hf16 (FIG. 16B). In FIGS. 16A-16B, the arrow indicates the low energy peak which reflects the hybridization of Co $t_{2g}$ states with the O 2p orbital. The greater the intensity of this peak, the more electrons in the $t_{2g}$ states of Co. The shift in $L_3$-edge position by about +0.4 eV should correspond to an increase of the Co oxidation state by about +0.4 on LCS-Hf15 compared to that on LSC. See, K. Katsiev, B. Yildiz, K. Balasubramaniam and P. A. Salvador, *Appl. Phys. Lett.,* 2009, 95, 092106-092103, which is incorporated by reference in its entirety. This trend, at a first glance, is contrary to the fact that $Ti^{4+}$ and $Hf^{4+}$ are electron donors, assuming that these cations occupy the $Co^{3+}$ positions in the perovskite structure. Therefore, the large difference between the $L_3$-edge positions of the unmodified LSC and the LSC-Hf16 can only be rationalized by a difference in the oxygen vacancy concentration. That is, Hf at the surface decreases the oxygen vacancy concentration, leading to an effectively higher oxidation state of Co. This resulting trend matches exactly what was expected based on the oxygen vacancy formation enthalpies in $HfO_2$, $TiO_2$, and LSC, also shown in FIG. 15B. Increasing Co oxidation state (i.e. decreasing surface oxygen vacancy concentration) matches the trend of increasing enthalpy of oxygen vacancy formation, $\Delta H_f^V$, of the binary oxides and that of LSC, such that $\Delta H_f^V(HfO_2) > \Delta H_f^V(TiO_2) > \Delta H_f^V(LSC)$.

The possibility that the different oxidation states from LSC to LSC-Hf16 are caused by different levels of Sr doping was excluded, as discussed based on AP-XPS results (FIGS. 23A-23F). It is worth to note that the comparison of the Co $L_3$-edge among the samples was limited to the condition at 300° C., 0.76 Torr, prior to significant Sr segregation on LSC and LSC-Ti3 (FIGS. 23A-23F). The AP-XAS results were also supported by measuring the Co 2p core level spectrum by laboratory X-ray source in ultra-high vacuum at ~$10^{-9}$ Torr. Co was more difficult to reduce on the LSC modified by Nb, Ti, Zr, Hf, and Al, and easier to reduce on the LSC modified by V (FIGS. 23A-23F).

The evolution of the valence band (VB) as well as the O K-edge spectra also support a more oxidized surface when LSC is modified by Hf and Ti, consistent with the Co $L_{2,3}$-edge XAS above. The VB spectra of LSC and LSC-Hf16 films at different conditions are shown in FIGS. 16A and 16B. For the LSC, the intense peak located at around 1.5 eV at 300° C. arises from the Co $t_{2g}$ states hybridized with the O 2p states. See, Mizokawa, T. et al. Photoemission and x-ray-absorption study of misfit-layered (Bi,Pb)—Sr—Co—O compounds: Electronic structure of a hole-doped Co—O triangular lattice. *Physical Review B* 64, 115104 (2001), which is incorporated by reference in its entirety. On the other hand, on LSC-Hf16, this peak was absent at the same condition. The intensity of this peak is tied to the number of electrons at the Co $t_{2g}$ orbital, and provides information on the Co oxidation state. Therefore, the absence of this peak on LSC-Hf16 indicates that Co is more oxidized than on LSC, in line with the Co L-edge XAS results.

Figure 16D:
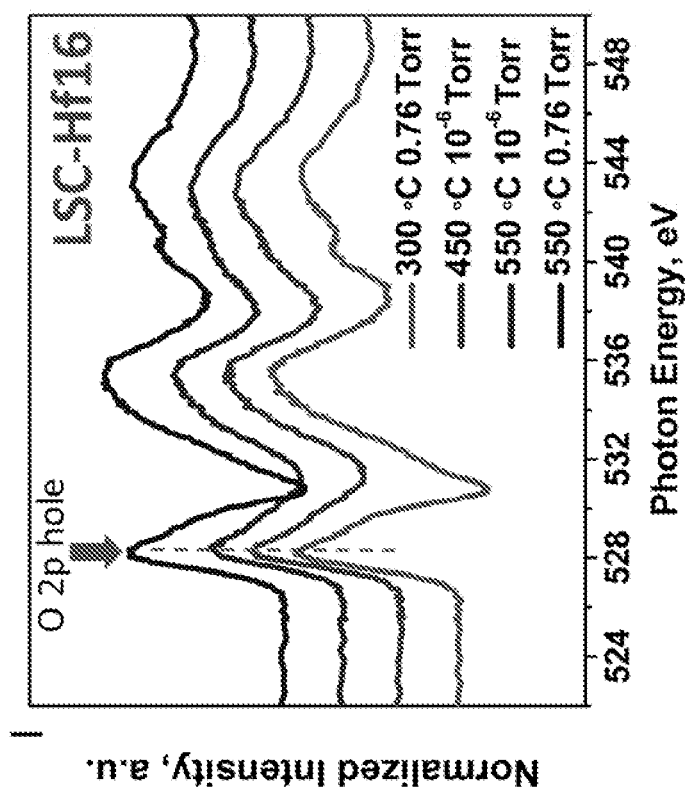
Figure 16C:
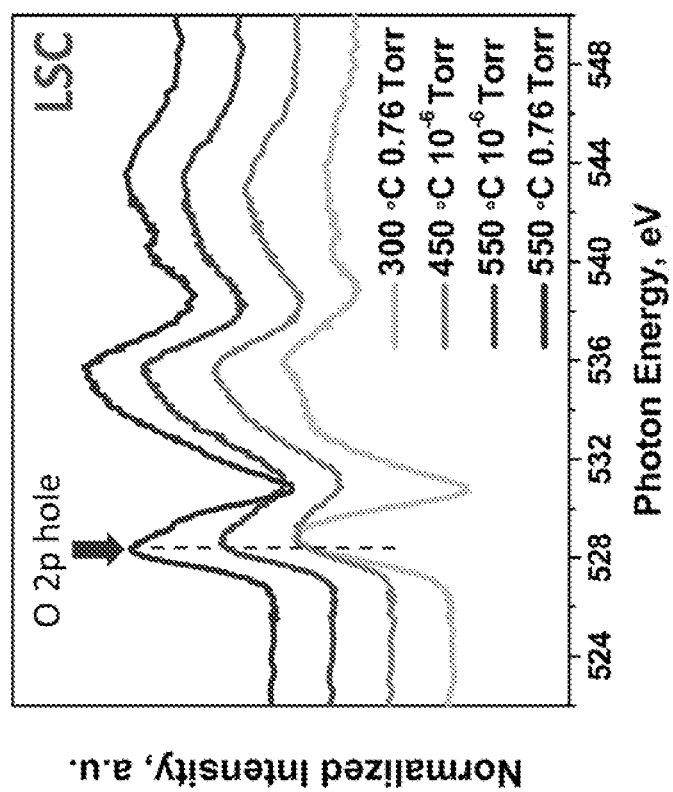

FIGS. 16C and 16D summarize the evolution of the O K-edge spectra on LSC and LSC-Hf16 films. The dashed lines in each plot mark the position of the O 2p ligand hole peak. The presence of this peak indicates p-type doping and therefore an increased Co oxidation state, as seen on LSC-Ti15 and LSC-Hf16. In line with the unchanged valence band structure (FIG. 16B), the O K-edge spectra on LSC-Hf16 remained unaltered throughout the measurements. A sharp pre-edge peak at around 528 eV (shown by the arrows in FIG. 16D) indicates the existence of O 2p ligand holes on LSC-Hf16. See, Moodenbaugh, a. et al. Hole-state density of $La_{1-x}Sr_xCoO_{3-\delta}$ (0~x~0.5) across the insulator/metal phase boundary. *Physical Review B* 61, 5666-5671 (2000), which is incorporated by reference in its entirety. In contrast, this peak was absent on LSC at 300° C. and $pO_2$ of 0.76 Torr. The presence of this peak indicates increased p-type doping and a more oxidized Co on LSC-Hf16 compared to that on LSC.

Figure 24:
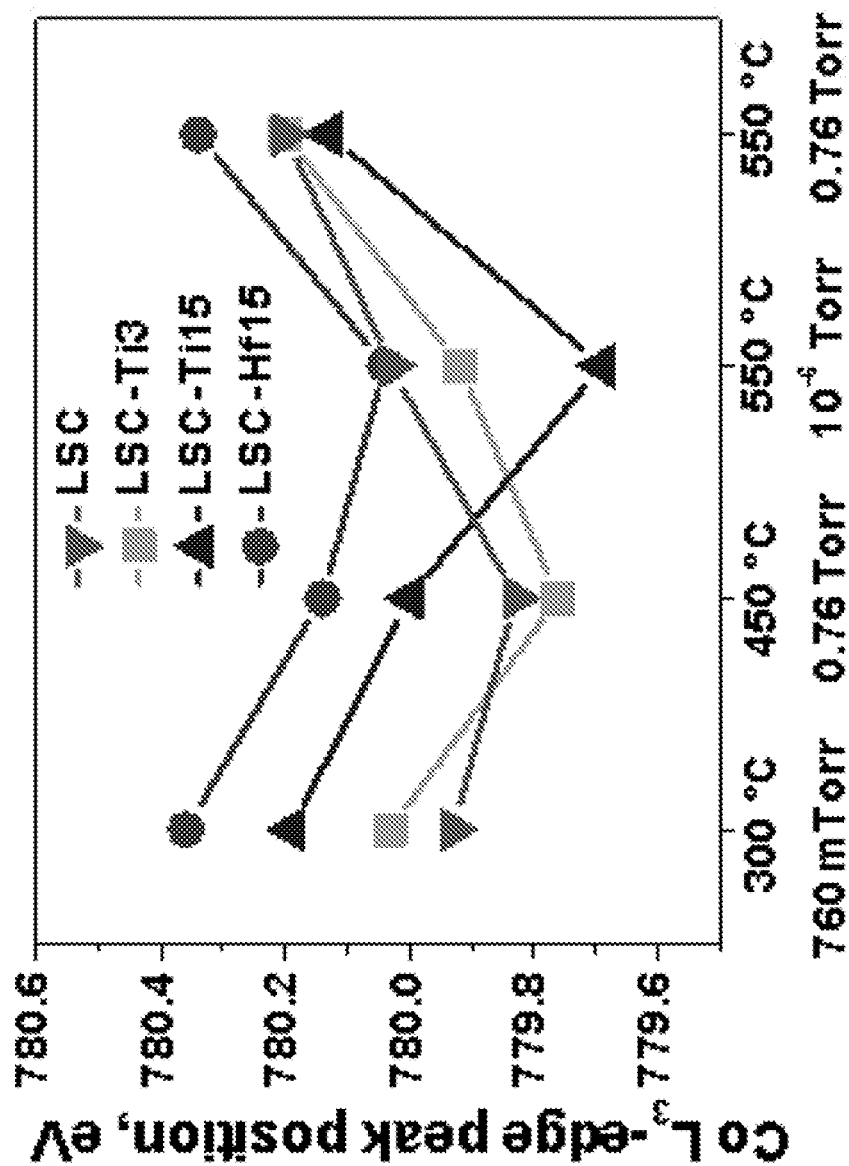
FIG. 24 shows the Co $L_3$-edge peak position measured at 300° C., 0.76 Torr for LSC, LSC-Ti3, LSC-Ti15 and LSC-Hf15.
Figures 25A, 25B:
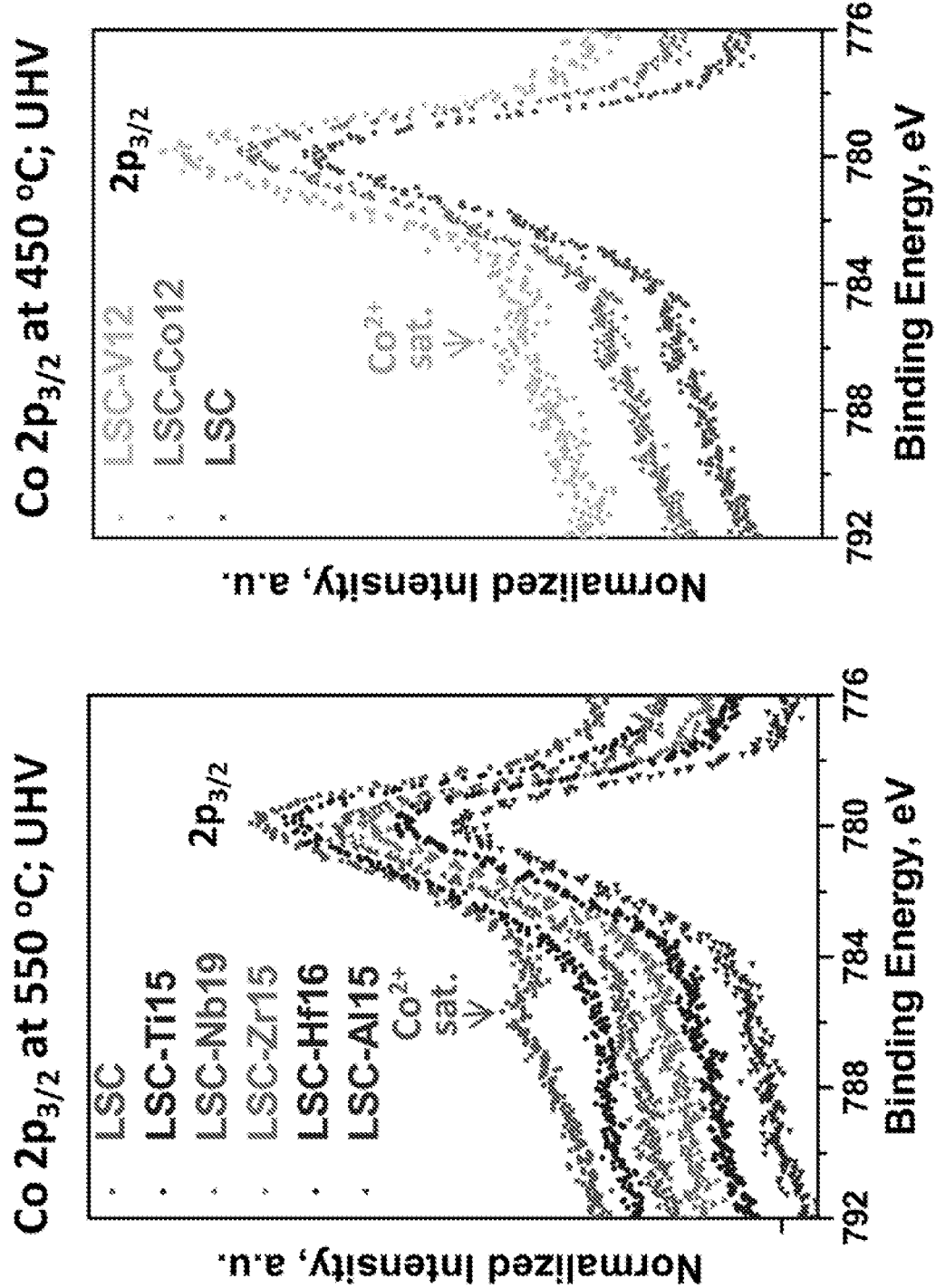
FIGS. 25A-25B show Co 2p photoelectron spectra on LSC and LSC-Me films recorded at 550° C.
Figure 26B:
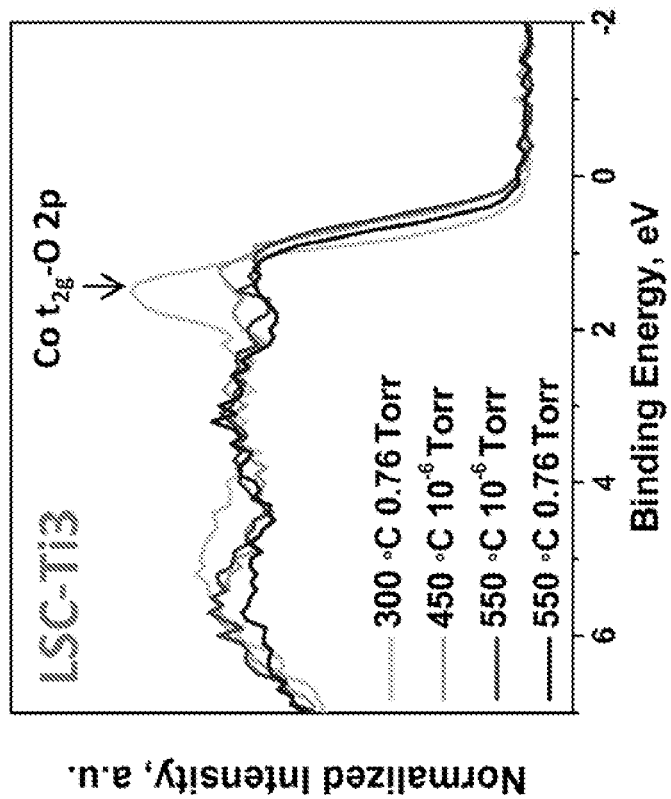
FIGS. 26A-26D show evolution of the valence band structure from X-ray photoelectron spectra measured in situ on LSC (FIG. 26A), LSC-Ti3 (FIG. 26B), LSC-Ti15 (FIG. 26C), and LSC-Hf16 (FIG. 26D).
Figure 26A:
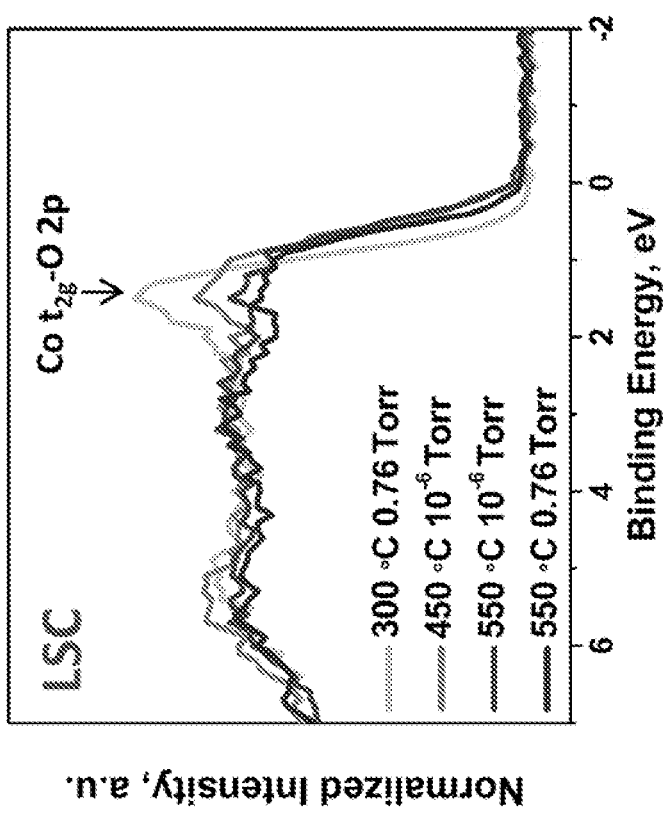
Figure 26D:
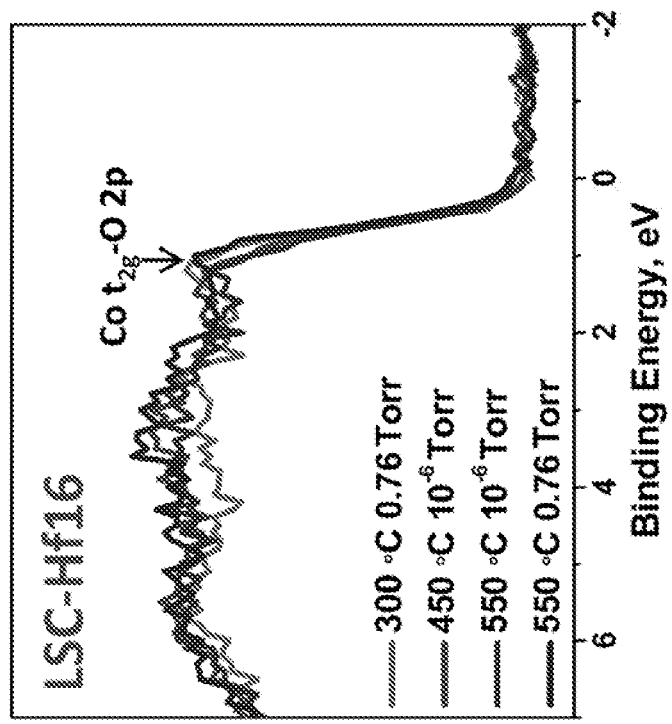
Figure 26C:
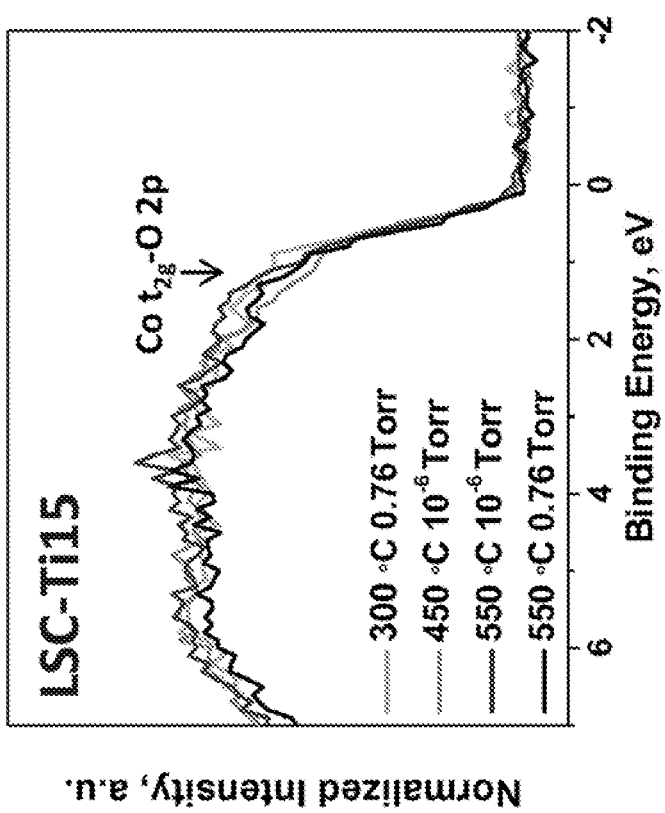
Figure 27B:
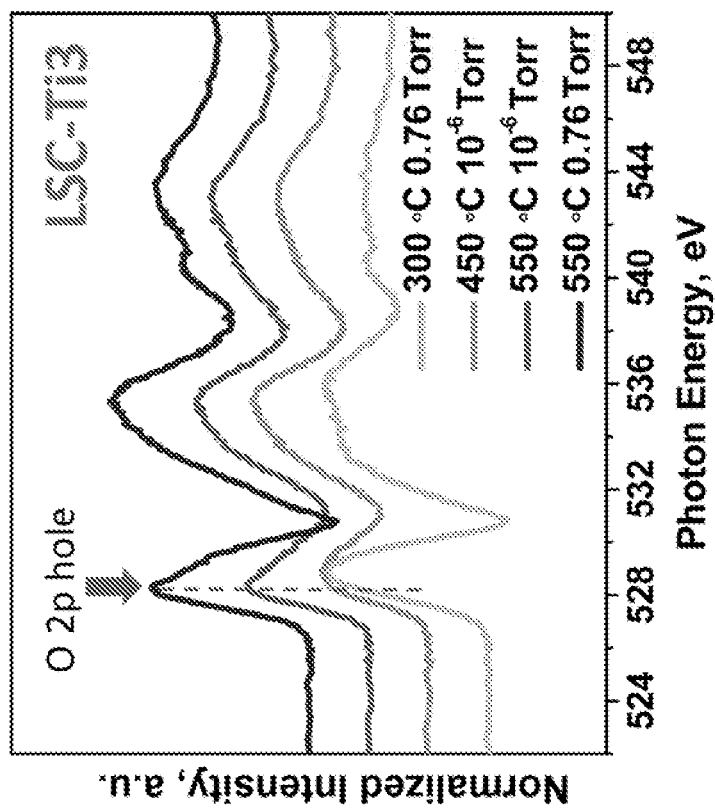
FIGS. 27A-27D show O K-edge spectra of LSC (FIG. 27A), LSC-Ti3 (FIG. 27B), LSC-Ti15 (FIG. 27C), and LSC-Hf16 (FIG. 27D) films at different temperatures and oxygen partial pressures.
Figure 27A:
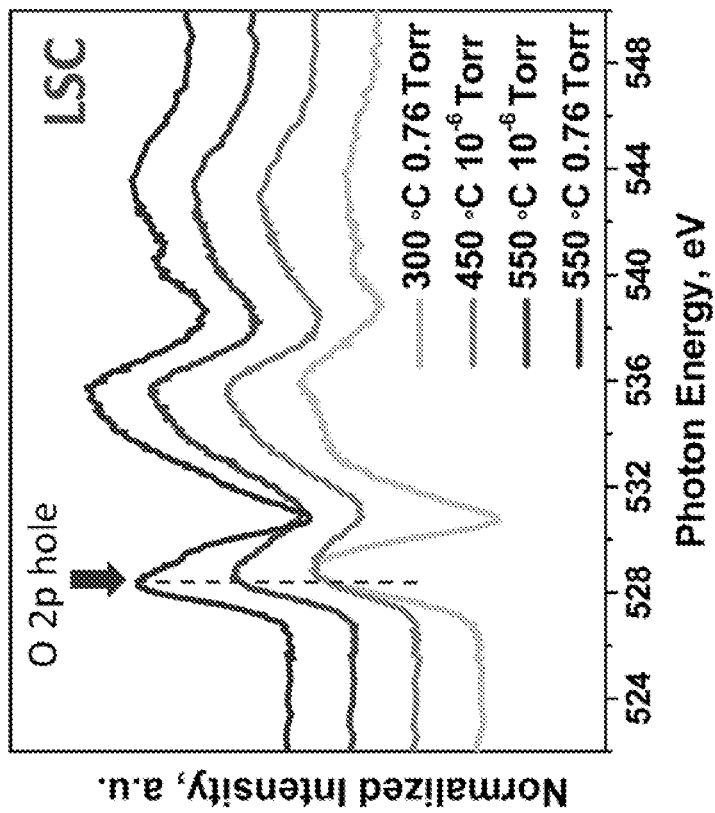
Figure 27D:
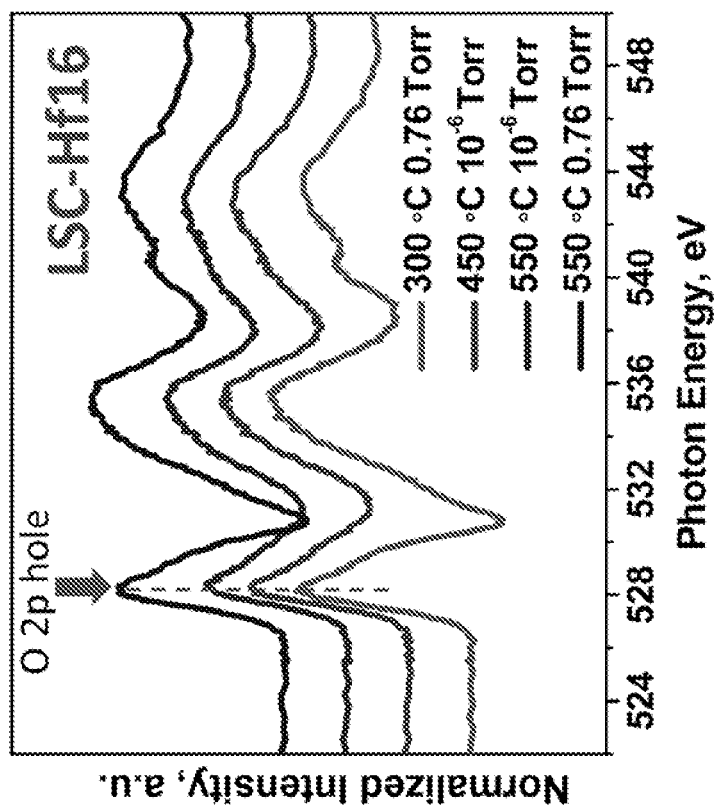
Figure 27C:
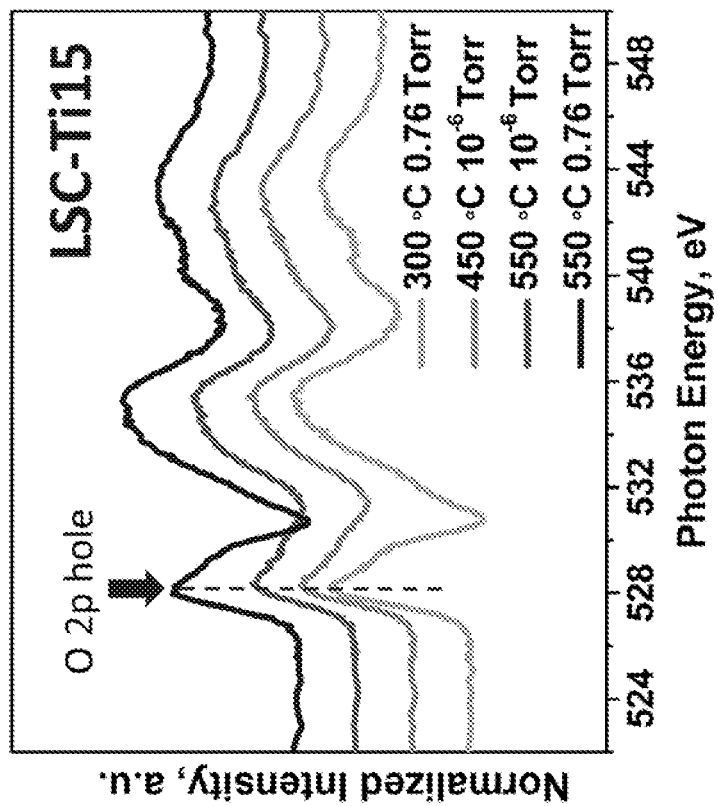

The VB and the O K-edge spectra for LSC film surfaces modified by different amounts of Ti are shown in FIGS. 24 and 25A-25B. The evolution of VB and O K-edge on LSC-Ti3 were essentially similar to those of LSC. With a higher concentration of Ti as on LSC-Ti15, the spectra were similar to those of LSC-Hf indicating also a more oxidized Co valence at the surface.

At 450-550° C., the VB as well as O K-edge XAS of LSC and LSC-Hf16 become similar, with the disappearance of the Co $t_{2g}$-O 2p peak on LSC, as well as the appearance of the ligand hole pre-edge peak on LSC. The variations of the $[Sr]_{Lattice}$ as a function of temperature can explain this behavior. Raising the temperature up to 450-550° C. substantially increases the $[Sr]_{Lattice}/[Co]$ (FIG. 14C) on LSC and LSC-Ti3. The larger Sr doping level in the near-surface region is charge compensated by Co becoming more oxidized. This decreases the intensity of Co $t_{2g}$-O 2p peak in the VB and forms the O 2p ligand hole peak in the O K-edge spectra on LSC and LSC-Ti3 at 450-550° C. As a result, at 300° C. the difference in the VB and O K-edge among the samples is mainly due to a difference in oxygen vacancy concentrations. On the other hand, at 450-550° C. the enrichment of $[Sr]_{Lattice}$ near the surface of LSC governs the evolution of the VB and the O K-edge spectra.

Bonding Environment of the Surface Additive Cations

Figure 17:
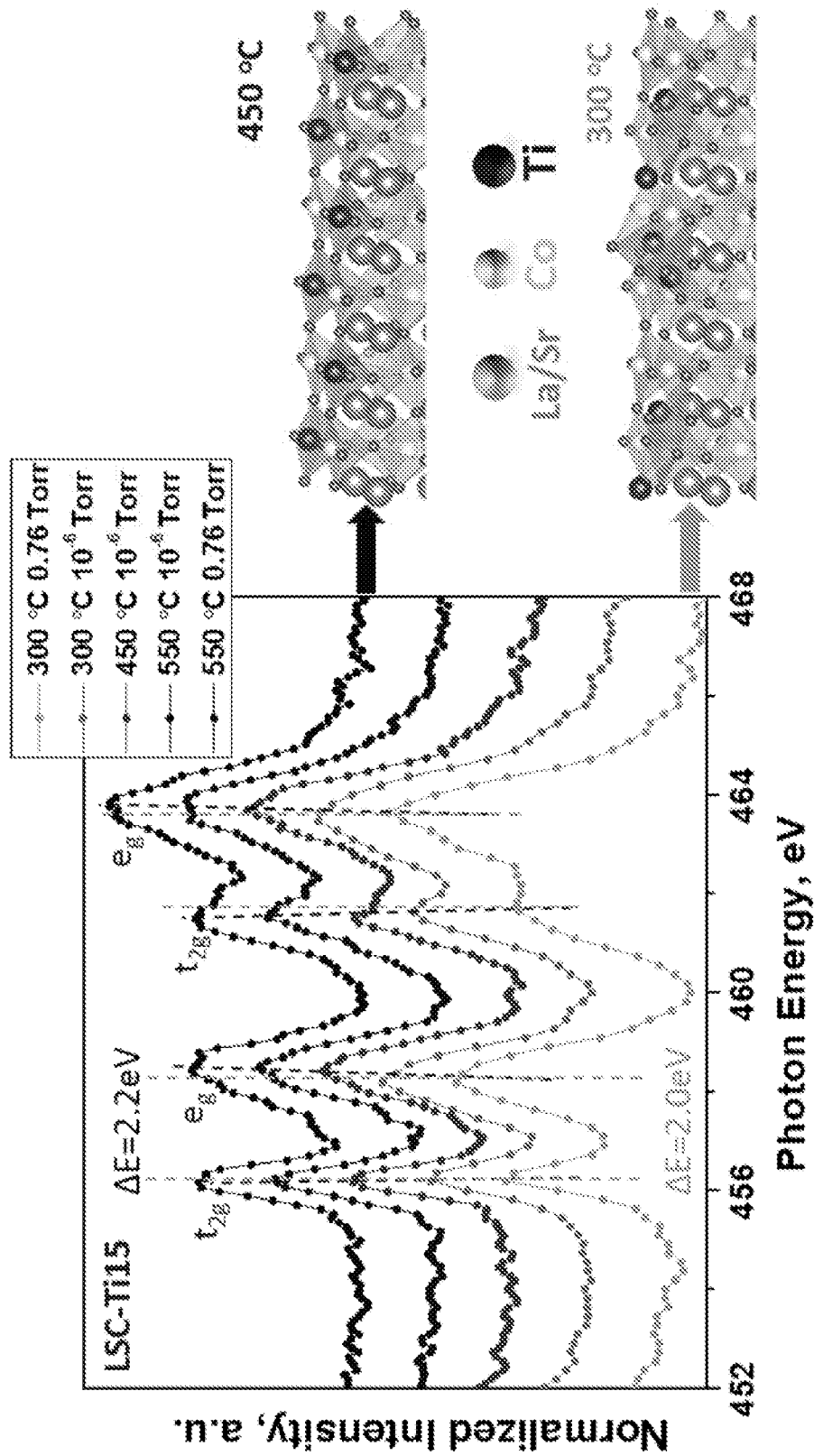
FIG. 17 shows coordination environment of Ti on LSC-Ti15.

AP-XAS also allow for extracting the local bonding environment of the cations added onto the LSC surfaces. FIG. 17 shows the Ti $L_{2,3}$-edge on LSC-Ti15 under different measurement conditions. Ti $L_{2,3}$-edge X-ray absorption spectra under different measurement conditions. The dashed lines mark the separation of $t_{2g}$ and $e_g$ peaks in both the $L_2$ and the $L_3$ edges. Schematic representation of the evolution of the Ti coordination at the LSC surface, from disordered at 300° C. to perovskite coordination of Ti atoms at the B-site of LSC at 450-550° C. (visualized using the VESTA software; see, Momma, K. & Izumi, F. VESTA 3 for three-dimensional visualization of crystal, volumetric and morphology data. *Journal of Applied Crystallography* 44, 1272-1276 (2011), which is incorporated by reference in its entirety).

Each $L_{2,3}$-edge shows two peaks due to the crystal field splitting ($t_{2g}$ and $e_g$ states). Comparing the Ti $L_{2,3}$-edge XAS with the spectra reported in literature on $TiO_2$ and $SrTiO_3$ (FIGS. 26A-26D) (see, Thomas, A. G. et al. Comparison of the electronic structure of anatase and rutile $TiO_2$ single-crystal surfaces using resonant photoemission and x-ray absorption spectroscopy. *Physical Review B* 75, 035105 (2007), and van der Laan, G. Polaronic satellites in x-ray-absorption spectra. *Physical Review B* 41, 12366-12368 (1990), each of which is incorporated by reference in its entirety), the deposited Ti cations on LSC are not coordinated as in $TiO_2$. Rather, the spectra shape indicates that Ti sits in an octahedral crystal field similar to that of perovskite $SrTiO_3$, schematically shown in FIG. 17. This suggests that the Ti cations possibly occupy Co sites in the perovskite lattice of LSC at the surface. By occupying the B-sites in the perovskite, the presence of Ti on LSC can largely change the electronic structure and the oxygen vacancy formation energy of LSC.

Hf, Zr or Nb could not be examined by XAS due to the photon energy of the experiment beamline being limited to 900 eV. Nevertheless, it is known that all of these tested cations can occupy B-sites in perovskite oxides[39-42]. See, Abbate, M. et al. Electronic structure and spin-state transition of $LaCoO_3$. *Physical Review B* 47, 16124-16130 (1993), Copie, O. et al. Structural and magnetic properties of Co-doped $(La,Sr)TiO_3$ epitaxial thin films probed using x-ray magnetic circular dichroism. *Journal of Physics: Condensed Matter* 21, 406001 (2009), Fabricius, G. et al. Electronic structure of cubic $SrHfO_3$: Ferroelectric stability and detailed comparison with $SrTiO_3$. *Physical Review B* 55, 164-168 (1997), and Lee, J. et al. Imprint and oxygen deficiency in $(Pb,La)(Zr,Ti)O_3$ thin film capacitors with La—Sr—Co—O electrodes. *Applied Physics Letters* 66, 1337-1339 (1995), each of which is incorporated by reference in its entirety. FIGS. 27A-27D shows that similar perovskite-like bonding environments can be obtained also for these transition metal cations. Their presence as dopants into the Co-site of LSC alters the oxygen vacancy formation energy at LSC surface because the bonding between the added metal cations and oxygen is much stronger than the Co—O bonds. The dashed lines in each plot mark the position of the O 2p ligand hole peak. The presence of this peak indicates p-type doping and therefore an increased Co oxidation state, as seen on LSC-Ti15 and LSC-Hf16.

General Effect of the Surface Additive Cations on the Sr Segregation and ORR Kinetics The effect of the more oxidizable additive cations on Sr segregation is summarized herein. Upon incorporation into the perovskite lattice at the surface, the more oxidizable cations, $Me_{Co}^{\bullet}$, can impact the LSC electronic structure and stability in three possible ways: i) $Me_{Co}^{\bullet}$ decreases the surface $V_{\ddot{O}}$ concentration (and lead to a more oxidized Co), and thus, suppress the electrostatic attraction of $Sr_{La}'$ toward the surface, ii) $Me_{Co}^{\bullet}$ provides donor doping and decreases the Co oxidation state, or iii) $Me_{Co}^{\bullet}$ attracts $Sr_{La}'$ toward the surface because of their own positive charge. Based on the obtained in situ XPS and XAS data above, ii) and iii) are not evident, while a more oxidized Co is dominant (i.e., outcome i) as shown in FIGS. 15A-15B and 16A-16D. This proves that the most likely main effect of the surface doping is to decrease the surface $V_O^{\bullet\bullet}$ concentration (and thus the positive charge) and to relieve the electrostatic attraction of $Sr_{La}'$ toward the surface, thereby suppressing the phase-separation of Sr-rich particles (FIGS. 13A-13B and 14A-14D).

Figure 18:
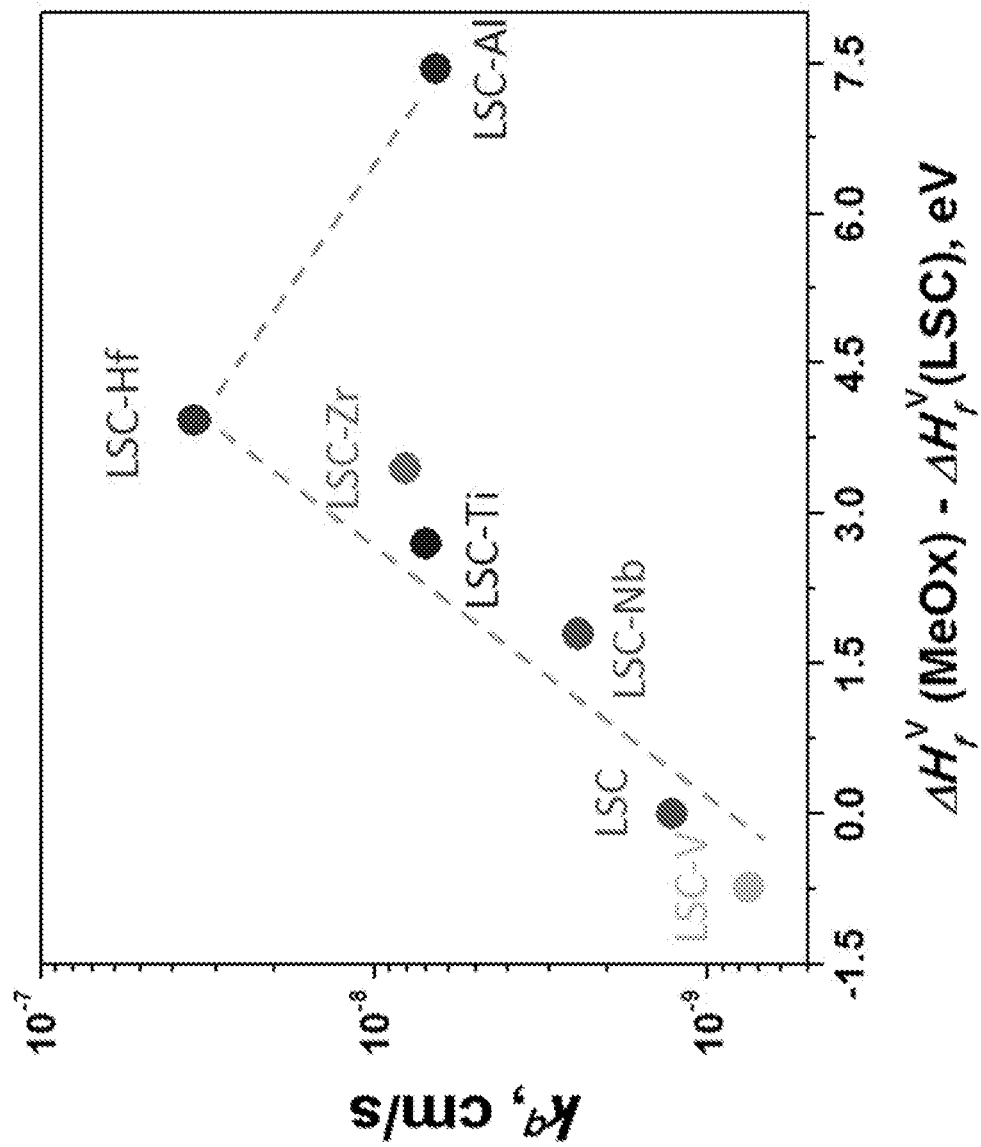
FIG. 18 shows dependence of oxygen surface exchange kinetics on the reducibility of the LSC surface.

It is intriguing to observe that faster and more stable oxygen exchange kinetics was achieved with a decreased oxygen vacancy concentration on LSC. This finding is shown explicitly by the volcano-like dependence of the oxygen exchange kinetic coefficient, $k^q$, on the difference between the enthalpy of oxygen vacancy formation in the corresponding binary oxide (i.e. $MeO_x$) and that in LSC (FIG. 18). The oxygen surface exchange kinetics of LSC-Me, represented by the kinetic coefficient $k^q$, exhibit a volcano-like dependence on the enthalpy of oxygen vacancy formation ($\Delta H_f^V$) in the binary oxides, $MeO_x$. The x-axis is the difference between the $\Delta H_f^V$ of the binary oxides (i.e. $V_2O_5$, $Nb_2O_5$, $TiO_2$, $ZrO_2$, $HfO_2$, and $Al_2O_3$, data from literature) and that of LSC. The y-axis shows the oxygen exchange coefficient, $k^q$, on LSC-Me, where the surface Me concentrations are within 12-19%, measured after 27 hours of testing at 550° C. in air. The dashed line is a guide for the eye only. Based on this plot, $\Delta H_f^V$ of binary oxides $MeO_x$ is proposed as a descriptor for the stability of oxygen exchange or ORR kinetics on LSC-Me. As shown in FIG. 18, $k^q$ increases with increasing $\Delta H_f^V(MeO_x)$, reaching peak at LSC-Hf among the tested compositions here. Further increase of $\Delta H_f^V(MeO_x)$ leads to a slower ORR kinetics. The increase in $k^q$ with increasing $\Delta H_f^V(MeO_x)$ is attributed to the decreased surface oxygen vacancy concentration that reduces the electrostatic attraction of Sr and stabilizes the surface cation composition. Further increase of oxygen vacancy formation enthalpy by adding Al onto the surface did not lead to faster ORR kinetics, likely because of a too low surface oxygen vacancy concentration, although it did improve the surface composition stability as shown in FIG. 13B. This volcano plot, to some extent, challenges the well-accepted knowledge that a high oxygen vacancy concentration is desirable in facilitating oxygen exchange kinetics on transition metal oxides. See, Kuklj a, M. M., Kotomin, E. A., Merkle, R., Mastrikov, Y. A. & Maier, J. Combined theoretical and experimental analysis of processes determining cathode performance in solid oxide fuel cells. *Physical Chemistry Chemical Physics* 15, 5443-5471 (2013), Bikondoa, O. et al. Direct visualization of defect-mediated dissociation of water on $TiO_2(110)$. *Nat Mater* 5, 189-192 (2006), Diebold, U. The surface science of titanium dioxide. *Surface Science Reports* 48, 53-229 (2003), Schaub, R. et al. Oxygen Vacancies as Active Sites for Water Dissociation on Rutile $TiO_2$. *Physical Review Letters* 87, 266104 (2001), and Ganduglia-Pirovano, M. V, Hofmann, A. & Sauer, J. Oxygen vacancies in transition metal and rare earth oxides: Current state of understanding and remaining challenges. *Surface Science Reports* 62, 219-270 (2007), each of which is incorporated by reference in its entirety. It is true that oxygen vacancies do facilitate reactions with oxygen molecules by providing the necessary reaction sites. However, they also drive the detrimental Sr segregation process which slows down the ORR kinetics. The same concept is applicable not only to LSC but also to other state-of-the-art perovskite oxide catalysts, such as LSCF and BSCF.

Parameters the Chemical Bath Deposition of the Additive Cations at LSC Surface

Additive cations were deposited from the aqueous solution of the metal chlorides at the conditions shown in Table 2. All chlorides (reagent grade purity) were purchased from Sigma Aldrich. The chemical composition at the surface of the as-fabricated LSC and LSC-Me films was examined using X-ray photoelectron spectroscopy. For the LSC whose surface was not modified by the metal chloride solution, the excess Sr-rich layer that forms during PLD was removed by treating the films in dilute HCl solution. See, Cai, Z., Kubicek, M., Fleig, J. & Yildiz, B. Chemical Heterogeneities on $La_{0.6}Sr_{0.4}CoO_{3-\delta}$ Thin Films—Correlations to Cathode Surface Activity and Stability. *Chem. Mater.* 24, 1116-1127 (2012), Jung, W. & Tuller, H. L. Investigation of surface Sr segregation in model thin film solid oxide fuel cell perovskite electrodes. *Energy Environ. Sci.* 5, 5370-5378 (2012), and Kubicek, M., Limbeck, A., Fromling, T., Hutter, H. & Fleig, J. Relationship between Cation Segregation and the Electrochemical Oxygen Reduction Kinetics of $La_{0.6}Sr_{0.4}CoO_{3-\delta}$ Thin Film Electrodes. *Journal of the Electrochemical Society* 158, B727-B734 (2011), each of which is incorporated by reference in its entirety. Because the metal chloride solution also etches the Sr-rich surface layer, removing the Sr-segregated layer on LSC by dilute HCl provides a consistent comparison among these samples.

The additive cation content (Me/(La+Sr+Co+Me) ratio) of 12-19% was chosen based on the results of Example I. In Example I, using Ti as an example, it was shown that smaller, than 10% of additive cation content (for 20° take-off angle in XPS measurements) cannot efficiently prevent LSC degradation during electrochemical testing at 420° C. and above due to probably and insufficient surface coverage with Ti. At the same time, higher than 20%, additive cation content results in the agglomeration of the deposited Ti in the form of oxide nanoparticles which cannot prevent LSC degradation at elevated temperatures.

TABLE 2

Deposition condition for chemical bath

| Sample | Reagent | Molar concentration, mM | Temperature, ° C. | Time, s |
| --- | --- | --- | --- | --- |
| LSC | HCl | 100 | 25 | 10 |
| LSC-V12 | $VCl_3$ | 100 | 80 | 120 |
| LSC-Co12 | $CoCl_2$ | 50 | 80 | 120 |
| LSC-Ti15 | $TiCl_4$ | 3 | 25 | 20 |
| LSC-Nb19 | $NbCl_5$ | 5 | 80 | 20 |
| LSC-Zr15 | $ZrCl_4$ | 20 | 80 | 120 |
| LSC-Hf16 | $HfCl_4$ | 5 | 25 | 30 |
| LSC-Al15 | $AlCl_3$ | 100 | 80 | 20 |

The LSC films reported here are not contaminated by chloride and thus their bulk or properties should not be affected by chloride that might have been left on the surface during the surface modification procedure. Chloride precursors are widely used in spray pyrolysis to deposit thin oxide films, and the presence and complicated effects of chloride in such oxide films have been reported. See, Rupp, J. L. M., Drobek, T., Rossi, A. & Gauckler, L. J. Chemical Analysis of Spray Pyrolysis Gadolinia-Doped Ceria Electrolyte Thin Films for Solid Oxide Fuel Cells. Chemistry of Materials 19, 1134-1142 (2007), which is incorporated by reference in its entirety. However, this approach of making the LSC films does not involve the pyrolysis step on a hot surface. The LSC films are made by pulsed laser deposition (PLD), a route that yields highly clean and controllable compositions. Instead, the very top surface layer of the LSC films was process via a wet-chemical reaction at 25-80° C. The LSC thin films were dipped into dilute metal chloride solution, and during this process cation exchange/deposition occurs, which results in a thin sub-monolayer coverage by these additive cations. The temperature for this reaction is varied within 25-80° C. just to tune the kinetics of the reaction to obtain the targeted additive cation (Hf, Ti, Zr etc.) concentration at LSC surfaces. At these low temperatures, chloride ions cannot diffuse and penetrate into the solid state LSC films. Then deionized water was used to wash off the remaining chloride salt thoroughly from the sample surface. Since the chlorides used are all soluble in water, this step results in a clean surface free from chlorine. Afterwards the sample was cleaned again using isopropanol. The sample was also annealed up to 260° C., which is meant for removing the remaining water and isopropanol on the sample surfaces before the actual experiment. Therefore, the wet-chemical route to modify LSC surfaces at low temperatures is clearly different from the spray pyrolysis to form the entire oxide film. This difference guarantees that the LSC intrinsic properties were not affected by chlorine contamination.

Figure 19:
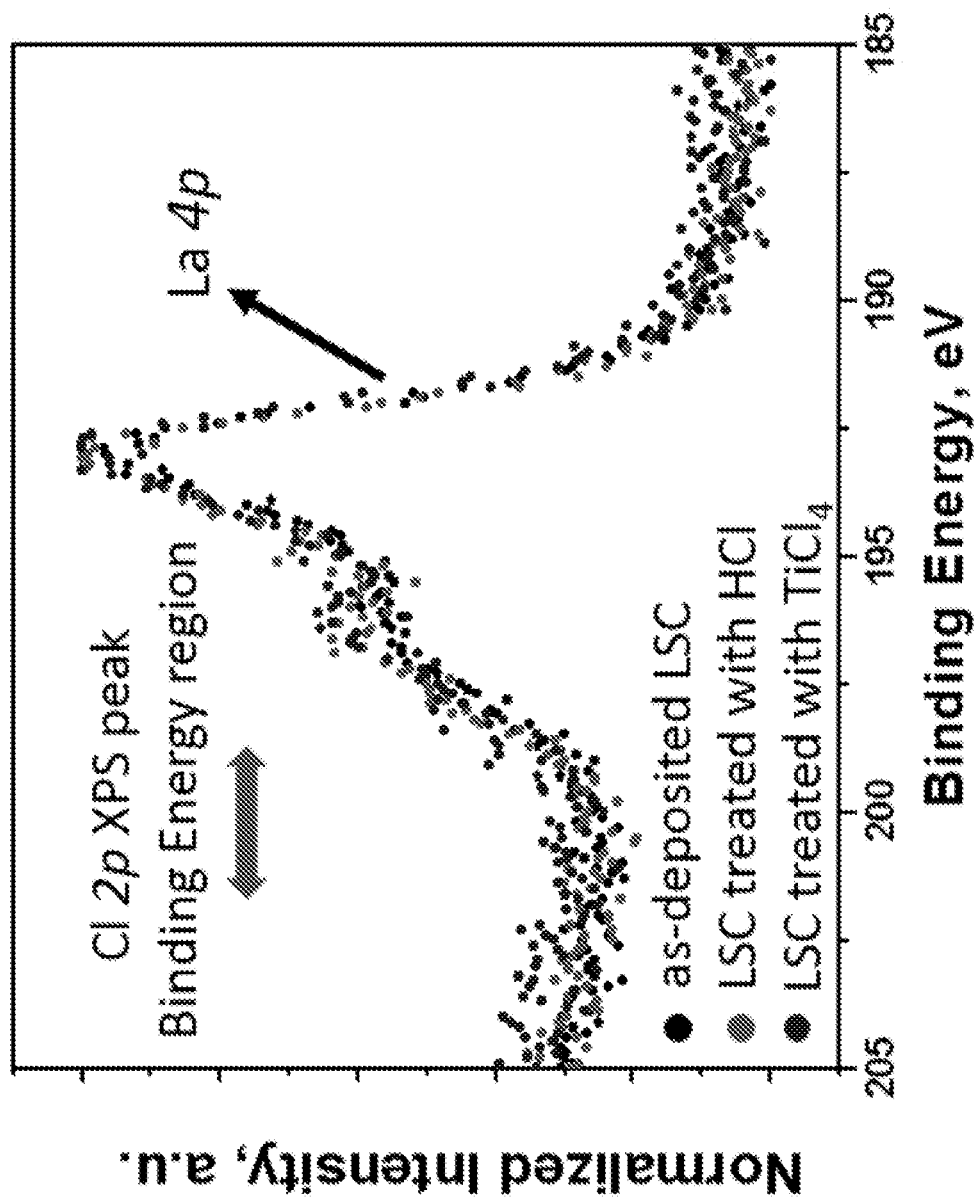
FIG. 19 shows x-ray photoelectron spectra showing the expected Cl 2p region for an as-deposited LSC film, and two LSC films treated with dilute HCl and with $TiCl_4$ solution.

This point was proved by the XPS measurements (FIG. 19). XPS measurements was performed on multiple LSC samples after treating their surfaces with metal chloride solutions, searching for the possible existence of Cl remaining at the LSC surfaces. As an example, data for the LSC samples after $TiCl_4$ treatment and after dilute HCl treatment are shown in FIG. 19. The Cl 2p photoemission peak was not observed in any of these three samples shown as representative of all the LSC films whose surfaces were modified by dilute HCl or by metal chloride solutions. The Cl 2p signal was not found in the expected binding energy range (197 eV~201 eV, according to literature). This proves that the Cl is either not present on the sample surface, or that its concentration is below the detection limit of XPS (~1% from the estimation based on the ionization cross section of Cl 2p). Thus the conclusions shown here were affected by possible Cl contamination from the deposition process.

Surface Morphology on the LSC and LSC-Me Films

Surface morphologies of LSC, and LSC films threated with Co, V, Ti, Nb, Zr, Hf, and Al chloride solutions were investigated by force microscopy (AFM) (FIGS. 20A-20H). As can be seen from the AFM images (FIGS. 20A-20H), these surfaces do not show any special or evident morphological features associated with deposited cations within the resolution limits. Some difference can be observed for the LSC-V12 sample which was treated with high $VCl_3$ concentration at 80° C. to be able to deposit the desired amount of V at the surface, and this resulted in partial etching of the surface and increased roughness. Based on these AFM observations, the metal additive is deposited mainly in the form of a thin and smooth wetting layer of metal oxide layer, but not necessarily a complete monolayer.

Calculation of Surface Oxygen Exchange Coefficient

The half cells for electrochemical tests had the LSC or LSC-Me thin films as the working electrode and the pasted porous Ag as the counter electrode. A typical impedance response of the cells with the LSC-Hf16 thin film electrodes, and the equivalent circuit used for modeling the EIS data is shown in FIG. 21. Solid line was obtained by fitting the equivalent circuit parameters to the data. See, Adler, S. B. Factors Governing Oxygen Reduction in Solid Oxide Fuel Cell Cathodes. Chemical Reviews 104, 4791-4844 (2004), and Jiang, S. P. A comparison of $O_2$ reduction reactions on porous $(La,Sr)MnO_3$ and $(La,Sr)(Co,Fe)O_3$ electrodes. Solid State Ionics 146, 1-22 (2002), each of which is incorporated by reference in its entirety. The EIS data obtained on the cells were modeled with circuits consisting of two R//CPE (a resistor in parallel to a constant phase element) (FIG. 21). See, Yamada, A. et al. Ruddlesden-Popper-Type Epitaxial Film as Oxygen Electrode for Solid-Oxide Fuel Cells. Advanced Materials 20, 4124-4128 (2008), which is incorporated by reference in its entirety. The larger arc in the lower frequency region is known to reflect the oxygen exchange reaction at the cathode surface. See, Jamnik, J. & Maier, J. Generalised equivalent circuits for mass and charge transport: chemical capacitance and its implications. Physical Chemistry Chemical Physics 3, 1668-1678 (2001), which is incorporated by reference in its entirety. The surface polarization resistance, $R_S$, values were obtained from the low frequency impedance response, and used those values to calculate the surface oxygen exchange coefficient, $k^q$, using the following formula:

$$k^q = \frac{k_B T}{4e^2 c_0 R_S},$$

where $k_B$ is the Boltzmann constant, T is temperature, e is the electronic charge, and $c_o$ is the total concentration of lattice oxygen determined according to data from Mizusaki et al. See, Baumann, F. S., Fleig, J Habermeier, H.-U. & Maier, J. Impedance spectroscopic study on well-defined $(La,Sr)(Co,Fe)O3-\delta$ model electrodes. Solid State Ionics 177, 1071-1081 (2006), and Mizusaki, J Mima, Y, Yamauchi, S., Fueki, K. & Tagawa, H. Nonstoichiometry of the perovskite-type oxides La1-xSrxCoO3-$\delta$. Journal of Solid State Chemistry 80, 102-111 (1989), each of which is incorporated by reference in its entirety. The $k^q$ values on LSC and LSC-Me (Me concentration 12-16%) thin film cathodes as a function of time at 530° C. in air.

Analysis of Sr 3d Spectra

Figure 22:
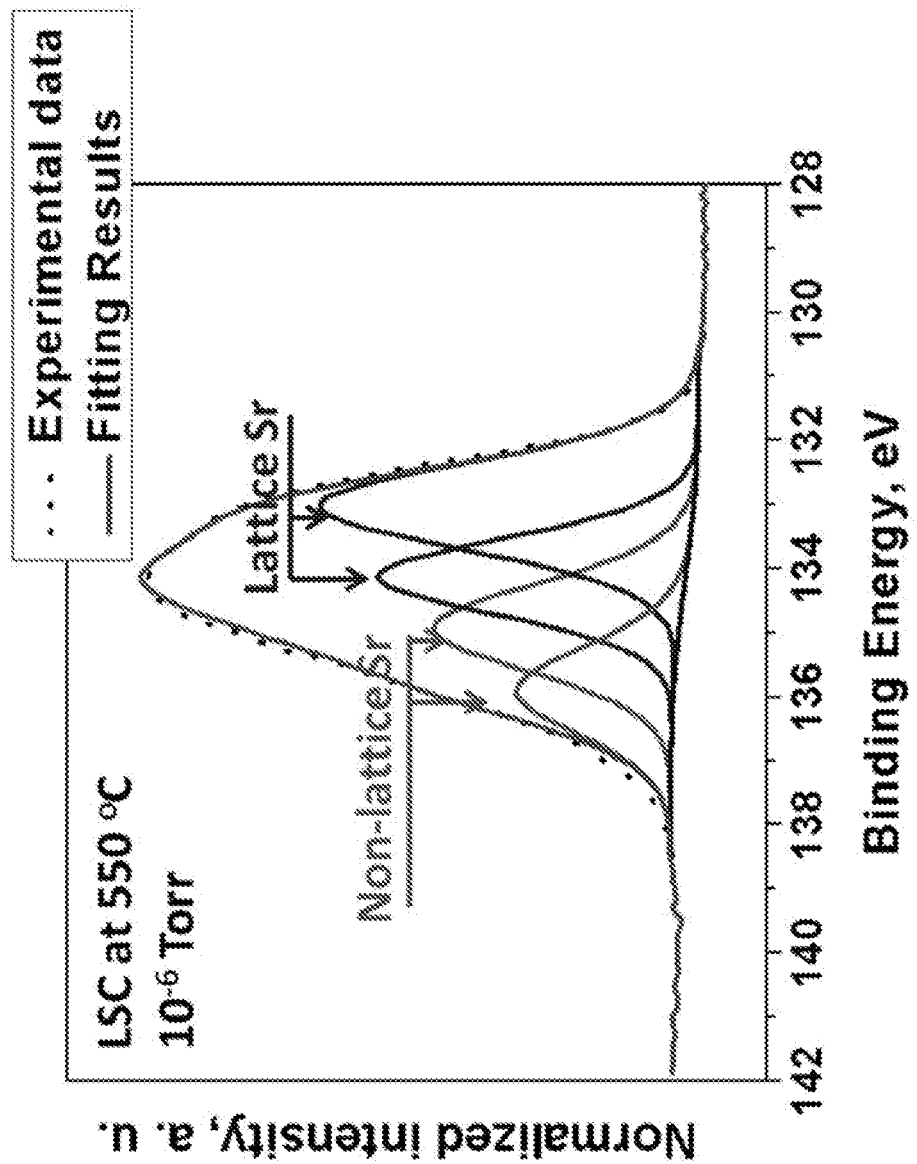
FIG. 22 shows representative Sr 3d x-ray photoelectron spectra recorded on the LSC film at 550° C. and at oxygen partial pressure of $10^{-6}$ Torr.
Figure 23B:
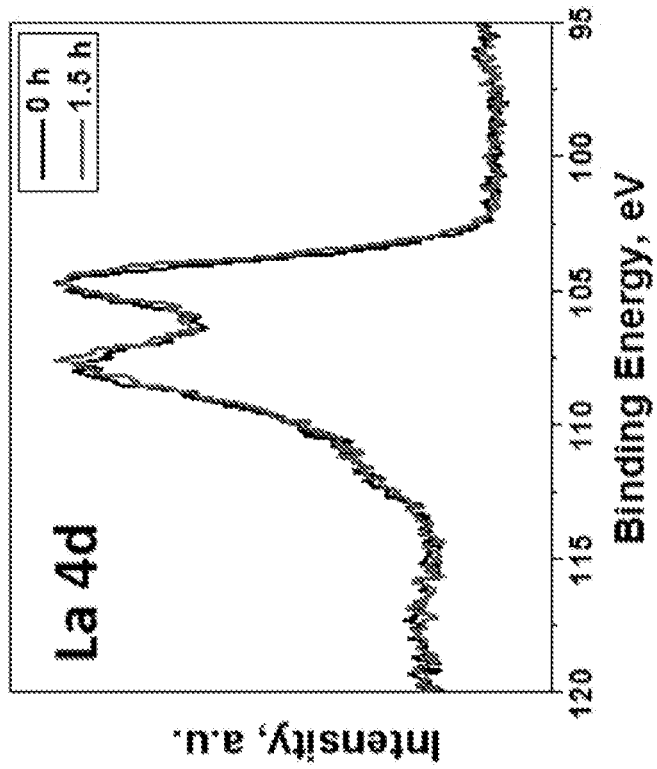
FIGS. 23A-23F show Sr 3d, La 4d and Co 3p photoemissions (measured by APXPS) at 450° C., $10^{-6}$ Torr $pO_2$ (FIGS. 23A-23C) and 550° C., $10^{-6}$ Torr $pO_2$ (FIGS. 23E-23F), collected at 0 h and 1.5 h elapsed times.
Figure 23A:
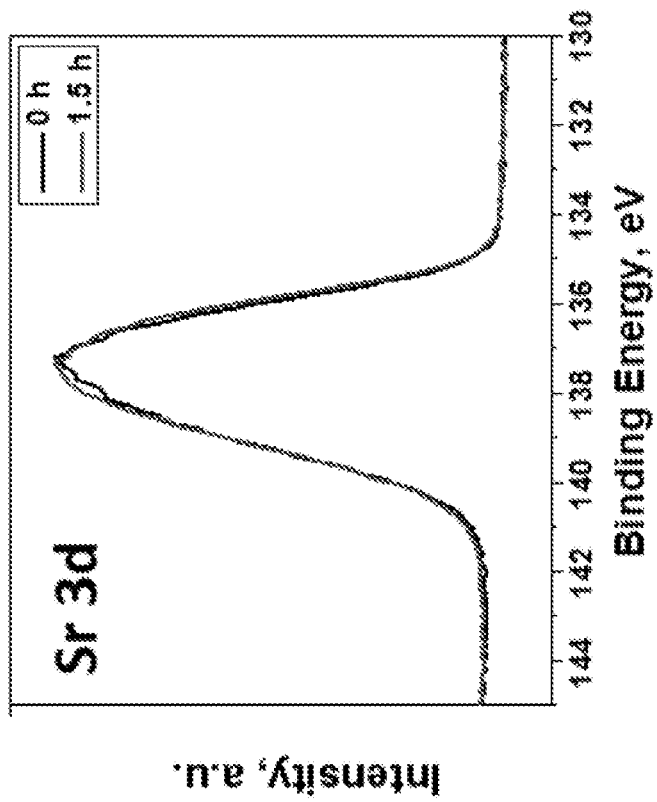
Figure 23D:
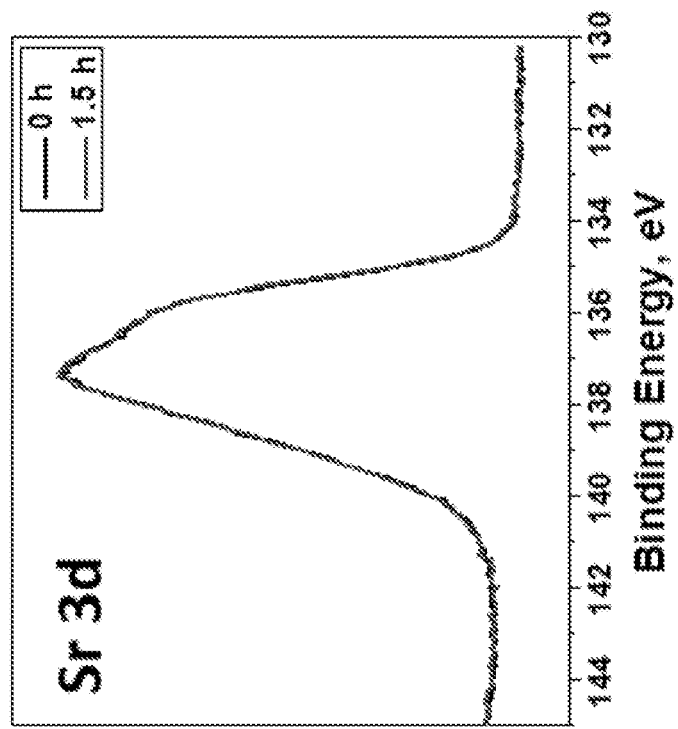
Figure 23C:
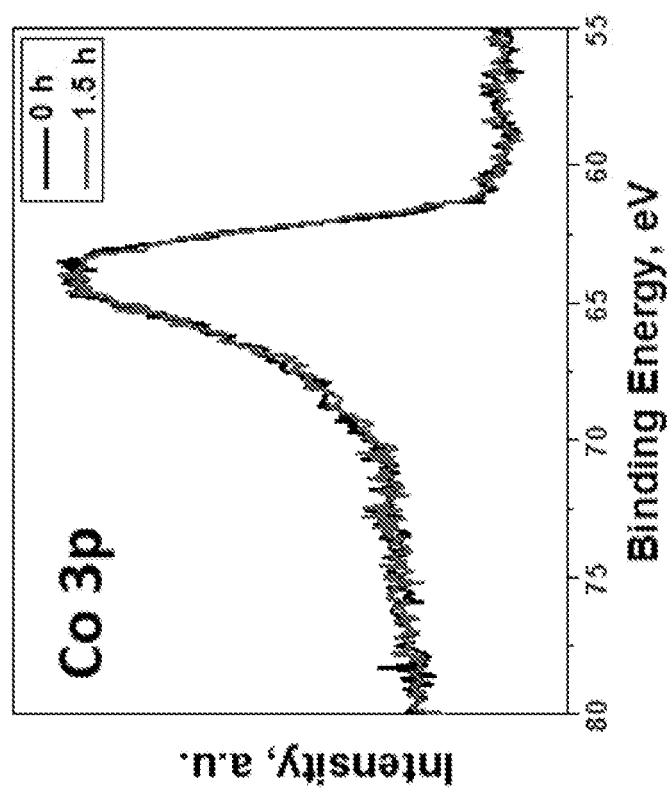
Figure 23F:
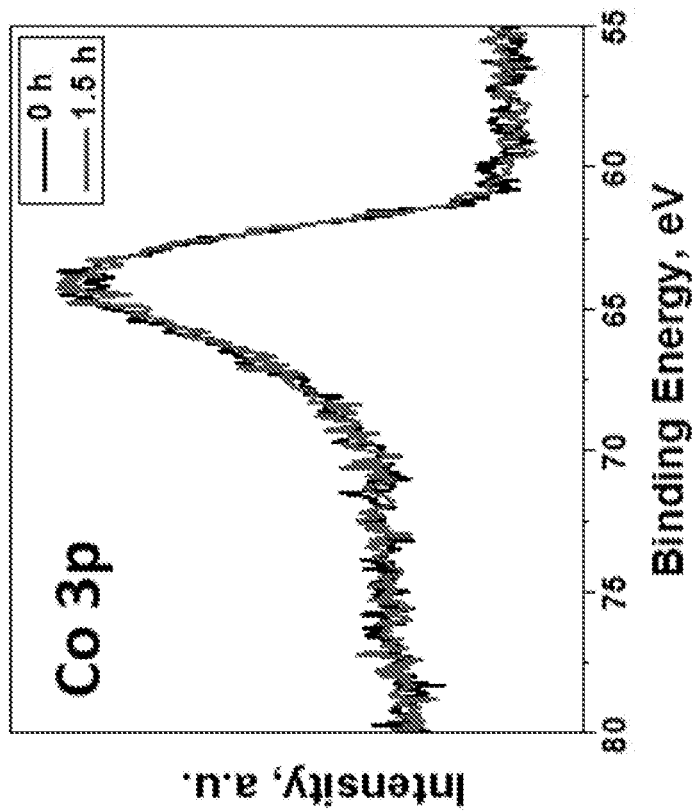
Figure 23E:
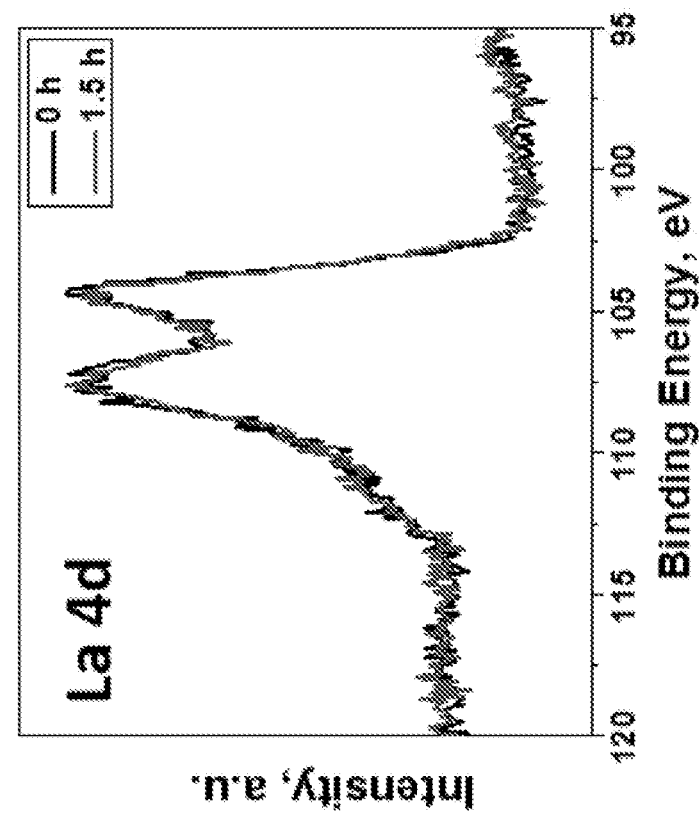

The analysis of the Sr 3d photoelectron core level peak allows one to quantify the atomic concentration of Sr at the film surface, and to assess/differentiate the Sr binding environments in the perovskite lattice and in non-lattice phase at the surface (FIG. 22). The overlapping of two spectra for all three cations means that there is no detectable change occurring during the 1.5 h duration. The data at "0 h" are actually collected after 30 minutes of equilibration at the stated condition. See, Cai, Z., Kubicek, M., Fleig, J. & Yildiz, B. Chemical Heterogeneities on $La_{0.6}Sr0.4CoO3-\delta$ Thin Films—Correlations to Cathode Surface Activity and Stability. Chem. Mater. 24, 1116-1127 (2012), which is incorporated by reference in its entirety. The contributions to the Sr 3d photoelectron spectrum were found to arise from the perovskite lattice-bound Sr ($[Sr]_{Lattice}$) at the lower binding energies and from the surface-bound Sr ($[Sr]_{Non-lattice}$) at the higher binding energies. $[Sr]_{Lattice}$ contribution was attributed to the Sr chemical environment of the perovskite LSC. The chemical environment of $[Sr]_{Non-lattice}$ can be attributed to the formation of species such as $SrCO_3$, $SrO$, or $Sr(OH)_2$.

Temporal Stability of LSC Chemical Composition During AP-XPS Measurements

FIGS. 23A-23F shows that each data point in FIGS. 14A-14D is not showing any temporal characteristics, but rather, each data point represents the equilibrium state at each condition in the experiments. FIGS. 23A-23F shows the photoelectron spectra of La, Sr and Co cations. There are two sets of data shown for each, one is denoted as "0 h" which is taken as the initial condition (but in fact this data is taken after 30 min of equilibration upon reaching that temperature or pressure), and another one is denoted as "1.5 h" which is taken 1.5 h after the data shown for "0 h". The complete overlapping of these two data sets (at 0 h and at 1.5 h) demonstrate the fact that the results shown in FIGS. 14A-14D are not temporal effects but rather dominated by the changes in the temperature and oxygen pressure.

Evolution of the Co $L_3$-Edge Position at Different Temperature and Oxygen Partial Pressures As shown in FIG. 15B and also in FIG. 24, a 0.4 eV difference was observed comparing LSC and LSC-Hf15 at the first measurement condition (300° C., 0.76 Torr). According to Hu et al., this means the difference in Co oxidation state between these two samples is ~0.4. See, Hu, Z. et al. Difference in spin state and covalence between La1-xSrxCoO3 and La2-xSrxLi0.5Co0.5O4. Journal of Alloys and Compounds 343, 5-13 (2002), which is incorporated by reference in its entirety. However, the Co oxidation state can also be affected by the concentration of Sr in LSC lattice. This 0.4 eV difference cannot be from the difference in $[Sr]_{lattice}$. From FIG. 14C, the difference in $[Sr]_{lattice}/[Co]$ ratio is only 0.05, which corresponds to a change in Co oxidation state of only 0.05, which is much smaller than what was observed from in situ XAS measurements (i.e. 0.4). Therefore, this difference in Co oxidation state is from the effect of additive cations, most likely the suppressed formation of oxygen vacancies, rather than the difference in $[Sr]_{lattice}$ among the samples.

It was possible to detect the instability of the bare LSC surface chemistry already at as low temperatures as 300° C., characterized by a significant increase of the non-lattice Sr at the film surface (FIG. 14B). This corresponds to the initial phase of LSC surface degradation. So, for suppressing the segregation of non-lattice Sr, this initial phase must be stopped or delayed to much higher temperatures. This is why the signatures of Co $L_{2,3}$ edge XAS, O K edge XAS and the VB structure were mainly compared at 300° C. in FIGS. 15A-15B and 16A-16D among the unmodified and modified LSC samples. As shown in FIG. 14C, the $[Sr]_{Lattice}$ increased significantly upon going to higher temperatures on LSC and LSC-Ti3 due to much larger driving force and/or faster kinetics for Sr segregation on those samples. More Sr cations in LSC lattice means more p-type doping, which leads to a more oxidizable surface, as seen in FIG. 24 and in FIGS. 15A-15B and 16A-16D for LSC and LSC-Ti3 samples at temperatures higher than 300° C. Since this evolution of lattice Sr concentration complicates the interpretation, the discussion on the effect of Ti and Hf is limited to the first measurement condition (300° C., 0.76 Torr). At this condition, the differences in $[Sr]_{Lattice}$ among the four samples were rather small (within only ~0.05). Therefore, the Co L-edge, O K-edge and VB structure differences really arise from the effect of the additive cations on the oxygen vacancy concentration.

Reducibility of the Co Cation on LSC and LSC-Me Films

To support XAS measurements reducibility of the LSC and LSC-Me films was compared by measuring the Co 2p photoelectron spectra at 450 and 550° C. in ultra-high vacuum ($\sim 10^{-9}$ Torr) (FIGS. 25A-25B) using conventional laboratory X-ray source.

At 550° C., the Co 2p main peak satellite peak at 786 eV indicates the presence of reduced $Co^{2+}$[13]. This satellite peak was clearly seen on LSC but not on LSC-Ti15, LSC-Nb14, LSC-Zr15, LSC-Al15 or LSC-Hf16. The surface modification with V, on the other hand, facilitated the Co reduction as apparent with a clear satellite peak (FIG. 15D). On LSC-V12, the $Co^{2+}$ satellite peak becomes apparent at 450° C., while no satellite peak was observed for the bare LSC film at the same temperature. These observations mean that adding more oxidizable cations, Ti, Nb, Zr, Al or Hf, made Co in LSC less reducible, while V enhanced the reducibility of Co in LSC.

Valence Band Spectra at the Bare and Modified LSC Surfaces

The evolution of the valence band (VB) supports also a more oxidable surface when LSC is modified by Hf and Ti, consistent with the Co $L_{2,3}$-edge XAS above. The VB spectra of LSC, LSC-Ti3, LSC-Ti15, and LSC-Hf16 films at different conditions are shown in FIGS. 26A-26D. The arrow indicates the low energy peak which reflects the hybridization of Co $t_{2g}$ states with the O 2p orbital. The greater the intensity of this peak, the more electrons in the $t_{2g}$ states of Co. These four samples can be divided into two groups based on the similarity of the VB spectra. For the LSC and LSC-Ti3, the intense peak located at around 1.5 eV at 300° C. arises from the Co $t_{2g}$ states hybridized with the O 2p states. See, Abbate, M. et al. Electronic structure and spin-state transition of LaCoO$_3$. Physical Review B 47, 16124-16130 (1993), and Mizokawa, T. et al. Photoemission and x-ray-absorption study of misfit-layered (Bi,Pb)—Sr—Co—O compounds: Electronic structure of a hole-doped Co—O triangular lattice. Physical Review B 64, 115104 (2001), each of which is incorporated by reference in its entirety. On the other hand, on LSC-Ti15 and LSC-Hf16, this peak was absent at the same condition. The intensity of this peak is tied to the number of electrons at the Co $t_{2g}$ orbital, and provides information on the Co oxidation state. See, Mizokawa, T. et al. Photoemission and x-ray-absorption study of misfit-layered (Bi,Pb)—Sr—Co—O compounds: Electronic structure of a hole-doped Co—O triangular lattice. *Physical Review B* 64, 115104 (2001), and Tsukada, I. et al. Ferromagnetism and Large Negative Magnetoresistance in Pb Doped BiSrCoO Misfit-Layer Compound. Journal of the Physical Society of Japan 70, 834-840, doi:10.1143/jpsj 0.70.834 (2001), each of which is incorporated by reference in its entirety. Therefore, this intense $t_{2g}$ peak on LSC and LSC-Ti3 suggests more $t_{2g}$ electrons and a lower Co oxidation state. The absence of this peak on LSC-Ti15 and LSC-Hf16 indicates that Co is more oxidized on these samples than on LSC, in line with the Co L-edge XAS results.

At 450-550° C., the VB structure of LSC, LSC-Ti3, LSC-Ti15 and LSC-Hf16 become similar, with the disappearance of the Co $t_{2g}$-O 2p peak on LSC and LSC-Ti3. The variations of the $[Sr]_{Lattice}$ as a function of temperature can explain this behavior. Raising the temperature up to 450-550° C. substantially increases the $[Sr]_{Lattice}/[Co]$ (FIG. 14C) on LSC and LSC-Ti3. The larger Sr doping level in the near-surface region is charge compensated by Co becoming more oxidizable. This decreases the intensity of Co $t_{2g}$-O 2p peak on the LSC and LSC-Ti3 at 450-550° C. As a result, the difference in the intensity of the Co $t_{2g}$-O 2p peak among the samples at 300° C. is mainly due to a difference in oxygen vacancy concentrations. On the other hand, at 450-550° C. the enrichment of $[Sr]_{Lattice}$ near the surface of LSC and LSC-Ti3 governs the shape of the VB near the Co $t_{2g}$-O 2p peak.

O K-Edge Spectra at the Bare and Modified LSC Surfaces

It is well known that for LSC, there is significant hybridization of the Co 3d and O 2p orbitals due to the covalent characteristics of this material. See, Suntivich, J. et al.

Estimating Hybridization of Transition Metal and Oxygen States in Perovskites from O K-edge X-ray Absorption Spectroscopy. The Journal of Physical Chemistry C 118, 1856-1863 (2014), which is incorporated by reference in its entirety. Therefore, the O K-edge XAS also provides insights into the electronic structure of LSC surfaces. FIGS. 27A-27D summarizes the evolution of the O K-edge spectra taken in situ on LSC, LSC-Ti3, LSC-Ti15, and LSC-Hf16 films as a function of measurement conditions. In line with the unchanged valence band structure (FIGS. 26C and 26D), the O K-edge spectra on LSC-Ti15 and LSC-Hf16 remained unaltered throughout the measurements. A sharp pre-edge peak at around 528 eV (shown by the arrows in FIGS. 26A-26D) indicates the existence of O 2p ligand holes. See, Moodenbaugh, a. et al. Hole-state density of La1-xSrxCoO3-δ(0~x~0.5) across the insulator/metal phase boundary. Physical Review B 61, 5666-5671 (2000), which is incorporated by reference in its entirety. The O 2p ligand hole peak is clearly evident on LSC-Ti15 and LSC-Hf16 surfaces. In contrast, this peak was absent on LSC and LSC-Ti3 at 300° C. and $pO_2$ of 0.76 Torr. The presence of this peak indicates increased p-type doping and a more oxidizable Co valence on LSC-Ti15 and LSC-Hf16 compared to that on LSC and LSC-Ti3. See, Abbate, M. et al. Controlled-valence properties of La1-xSrxFeO3 and La1-xSrxMnO3 studied by soft-x-ray absorption spectroscopy. Physical Review B 46, 4511-4519 (1992), which is incorporated by reference in its entirety.

The difference in the O K-edge XAS spectra among the four samples disappears by 550° C. and high $pO_2$ of 0.76 Torr. This evolution of the O K-edge spectra is attributed to the increase of the $[Sr]_{lattice}$ concentration on LSC and LSC-Ti3, using the same reasoning as the evolution of the VB spectra above.

Bonding Environment of Additive Cations

The presence as dopants, such as Hf, Zr, Nb or Al, into the Co-site of LSC alters the oxygen vacancy formation energy at LSC surface because the bonding between the added metal cations and oxygen is much stronger than the Co—O bonds, and thus, more difficult to break. The oxygen vacancy formation energy in the binary oxides of Zr, Nb, Ti, Hf, and Al (e.g. $TiO_2$ and $HfO_2$) is higher compared to that in LSC. Therefore, it is expected that the bonding between added metal cations (Ti, Hf, etc.) and oxygen is much stronger than the Co—O bonds, and thus, more difficult to break. It is reasonable to expect that such stronger bonding increase the oxygen vacancy formation energy (and decrease the oxygen vacancy concentration) on the LSC surfaces modified by these cations.

Even though Ti was found to be incorporated into the perovskite lattice at elevated temperatures, the exact composition of the very surface layer of the modified LSC still needs further investigation. The possibility that a thin layer of the $SrTiO_3$ can be formed at the top surface of LSC is considered. However, it is highly unlikely that there was no intermixing between the added (Ti) and host (Co) cations, especially at elevated temperatures. Therefore, the most likely Ti bonding environment is Ti substituting the Co site in LSC perovskite lattice, forming Ti-doped LSC on the top surface layer.

Discussion on Influence of Additive Cations on Surface Polarity

The possible effect of the added cations on the polarity of LSC surface was considered. As it was shown by Harrison, the polar surface of (100)-terminated (La,Sr)MnO3 (LSM) can be in part contributing to the Sr-enrichment at the surface. See, Harrison, W. A. Origin of Sr segregation at La1-xSrxMnO3 surfaces. Physical Review B 83, 155437 (2011), which is incorporated by reference in its entirety. The surface charges can be eliminated by depleting La and enriching Sr near and at the surface of LSM, and the same reasoning should be able to be applicable to LSC. However, oxygen non-stoichiometry is left out from that picture. Considering the (100) $CoO_2$ termination on $La_{1-x}Sr_xCoO_3$ in the absence of oxygen vacancies, the surface takes a charge of $-(1-x)^{e-}$ per B-site, thus introducing instability due to the charged surface termination. The surface charges can be relieved when positively charged oxygen vacancies are formed in this $BO_2$ layer. Consistent with this, it is also known that oxygen vacancies are enriched at perovskite surfaces. See, Chueh, W. C. & Haile, S. M. Electrochemistry of Mixed Oxygen Ion and Electron Conducting Electrodes in Solid Electrolyte Cells. Annual Review of Chemical and Biomolecular Engineering 3, 313-341 (2012), which is incorporated by reference in its entirety. In this case, one may argue that the positively charged $Me_{Co}^{\cdot}$ (such as the added Hf, Ti, Zr cations) in $CoO_2$ layer can reduce the charge and thus stabilize the surface. However, follow the same logic, since the oxygen vacancy is doubly negatively charged ($V_O^{\cdot\cdot}$) while $Me_{Co}^{\cdot}$ has only single negative charge, one should expect that oxygen vacancies have stronger effect of relieving polar surface than added cations. That is to say, an increasing in surface oxygen vacancy concentration should lead to a decreased charge in $CoO_2$ layers and consequently more stable surface. However, this is opposite to the experimental observations, which explicitly showed that LSC surfaces that are modified by more oxidizable cations, i.e. smaller concentration of oxygen vacancies, had much more stable surface chemistry. Therefore, the enhanced surface stability cannot be explained by the effect of modifying polar surface of LSC with additive cations, or the effect is rather small.

Repeatability of Electrochemical Measurements

Figure 29:
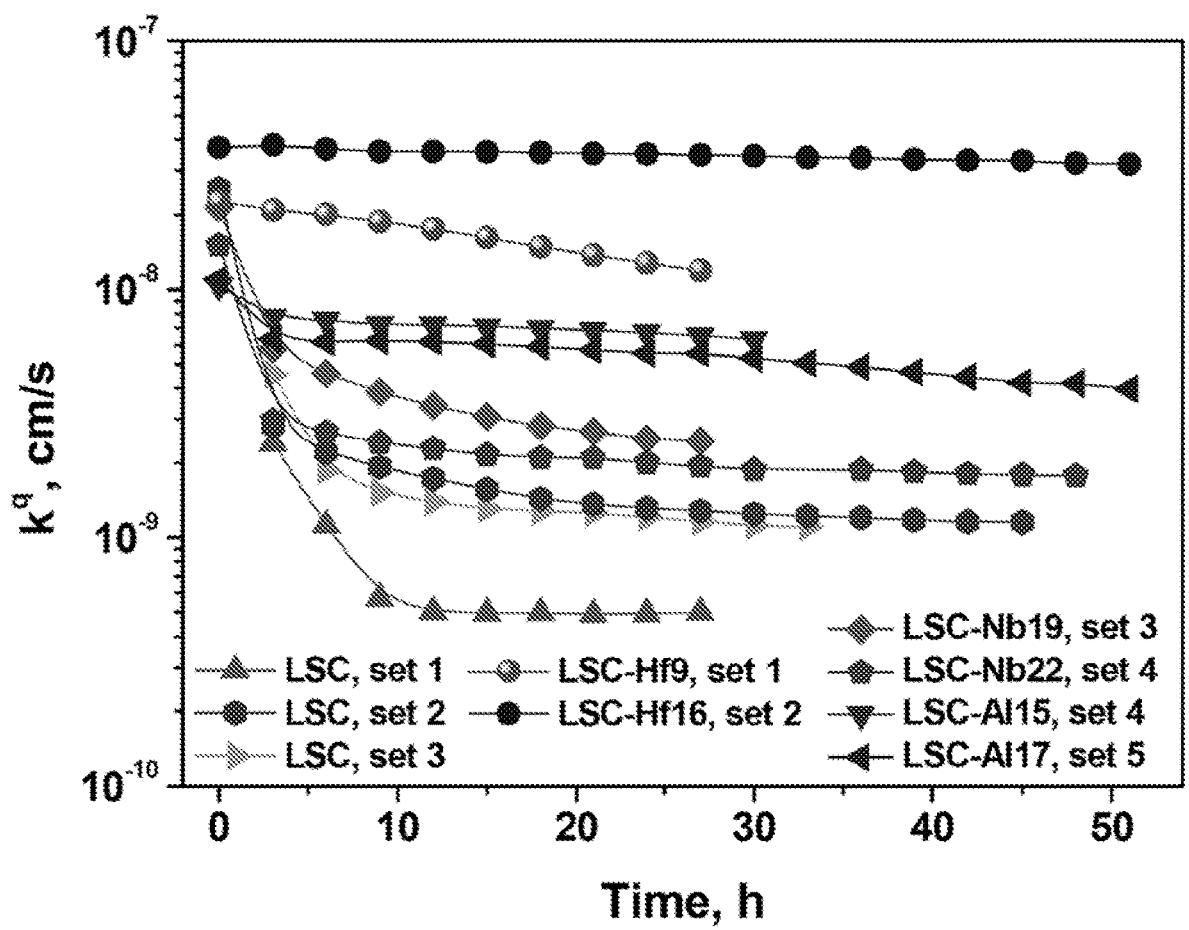
FIG. 29 shows the oxygen surface exchange coefficient, $k^q$, quantified from electrochemical impedance spectroscopy measurements over time at 530° C. in air, for the LSC and LSC-Me films deposited at different PLD sessions and with different additive Me concentrations.

For selected surface compositions, 2-3 samples were tested electrochemically (FIG. 29).

Variation of the measured $k^q$ values ranged from +/−10% for bare LSC to +/−40% for LSC-Hf, in part because of the variability in the PLD-prepared base LSC films and, in part, because of the different concentrations of additives that were put at the surface. The results for LSC, LSC-Ti15, and LSC-Hf16 shown in FIGS. 14A-14D represent a batch of samples that were deposited at the same time to ensure consistency of the base film. Regardless of the batch of samples, the general trend shown in FIGS. 14A-14D reveals that the significantly better stability and higher $k^q$ are consistent among all samples with the more oxidizable surface additives.

In summary, significantly improved surface chemical and electrochemical stability was achieved on a model perovskite electrocatalyst, LSC, by modifying its surface with more oxidizable cations. The best performance was achieved by Hf modification of the surface, giving rise to 30× faster oxygen exchange kinetics than that on the unmodified LSC after 54 hours at 530° C. The dominant effect of introducing these cations on the surface chemistry of LSC was two-fold: i) they reduce the Sr enrichments and phase separation into insulating particles at the surface, and ii) they induce an effectively more oxidized surface with a lower concentration of oxygen vacancies. Both of these outcomes were consistently shown by the Co $L_{2,3}$ edge, O K edge and the VB structure obtained by AP-XPS/XAS. The effect i) is an outcome of the effect ii) that is, the decrease in the surface oxygen vacancy concentration and the positive charge consequently decreases the electrostatic driving force for Sr$_{La}$' segregation towards the surface and phase separation. Ti L-edge spectra showed that the additive cations enter a perovskite-like coordination on LSC. This proposes that the surface additive cations serve as dopants and can largely alter the surface electronic structure and reduction enthalpy on LSC. Lastly, a volcano relation of the stability of the ORR kinetics to the oxygen vacancy formation energy at the surface was revealed. This volcano plot implies that one can optimize the performance of the perovskite type electrocatalysts by finding an optimum oxygen vacancy concentration that balances the gain in ORR kinetics and the chemical stability loss. The proposed approach provides a feasible and novel way of designing stable and highly reactive perovskite oxides for electrochemical applications.

Experimental Section
Film Fabrication and Additive Cation Deposition at the Surface Dense La$_{0.8}$Sr$_{0.2}$CoO$_3$ films were deposited onto substrates using pulsed laser deposition (PLD) with a KrF excimer laser of 248 nm wavelength. The La$_{0.8}$Sr$_{0.2}$CoO$_3$ target was purchased from MTI Corp., USA. The films were deposited at 650° C. under oxygen pressure of 10 mTorr on the single crystalline Yr$_{0.08}$Zr$_{0.92}$O$_2$(YSZ) (100) substrates (MTI Corp., USA) with a 15 nm thick Gd$_{0.2}$Ce$_{0.8}$O$_2$ interlayer grown at the same conditions as the LSC films. The LSC film thickness was around 25 nm. After the growth process, the films were cooled down to room temperature in 2 Torr of oxygen.

To remove excess Sr and to modify the surface with the metal cations, the LSC thin films were dipped in to aqueous chloride solutions of the corresponding metals. See, Sommeling, P. M. et al. Influence of a TiCl$_4$ Post-Treatment on Nanocrystalline TiO$_2$ Films in Dye-Sensitized Solar Cells. *The Journal of Physical Chemistry B* 110, 19191-19197 (2006), and Tsvetkov, N. A., Larina, L. L., Shevaleevskiy, O., Al-Ammar, E. A. & Ahn, B. T. Design of conduction band structure of TiO$_2$ electrode using Nb doping for highly efficient dye-sensitized solar cells. *Progress in Photovoltaics: Research and Applications* 20, 904-911 (2012), each of which is incorporated by reference in its entirety. The deposition parameters are summarized in Table 2 (SI). For samples which were not treated with the metal cations, the excess surface Sr-rich phase formed during the PLD process was removed by dipping of the films into a 0.1 M HCl aqueous solution for 10 sec at room temperature. See, Kubicek, M., Limbeck, A., Fromling, T., Hutter, H. & Fleig, J. Relationship between Cation Segregation and the Electrochemical Oxygen Reduction Kinetics of La$_{0.6}$Sr$_{0.4}$CoO$_{3-\delta}$ Thin Film Electrodes. *Journal of the Electrochemical Society* 158, B727-B734 (2011), which is incorporated by reference in its entirety. After the chemical treatment the films were washed with water and isopropanol and dried in the air flow at 260° C. for 1 min.

Surface Chemical Composition and Morphology of the Modified LSC Films

The chemical composition and morphology at the surface of the LSC films and the modified LSC films (LSC-Me) were examined using X-ray photoelectron spectroscopy and atomic force microscopy (AFM). The XPS core level peak shapes and atomic fractions of Co, La, and Sr were similar for the as-prepared LSC and LSC-Me films. The LSC-Me films had also comparable additive cation fraction, defined as Me/(La+Sr+Co+Me) of 12-19% at the surface (See SI section 1). The films treated with chloride solutions of Co, V, Nb, Zr, Ti, Hf, and Al are denoted as LSC-Co12, LSC-V12, LSC-Nb19, LSC-Zr15, LSC-Ti15, LSC-Hf16 and LSC-Al15, respectively, where the numbers indicate the Me/(La+Sr+Co+Me) ratio at/near the film surface. The surface morphology of the LSC-Me films in their as-prepared condition was smooth, identical to that of the dilute HCl-treated LSC (FIG. 19). Thus, it is hypothesized that the metal additive is deposited in the form of a thin and smooth wetting layer at room temperature before further annealing.

Characterization

A Veeco/Digital Instrument Nanoscope IV was used to perform tapping mode AFM for characterizing the surface morphology. Ex situ XPS measurements have been performed to estimate the surface cation composition using a Perkin-Elmer PHI-5500 ESCA Spectrometer with monochromated Al Kα (1486.65 eV) X-ray source under a base pressure of $10^{-9}$ Torr with the emission angle of 20°. At this configuration, the photoelectron inelastic mean free paths (IMPF) for La 3d, Sr 3d, Co 2p, V 2p, Ti 2p, Nb 3d, Zr 2p, and Hf 4d are 0.3 nm, 0.7 nm, 0.3 nm, 0.4 nm, 0.4 nm, 0.6 nm, 0.6 nm, and 0.6 nm, respectively. The quantitative analysis of the XPS spectra was performed using the Multipack 9.0 software. The XPS experiments at 450-500° C. and at pressure of $10^{-9}$ Torr were performed to observe the reduction features in the Co 2p peak (with a photoelectron emission angle 90° and an IMFP of ~1 nm), using an Omicron DAR 400 Mg/Al dual anode non-monochromated X-ray source, an Omicron EA 125 hemispherical analyzer and an Al Kα X-ray source.

EIS measurements were performed on asymmetrical cells with the LSC thin film working electrodes grown on YSZ single crystal substrates. Dense platinum current collectors in the form of a grid (25×25 μm$^2$ of open area in every 50×50 μm$^2$ repeat unit in the total 7.3×7.3 mm$^2$ current collector area) were deposited on the LSC thin films by means of photolithography and RF sputtering. Porous Ag layer served as the counter electrode. Platinum wire leads were connected to the current collector and the counter electrode with the aid of the lab-designed mechanical clip made of Pt—Ir 20% alloy wire (4N purity, ESPI metals, Ashland Oreg.). Parstat 2273 potentiostat was used to perform the EIS measurements in the frequency range of 100 kHz to 1 mHz with an AC amplitude of 5 mV and 0 V DC bias at 530° C. in air during up to 54 hours.

The half cells for electrochemical tests had the LSC or LSC-Me thin films as the working electrode and the pasted porous Ag as the counter electrode. The EIS data obtained on the cells (FIGS. 20A-20H) were modeled with circuits consisting of two R//CPE (a resistor in parallel to a constant phase element) (FIGS. 20A-20H). See, Adler, S. B. Factors Governing Oxygen Reduction in Solid Oxide Fuel Cell Cathodes. *Chemical Reviews* 104, 4791-4844 (2004), which is incorporated by reference in its entirety. The k$^q$ values were calculated from the surface polarization resistance (arc in the lower frequency region) data measured by EIS. See, Jamnik, J. & Maier, J. Generalised equivalent circuits for mass and charge transport: chemical capacitance and its implications. *Physical Chemistry Chemical Physics* 3, 1668-1678 (2001), and Baumann, F. S., Fleig, J., Habermeier, H.-U. & Maier, J. Impedance spectroscopic study on well-defined (La,Sr)(Co,Fe)O$_{3-\delta}$ model electrodes. *Solid State Ionics* 177, 1071-1081 (2006), each of which is incorporated by referenc in its entierty. For selected composition 2-3 samples were tested electrochemically (FIGS. 28A-28C). In FIGS. 28A-28C, the solid lines give the estimated line strength of the dipole transition probability 3d$^0$-2p$^5$3d$^1$ in (a) O$_h$ (FIG. 28A) and (b) D$_{2h}$ symmetry (FIG. 28B). Reprinted from Lee, D. et al. with the permission of American Physical Society. Lee, D. et al. Enhanced Oxygen Surface Exchange Kinetics and Stability on Epitaxial La$_{0.8}$Sr$_{0.2}$CoO$_{3-\delta}$ Thin Films by $La_{0.8}Sr_{0.2}MnO_{3-\delta}$ Decoration. *The Journal of Physical Chemistry C* 118, 14326-14334, doi:10.1021/jp502192m (2014), which is incorporated by reference in its entirety. Variation of the measured $k^q$ values ranged from +/−10% for bare LSC to +/−40% for LSC-Hf, in part because of the variability in the PLD-prepared base LSC films and, in part, because of the different concentrations of additives that were put at the surface. The results for LSC, LSC-Ti15, and LSC-Hf16 shown in FIGS. 14A-14D represent a batch of samples that were deposited at the same time to ensure consistency of the base film. Regardless of the batch of samples, the general trend shown in FIGS. 14A-14D reveals the significantly better stability and higher $k^q$ are consistent among all samples with the oxidizable additives at the surface. ZView software was used for the data fitting and analysis.

In Situ Ambient-Pressure X-Ray Photoelectron and Absorption Spectroscopy (AP-XPS/XAS)

Near ambient pressure XPS/XAS measurements at elevated temperatures on surfaces of LSC and LSC-Me thin films were performed at the Beamline 9.3.2, Advanced Light Source, Lawrence Berkeley National Laboratory. The LSC thin films were placed on a ceramic heater, with thermocouples mounted directly onto the surfaces for surface temperature measurement. The XPS/XAS spectra were collected under the following conditions of temperature, T, and oxygen pressure, $pO_2$: 1. T=300° C., $pO_2$=0.76 Torr; 2. T=450° C., $pO_2=1\times10^{-6}$ Torr; 3. T=550° C., $pO_2=1\times10^{-6}$ Torr; 4. T=550° C., $pO_2$=0.76 Torr. At each condition, samples were equilibrated for 30 min before the measurement, and the XPS and XAS measurements at each condition took about 2-3 hours in total. The XPS spectra were collected at incident photon energy of 370 eV, with the following order: a low-resolution survey with binding energy (BE) of 200 eV~−10 eV, then high-resolution scans of Sr 3d, La 4d, Co 2p and VB. The IMFP for the photoelectrons was below 0.8 nm for all the spectra collected. For each condition, the XAS spectra of O K-edge and Co $L_{2,3}$-edge were collected right after the XPS measurement. The O K-edge and Co L-edge spectra were collected with photon energy range of 515-580 eV and 760-810 eV, respectively. The XAS spectra were collected using partial electron yield (PEY) mode, with electron kinetic energy of 275 eV and 589 eV for O K-edge and Co L-edge, respectively. This renders IMFPs of emitted electrons to be 0.7 nm for the O K-edge and 1.1 nm for the Co L-edge. The normalization of XAS spectra was performed using the ATHENA software. See, Ravel, B. & Newville, M. ATHENA, ARTEMIS, HEPHAESTUS: data analysis for X-ray absorption spectroscopy using IFEFFIT. *Journal of Synchrotron Radiation* 12, 537-541 (2005), which is incorporated by reference in its entirety.

Example V. Hf-Modification of $(La_{0.6}Sr_{0.4})_{0.95}Co_{0.2}Fe_{0.8}O_3$ Surface as a Catalyst for Chemical-Looping Water Splitting Chemical looping water splitting (CLWS) is a promising technology for generation of highly demanded fuels such as hydrogen or syngas. The energy conversion efficiency in CLWS critically depends on oxygen exchange and diffusion kinetics of catalyst oxygen carrier (OC) material in use. Using $(La_{0.6}Sr_{0.4})_{0.95}Co_{0.2}Fe_{0.8}O_3$ (LSCF), which is well known in the field of solid oxide fuel cells for its high reactivity toward oxygen reduction reaction, an alternative OC material to perform water splitting at temperatures much lower than for state-of-art $CeO_2$ is demonstrated. Model CLWS experiments were performed comparing $H_2$ production rates using LSCF and $CeO_2$ in the temperature range 400° C.-1000° C. cycling mixtures of $H_2O$/Ar as oxidizing and $H_2$/Ar as reducing agents. Using LSCF as OC material allows more than three times yield of $H_2$ compared to that of $CeO_2$. This is due to large change in the oxygen nonstoichiometry, $\Delta\delta$, in the LSCF in comparison to that in $CeO_2$. However, the $H_2$ production rate for LSCF was found to degrade significantly during redox cycling at 1000° C. due to at LSCF surface enrichment with Sr, LSCF particle agglomeration, and perovskite phase decomposition. Thus, the temperature increase from 800° C. to 1000° C. almost did not affect $H_2$ production rate of LSCF. $HfCl_4$ treatment was used to passivate oxygen vacancies at surface of LSCF particles and thereby stabilize LSCF surface during redox cycling. LSCF-Hf powder showed more than twice faster $H_2$ production rate compared to that of bare LSCF or $CeO_2$ even at 1000° C. At the same time $H_2$ production rate at lower temperatures was not affected by Hf. These results, for the first time, show how LSCF particle surface passivation can be used for significant improvement of stability of both the surface and the bulk of perovskite LSCF at redox conditions. This finding opens new routes for designing highly reactive and stable OC materials for high temperature catalytic applications.

Hydrogen is a promising emission-free energy carrier with high gravimetric energy density with the potential to replace fossil fuels in the future. See, Moriarty, P. & Honnery, D. Hydrogen's role in an uncertain energy future. *International Journal of Hydrogen Energy* 34, 31-39 (2009), which is incorporated by reference in its entirety. Over decades, the majority of industrial hydrogen production follows the natural gas reforming method, which, however, leads to intensive greenhouse gas emission. In an attempt to reduce the emission and improve the cycle efficiency, alternative methods for hydrogen production have been extensively explored, including thermo, electrolytic, and photolytic processes. See, Miller, J. E., McDaniel, A. H. & Allendorf, M. D. Considerations in the Design of Materials for Solar-Driven Fuel Production Using Metal-Oxide Thermochemical Cycles. *Advanced Energy Materials* 4, n/a-n/a (2014), Carmo, M., Fritz, D. L., Mergel, J. & Stolten, D. A comprehensive review on PEM water electrolysis. *International Journal of Hydrogen Energy* 38, 4901-4934 (2013), and Hisatomi, T., Kubota, J. & Domen, K. Recent advances in semiconductors for photocatalytic and photoelectrochemical water splitting. *Chemical Society Reviews* 43, 7520-7535 (2014), each of which is incorporated by reference in its entirety. Among these approaches, the thermochemical and chemical-looping water splitting processes have attracted significant attention as promising options which allow thermal/solar energy production directly to fuel. See, Siegel, N. P., Miller, J. E., Ermanoski, I., Diver, R. B. & Stechel, E. B. Factors Affecting the Efficiency of Solar Driven Metal Oxide Thermochemical Cycles. *Industrial & Engineering Chemistry Research* 52 (2013), and Steinfeld, A. Solar thermochemical production of hydrogen—a review. *Solar Energy* 78, 603-615 (2005), each of which is incorporated by reference in its entirety. In the thermochemical water splitting (TCWS), hydrogen is produced by dissociating water utilizing nonstoichiometric metal oxides at 800° C.-1000° C. The oxidized metal oxides are then re-generated at elevated temperatures (>1300° C.) where the process heat is provided by concentrated solar energy. See, Chueh, W. C. et al. High-flux solar-driven thermochemical dissociation of CO2 and H2O using nonstoichiometric ceria. *Science* 330, 1797-1801 (2010), which is incorporated by reference in its entirety. Major challenges are associated with the large temperature swing between the redox steps which may degrade the long-term stability. An alternative approach is the reactive chemical-looping water splitting (CLWS) where the metal oxides undergo isothermal redox conversions with the utilization of fuel (such as natural gas) in reduction. See, Otsuka, K., Wang, Y., Sunada, E. & Yamanaka, I. Direct Partial Oxidation of Methane to Synthesis Gas by Cerium Oxide. Journal of Catalysis 175, 152-160 (1998), which is incorporated by reference in its entirety. The usage of fuel enables a fast reduction at lower temperature (<900° C.) with enhanced oxygen carrying capacity. The temperature swing is thus replaced by an isothermal operation with reduced costs and improved long-term stability. See, Zhao, Z. Rotary bed reactor for chemical-looping combustion with carbon capture Master of Science thesis, Massachusetts Institute of Technology, (2012), Zhao, Z., Iloeje, C. O., Chen, T. & Ghoniem, A. F. Design of a rotary reactor for chemical-looping combustion. Part 1: Fundamentals and design methodology. Fuel (2014), and Iloeje, C., Zhao, Z. & Ghoniem, A. F. Efficient cycles for carbon capture CLC power plants based on thermally balanced redox reactors. International Journal of Greenhouse Gas Control 41, 302-315 (2015), each of which is incorporated by reference in its entirety. The selective oxidation by fuel in CLWS enables an efficient $H_2$ and syngas co-generation.

The performance of the TCWS or CLWS approach critically depends on the redox characteristics of the OC: the surface exchange rates, bulk diffusion, oxygen non-stoichiometric capacity, and the long-term stability. Ce- and Fe-based binary oxide systems are commonly considered as a state-of-art option for the water splitting. See, Chueh, W. C. et al. High-flux solar-driven thermochemical dissociation of CO2 and H2O using nonstoichiometric ceria. Science 330, 1797-1801 (2010), and Kodama, T. & Gokon, N. Thermochemical Cycles for High-Temperature Solar Hydrogen Production. Chemical Reviews 107, 4048-4077, doi:10.1021/cr050188a (2007), each of which is incorporated by reference in its entirety. Nevertheless, the major drawback is the limited reducibility at low temperatures due to low possible change in the oxygen non-stoichiometry, In comparison to binary oxides, perovskite oxides with the structural formula $ABO_3$ are promising alternatives which exhibit high reducibility at lower temperature. See, Carter, S. et al. Oxygen transport in selected nonstoichiometric perovskite-structure oxides. Solid State Ionics 53, 597-605 (1992), and Mizusaki, J., Mima, Y., Yamauchi, S., Fueki, K. & Tagawa, H. Nonstoichiometry of the perovskite-type oxides La1-xSrxCoO$_{3-\delta}$. Journal of Solid State Chemistry 80, 102-111 (1989), each of which is incorporated by reference in its entirety. A- and B-sites doping in perovskite is widely used for the promotion of the key kinetics and thermodynamic properties, i.e., the oxygen non-stoichiometry, electric conductivity, leading to broad usage in various applications, such as catalysts, memristors, batteries, and fuel cells. See, Chen, D., Chen, C., Baiyee, Z. M., Shao, Z. & Ciucci, F. Nonstoichiometric Oxides as Low-Cost and Highly-Efficient Oxygen Reduction/Evolution Catalysts for Low-Temperature Electrochemical Devices. Chemical Reviews 115, 9869-9921, doi:10.1021/acs.chemrev.5b00073 (2015), Messerschmitt, F., Kubicek, M., Schweiger, S. & Rupp, J. L. M. Memristors: Memristor Kinetics and Diffusion Characteristics for Mixed Anionic-Electronic SrTiO3−δ Bits: The Memristor-Based Cottrell Analysis Connecting Material to Device Performance (Adv. Funct. Mater. 47/2014). Advanced Functional Materials 24, 7447-7447, doi:10.1002/adfm.201470305 (2014), Waser, R. & Aono, M. Nanoionics-based resistive switching memories. Nat Mater 6, 833-840 (2007), Steele, B. C. H. & Heinzel, A. Materials for fuel-cell technologies. Nature 414, 345-352 (2001), and Chroneos, A., Yildiz, B., Tarancon, A., Parfitt, D. & Kilner, J. A. Oxygen diffusion in solid oxide fuel cell cathode and electrolyte materials: mechanistic insights from atomistic simulations. Energy & Environmental Science 4, 2774-2789, doi:10.1039/c0ee00717j (2011), each of which is incorporated by reference in its entirety. Recently several perovskite OC systems, including (Sr,La)(Mn,Al)O$_3$, (La,Sr)(Co,Cr)O$_3$, (La,Sr)TiO$_3$, and (La,Sr)FeO$_3$ were examined for the water splitting processes. These studies have demonstrated the benefits of using perovskite in the TCWS process with significantly higher reactivity at the temperature below 1000° C. compared to $CeO_2$. See, McDaniel, A. H. et al. Sr- and Mn-doped LaAlO3−δ for solar thermochemical $H_2$ and CO production. Energy & Environmental Science 6, 2424-2428, doi:10.1039/c3ee41372a (2013), Bork, A. H., Kubicek, M., Struzik, M. & Rupp, J. L. M. Perovskite La0.6Sr0.4Cr1-xCoxO3−δ solid solutions for solar-thermochemical fuel production: strategies to lower the operation temperature. Journal of Materials Chemistry A 3, 15546-15557, doi:10.1039/c5ta02519b (2015), Thalinger, R. et al. Water-Gas Shift and Methane Reactivity on Reducible Perovskite-Type Oxides. The Journal of Physical Chemistry C 119, 11739-11753, doi:10.1021/acs.jpcc.5b02947 (2015), each of which is incorporated by reference in its entirety.

$(La_{0.6}Sr_{0.4})_{0.95}Co_{0.2}Fe_{0.8}O_3$ (LSCF) is another perovskite oxide well known for its fast oxygen exchange and diffusion kinetics and large oxygen non-stoichiometry far exceeding $CeO_2$ at temperatures of 1000° C. and below. See, Carter, S. et al. Oxygen transport in selected nonstoichiometric perovskite-structure oxides. Solid State Ionics 53, 597-605, doi:http://dx.doi.org/10.1016/0167-2738(92)90435-R (1992), Tuller, H. L. & Nowick, A. S. Defect Structure and Electrical Properties of Nonstoichiometric CeO2 Single Crystals. Journal of The Electrochemical Society 126, 209-217, doi:10.1149/1.2129007 (1979), and Kuhn, M. et al. Oxygen Nonstoichiometry and Thermo-Chemical Stability of Perovskite-Type La0.6Sr0.4Co1-yFeyO3−δ (y=0, 0.2, 0.4, 0.5, 0.6, 0.8, 1) Materials. Journal of The Electrochemical Society 160, F34-F42, doi:10.1149/2.050301jes (2013), each of which is incorporated by reference in its entirety.

However, as shown above, even highly reactive perovskites such as LSCF, $(La,Sr)CoO_3$ or $(Ba,Sr)(Co,Fe)O_3$ offer fast oxygen exchange and diffusion kinetics but there is a problem of perovskite oxide instability at temperatures of 400° C. and above. At these temperatures the A-site dopant cations tend to segregate at perovskite surface blocking the surface catalytic activity. Thus, perovskite instability at elevated temperatures and at low oxygen partial pressures remain one of the major challenges that constrain the application of LSCF and other highly reactive perovskite oxides for water splitting.

The electrostatic attraction of negatively charged dopants, such as Sr, to the surface that is enriched with positively charged oxygen vacancies was recognized as an important driving force for Sr segregation on perovskite oxides. See, Lee, W., Han, J. W., Chen, Y., Cai, Z. & Yildiz, B. Cation Size Mismatch and Charge Interactions Drive Dopant Segregation at the Surfaces of Manganite Perovskites. Journal of the American Chemical Society 135, 7909-7925, doi: 10.1021/ja3125349 (2013), which is incorporated by reference in its entirety. Consequently, the perovskite oxide surface stability can be tuned as a function of the reducibility of the surface. Previous Examples show $La_{0.8}Sr_{0.2}CoO_3$ (LSC) as a model system, systematically modified surface by adding more oxidizable cations, e.g., Hf that has higher enthalpy of oxygen vacancy formation compared to that of LSC. See, Mizusaki, J., Mima, Y., Yamauchi, S., Fueki, K. & Tagawa, H. Nonstoichiometry of the perovskite-type oxides La1-xSrxCoO3–δ. Journal of Solid State Chemistry 80, 102-111, doi:http://dx.doi.org/10.1016/0022-4596(89) 90036-4 (1989), and Zheng, J. X., Ceder, G., Maxisch, T., Chim, W. K. & Choi, W. K. First-principles study of native point defects in hafnia and zirconia. Physical Review B 75, 104112 (2007), each of which is incorporated by reference in its entirety. It was found that the addition of the more oxidizable cations and related passivation of the oxygen vacancies at perovskite surface greatly improves the surface chemical stability and oxygen exchange kinetics on LSC (see Example I).

This example uses LSCF and Hf-passivated LSCF (LSCF-Hf) powders as OC for CLWS. The non-stoichiometry and $H_2$ production of $CeO_2$, LSCF, and LSCF-Hf materials were compared. LSCF and LSCF-Hf has higher oxygen non-stoichiometry compared to that in $CeO_2$ at temperatures below 1000° C. The high redox reactivity of LSCF-based materials enables a remarkable decrease in the $H_2$ production temperature towards 500° C. The structural and chemical stability of LSCF are also investigated and the effect of Sr segregation on the catalytic activity over time is also examined in depth. At the temperature above 700° C., LSCF becomes instable in reducing condition, leading to the phase decomposition to $(La,Sr)_2(Co,Fe)O_4$ Ruddlesden-Popper (RP) phase and Co and Fe oxides. The phase transition is accompanied by the observed decrease of $H_2$ production rate. It is found that this degradation can be suppressed by Hf deposition, which not only mitigates the LSCF surface contamination with Sr (as demonstrated in the previous Examples), but constrains the bulk transformation of LSCF (such as particle agglomeration, and phase decomposition). The $H_2$ production rate using LSCF-Hf is found to be over twice that of $CeO_2$ or cycled LSCF. The results obtained in this study demonstrate that that the passivation of the surface is a useful approach to improve the surface and the bulk stability of perovskite oxides, making them suitable for redox cycling at the water splitting processes.

Figure 30B:
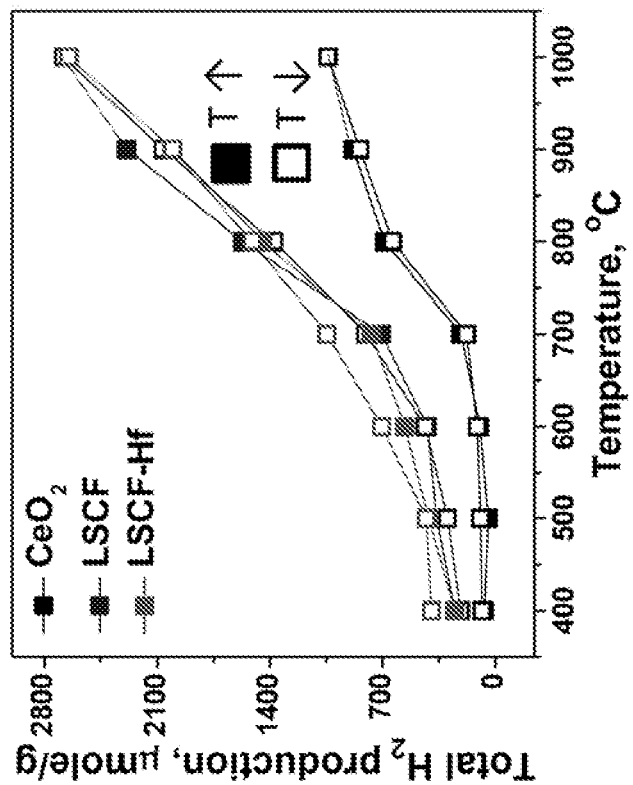
FIG. 30B shows total $H_2$ production.
Figure 30A:
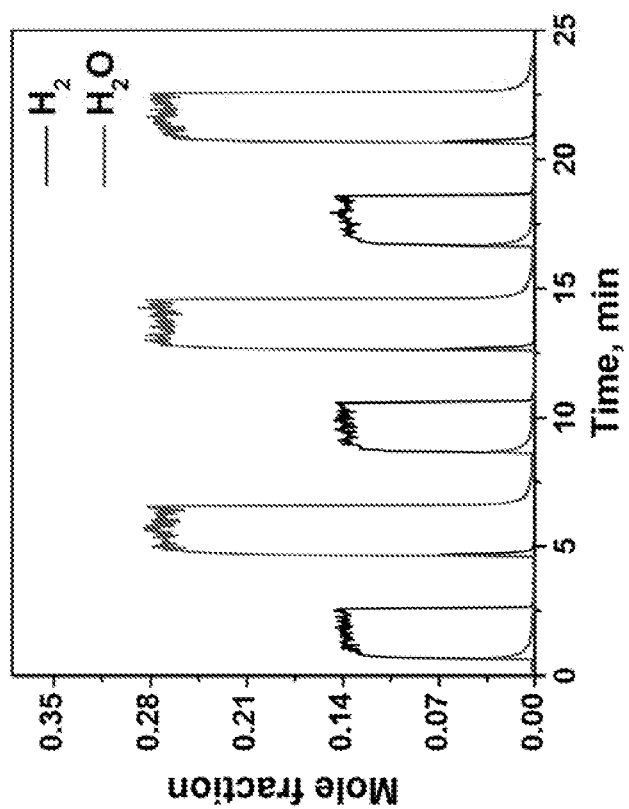
FIG. 30A shows example of MS reading during redox cycling.
Figure 30C:
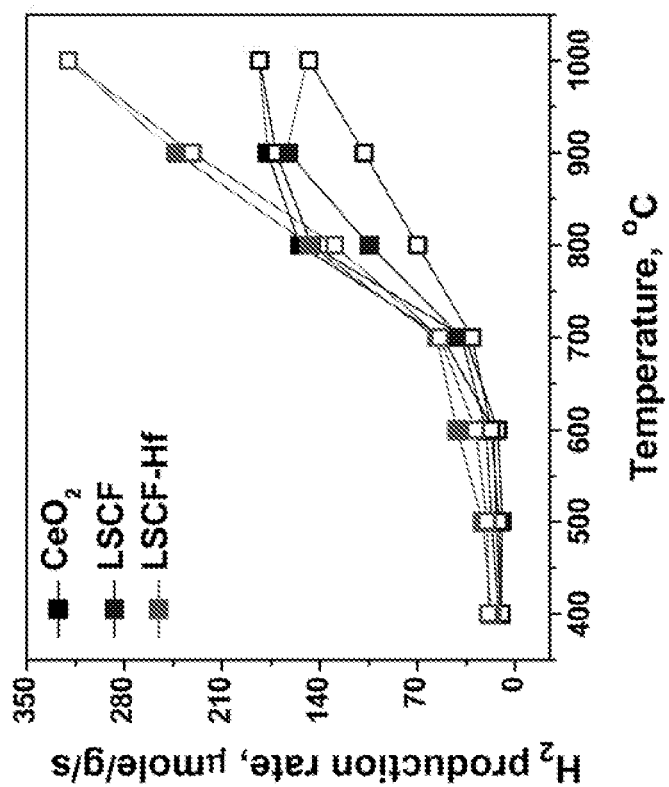
FIG. 30C shows calculated change on oxygen non-stoichiometry change and FIG. 30D shows peak $H_2$ production rate during oxidation cycle at different temperatures.
Figure 30D:
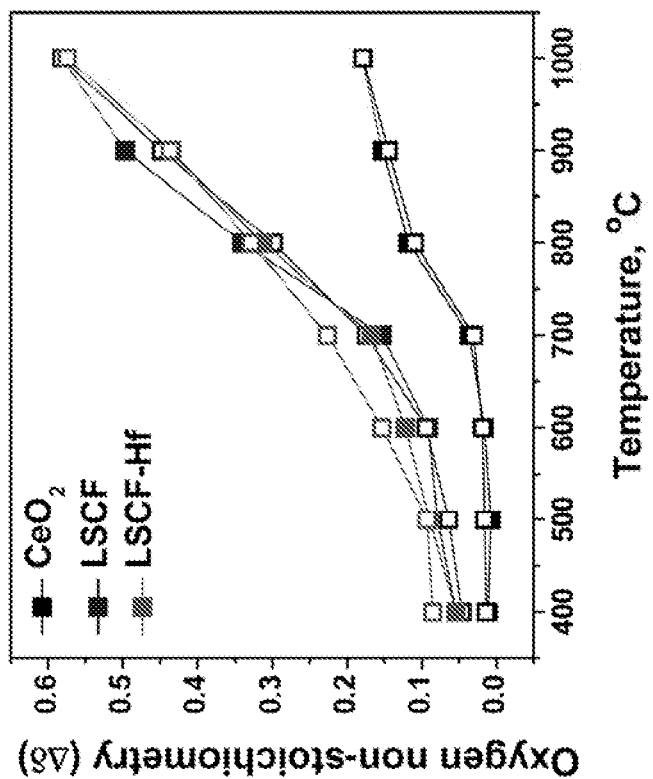

The $H_2$ production kinetics as well as the total $H_2$ capacity among $CeO_2$, LSCF, and LSCF-Hf powders as OC were compared in the CLWS process. The $H_2$ production is measured with the temperature in the range 400° C.-1000° C. A two-step experiment sequence is followed: (1) the fresh sample is measured starting at 400° C. to 1000° C. with a step of 100° C., (2) after reaching 1000° C., the sample is then cooled down to 400° C. while repeating measurements every 100° C. FIG. 30A shows the profiles of $H_2$ and $H_2O$ for ceria at 1000° C. $H_2$ spikes with the feed of $H_2O$ in oxidation, while $H_2O$ is produced with the introduction of $H_2$ during reduction. The $H_2$ production rate is characterized by the peak rate observed throughout the oxidation cycle (FIG. 30D). In FIGS. 30A-30D, the filled symbols reflect the $H_2$ production/rates during heating up sequence when fresh powder was heated up to 1000° C., open symbols shows the production/rates for cooling down sequence when the powders are already subjected to 100-200 redox cycles at 1000° C. The total $H_2$ production (FIG. 30B) is then used to calculate the oxygen non-stoichiometry capacity achieved between the redox cycle (FIG. 30C). A similar value for $H_2$ production using ceria, 250-350 μmole $g^{-1}$, was reported previously for $CeO_2$ as OC at temperature range of 700-800° C. See, Zhu, X., Wang, H., Wei, Y., Li, K. & Cheng, X. Hydrogen and syngas production from two-step steam reforming of methane using $CeO_2$ as oxygen carrier. Journal of Natural Gas Chemistry 20, 281-286 (2011), which is incorporated by reference in its entirety.

The $H_2$ production with LSCF is found to be twice that with $CeO_2$ (FIG. 30B), corresponding to the larger non-stoichiometry capacity (Δδ) in LSCF. See, Tuller, H. L. & Nowick, A. S. Defect Structure and Electrical Properties of Nonstoichiometric $CeO_2$ Single Crystals. Journal of The Electrochemical Society 126, 209-217, doi:10.1149/1.2129007 (1979), and Kuhn, M. et al. Oxygen Nonstoichiometry and Thermo-Chemical Stability of Perovskite-Type La0.6Sr0.4Co1-yFeyO3–δ (y=0, 0.2, 0.4, 0.5, 0.6, 0.8, 1) Materials. Journal of The Electrochemical Society 160, F34-F42, doi:10.1149/2.050301jes (2013), each of which is incorporated by reference in its entirety. The obtained Δδ exceeds the maximum capacity of LSCF before perovskite phase decomposition, which can place at the very low oxygen partial pressure ($pO_2$) during reduction cycle. The bulk-phase non-stoichiometric equilibrium for $CeO_2$ can be used to extract the effective $pO_2$ in the reaction chamber during the reduction cycle, and the obtained value is about $10^{-19}$ atm, which is below the stability limit of LSCF at 1000° C. Thus, the large non-stoichiometric change results from the decomposition, during reduction cycle, and re-synthesis, during oxidation cycle, of LSCF, which creates additional oxygen storing capacity. These transformations, however, are mostly reversible as repeatable $H_2$ production profiles are observed over 50 cycles at all temperatures. Although degradation of kinetics is observed during the initial several cycles, likely resulting from the thermal or chemical sintering of powder. The stabilized redox kinetics are compared in FIGS. 30A-30D. LSCF exhibits significant $H_2$ production at temperature lower than 500° C., in comparison to ceria where a threshold temperature of 750° C. is required for a sufficient $H_2$ production By comparing the $H_2$ production rate (FIG. 30D) during heat up and cooling down stages, it is evident that irreversible degradations take place after subjecting LSCF to redox cycling at 1000° C. (FIGS. 30B and 30D). The $H_2$ production rate using LSCF at 1000° C. is smaller than that at 900° C. (FIG. 30D), lower than that of $CeO_2$. This is mostly related to the degradation of LSCF surface, the sintering and the agglomeration of the LSCF particles, and the perovskite phase decomposition, as will be shown below. In comparison, the LSCF-Hf sample remains more stable with no obvious trace of degradation in the reactivity. The $H_2$ production rate is double that of $CeO_2$ or LSCF at 1000° C.

Figure 31A:
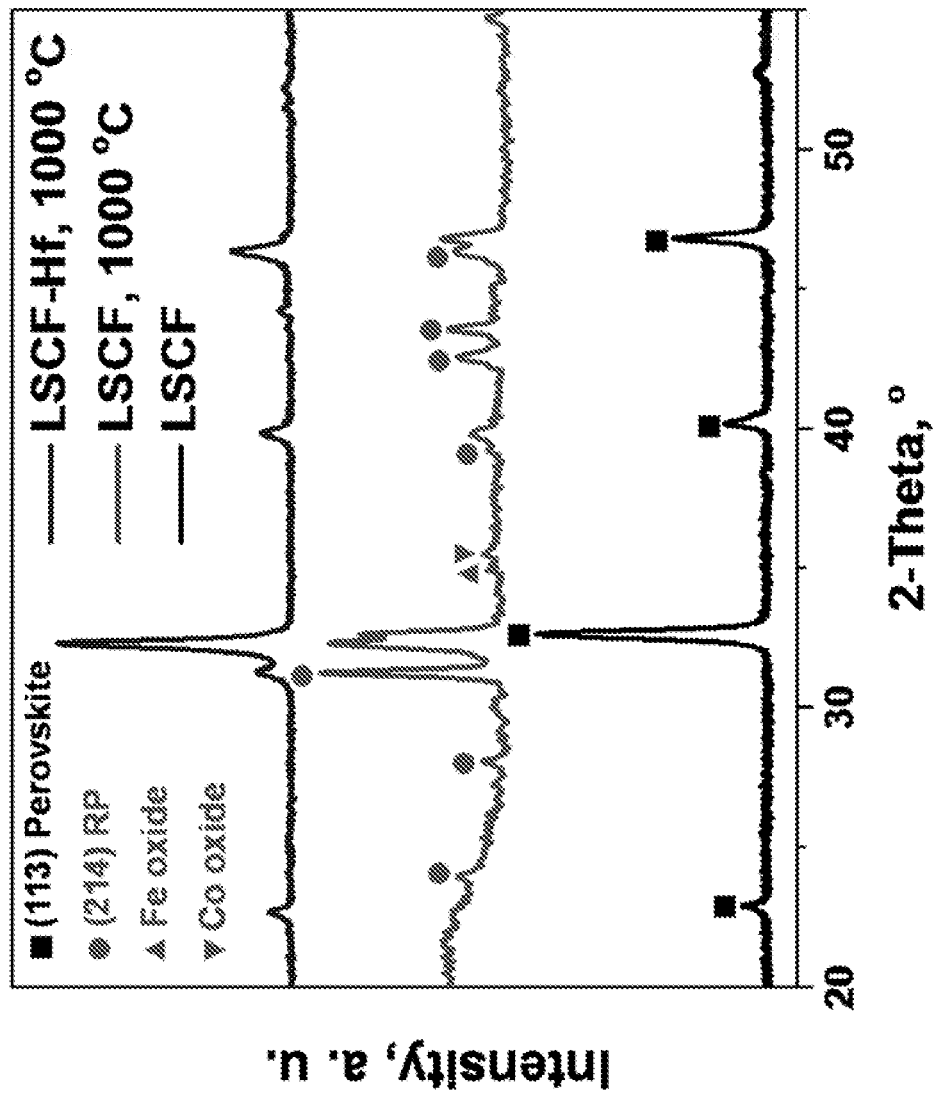
FIG. 31A-31E show XRD patterns of as-received LSCF (LSCF-Hf) powders and powder subjected to redox cycling at up to 1000° C. Dark field TEM images of LSCF (FIG. 31B) and LSCF-Hf (FIG. 31C) particles used for $H_2$ production at up to 1000° C. and corresponding element ratio line profiles (FIGS. 31D-31E).

To evaluate the change in crystal structure of LSCF during redox cycling, the X-ray diffraction (XRD) patterns of the fresh and aged powders were compared, as shown in FIG. 31A. Due to low intensity of Sr EDS signal, Sr profile is not included. It is worth noting that only perovskite LSCF peaks, without any traces of Hf-related phases, are observed in the pattern of fresh LSCF and LSCF-Hf samples. After redox cycling at 1000° C., additional peaks appear (FIG. 31A), which stand for $(La,Sr)_2(Co,Fe)O_4$, RP phase, and Co/Fe oxides. The intensity of RP phase peak of the aged LSCF is higher than that of the parent perovskite phase, indicating a significant phase transformation in this sample. The perovskite peaks in LSCF split into two, likely resulting from appearance of additional perovskite phase with the different Sr dopant content or oxygen non-stoichiometry. In contrast, the LSCF-Hf sample remains mostly stable during the entire redox cycling with only minor peaks formed corresponding to RP phase (FIG. 31A).

Figure 31B:
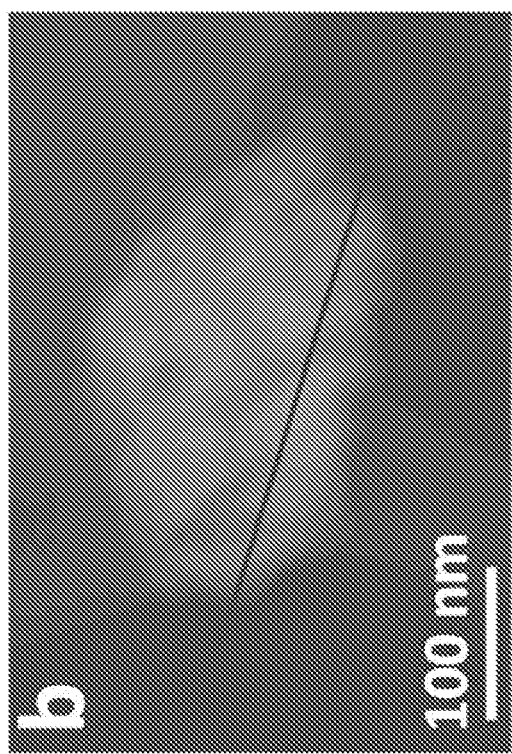
Figure 31C:
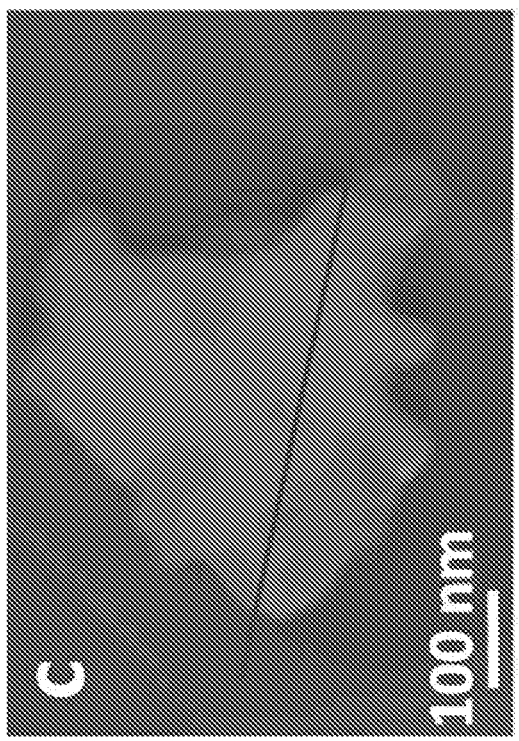
Figure 31E:
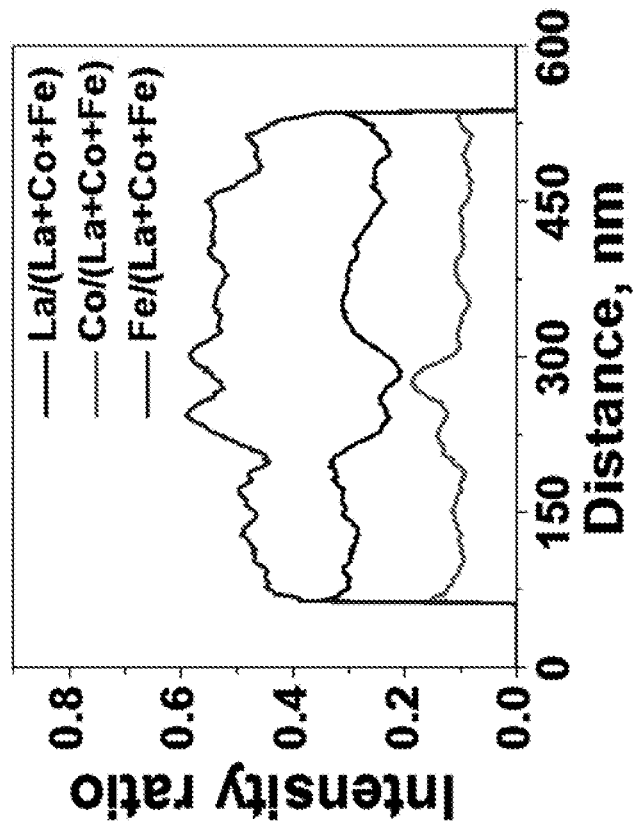
Figure 31D:
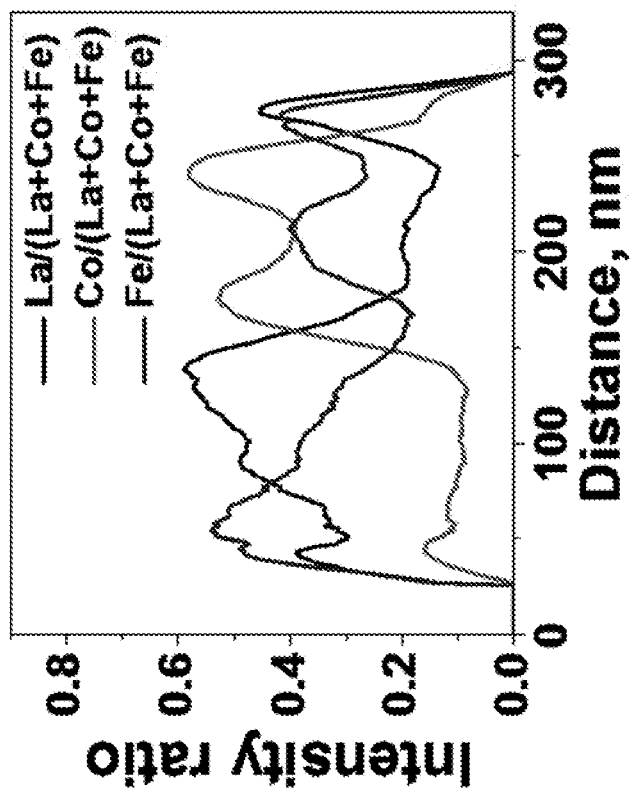

The XRD measurements are further confirmed by Energy Dispersive X-ray Spectroscopy (EDS) measurements using Scanning Transmission Electron Microscopy (STEM) (FIGS. 31B-31D). FIGS. 31B and 31C show the dark filed STEM images of LSCF and LSCF-Hf particles after redox cycling at 1000° C. and FIGS. 31D and 31E show the corresponding line profiles across it. For LSCF, the large variations of chemical composition across the particle can be observed, indicating the segregation of particular elements, being in good accordance with the formation of secondary phases, such as Co or Fe oxides, observed by XRD. The uniform elemental profile for LSCF-Hf indicates a good inter-mixing of the chemical elements similarly as in the single phase LSCF perovskite. The observations here demonstrate that the crystal structure of LSCF-Hf remains more stable during redox testing as compared to LSCF.

The evolutions of the LSCF surface morphology and chemical composition were examined since these can provide important insights on the oxygen exchange processes of the perovskite. Before redox testing LSCF and LSCF-Hf samples show the similar morphology (FIGS. 32A and 32B) without any visible traces of Hf-related phases as it was detected within the SEM instrument with resolution of 0.9 nm. Both LSCF and LSCF-Hf also have similar surface areas of around 12-14 $m^2/g$. Example I proposed that such kind of additive cations deposited on perovskite thin films stays in the form of thin wetting layer of amorphous additive metal oxide.

Figure 32B:
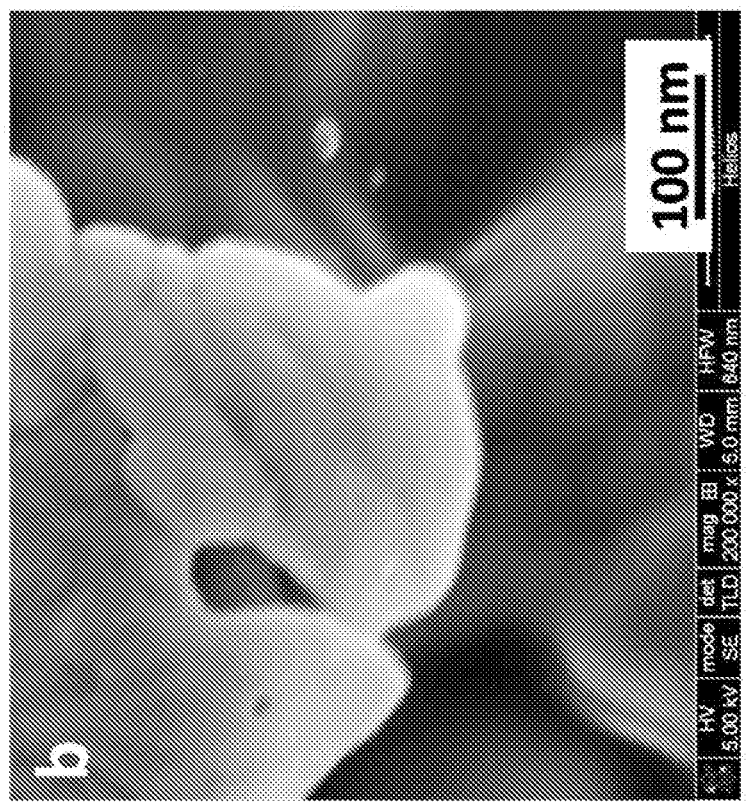
Figure 32A:
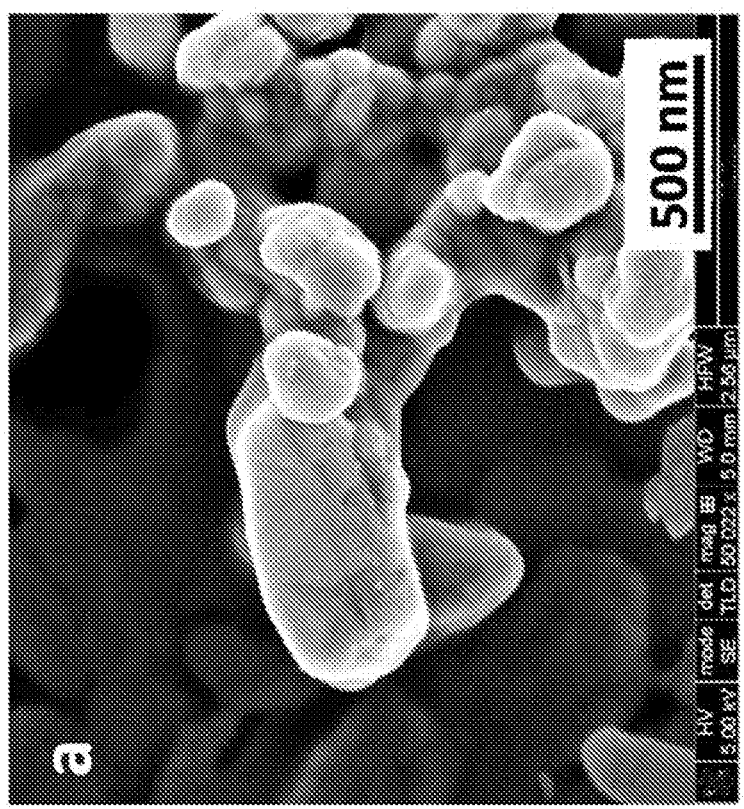

After testing at 1000° C., the LSCF particles was found to form large agglomerates with sizes of several microns (FIG. 32C) leading to significant decrease in the surface area down to 2 $m^2/g$. The LSCF-Hf powders tested at the same conditions remain less agglomerated (FIG. 32D) and LSCF-Hf tested at 1000° C. powders were investigated in detail with electron microscopy, and segregated particles with the size of 20-50 nm on their surfaces were detected (FIGS. 32C and 32D). In FIGS. 32A-32D, points indicate areas where chemical composition was probed using AES. Cation ratios determined using AES are summarized in Table 3. Such kind of small particles was not observed in fresh LSCF or LSCF-Hf samples (FIGS. 30A and 30B) pointing out that they are probably secondary phase formed during LSCF degradation during redox testing at 1000° C. as it was observed by XRD (FIG. 31A). To further investigate this possibility, a spatial resolution chemical composition analysis was performed using AES (Table 3) for the tested LSCF and LSCF-Hf powders. High Sr content along with lowered Co/Fe concentration is found within large parent particles, while low Sr (and hence high Fe and Co) content is observed within segregated particles (FIG. 32B, point 1). This indicates that these segregated particles can be related to the perovskite or the cobalt oxide phases, detected by XRD (FIG. 31A), embedded to the Sr-rich (probably RP-phase) matrix and located at the sub-surface. Indeed, in the other reports, Co oxide was detected in the sub-surface of LSC aged at 800° C. in air. See, Dieterle, L. et al. Microstructure of Nanoscaled La0.6Sr0.4CoO3–δ Cathodes for Intermediate-Temperature Solid Oxide Fuel Cells. Advanced Energy Materials 1, 249-258, which is incorporated by reference in its entirety.

In comparison to the aged LSCF, the aged parent LSCF-Hf particles show a smaller value of Sr, closer to stoichiometry, as well as a larger amount of Co or Fe on the surface of parent particles. The small segregated particles (FIG. 32D, point 1), with the size of a few tens of nm, can be also observed on the main particle surface, similarly as in LSCF. However, it should be noted that the density of segregated particles on LSCF-Hf is observed to be lower compared to LSCF. The chemical analysis of the composition of particles segregated on LSCF-Hf shows that they are more Sr-rich compared to the parent particle (Table 3), in contrast to the observation with LSCF. In case of LSCF-Hf the segregated particles are believed to be Sr-rich phase, similar to that observed at the LSC surface subjected to aging at 400-800° C. See, Cai, Z., Kubicek, M., Fleig, J. & Yildiz, B. Chemical Heterogeneities on La0.6Sr0.4CoO3–δ Thin Films—Correlations to Cathode Surface Activity and Stability. Chemistry of Materials 24, 1116-1127 (2012), Kubicek, M., Limbeck, A., Frömling, T., Hutter, H. & Fleig, J. Relationship between Cation Segregation and the Electrochemical Oxygen Reduction Kinetics of La0.6Sr0.4CoO3–δ Thin Film Electrodes. J. Electrochem. Soc. 158, B727-B734, Tsvetkov, N., Lu, Q. & Yildiz, B. Improved electrochemical stability at the surface of La0.8Sr0.2CoO$_3$ achieved by surface chemical modification. Faraday Discussions (2015), and Chen, Y. et al. Impact of Sr segregation on the electronic structure and oxygen reduction activity of SrTi1-xFexO3 surfaces. Energy Environ. Sci. 5, 7979-7988 (2012), each of which is incorporated by reference in its entirety.

X-ray Photoelectron Spectroscopy (XPS) technique which provides averaged chemical composition information from the beam spot (200 μm×200 μm) was used to evaluate evolution of surface chemistry at LSCF and LSCF-Hf surface during redox testing. XPS analysis confirms that the aged LSCF is richer in Sr with lower B-site concentration as compared to LSCF-Hf. This result supports the observed slower oxygen exchange rate on the LSCF where transition metal content on the surface is lower in comparison to LSCF-Hf. Indeed, the previous work has shown that Sr-rich phase on the surface of perovskite oxides is an insulating phase which blocks the surface for oxygen exchange reaction. See, Chen, Y. et al. Segregated Chemistry and Structure on (001) and (100) Surfaces of (La1-xSrx)2CoO4 Override the Crystal Anisotropy in Oxygen Exchange Kinetics. Chemistry of Materials 27, 5436-5450, doi:10.1021/acs.chemmater.5b02292 (2015), which is incorporated by reference in its entirety. In addition, the B-site cations exposed to the surface are the major active sites for the oxygen exchange reaction. See, Druce, J. et al. Surface termination and subsurface restructuring of perovskite-based solid oxide electrode materials. Energy & Environmental Science 7, 3593-3599 (2014), which is incorporated by reference in its entirety. The observed discrepancy in the B/A ratio obtained by means of AES and XPS can be explained from the difference in relative sensitivity factors of both techniques. From the experience with the instruments used, the values obtained with XPS are generally closer to expected chemical compositions. See, Ma, W. et al. Vertically aligned nanocomposite La0.8Sr0.2CoO3/(La0.5Sr0.5)2CoO4 cathodes-electronic structure, surface chemistry and oxygen reduction kinetics. Journal of Materials Chemistry A 3, 207-219 (2015), which is incorporated by reference in its entirety.

TABLE 3

Chemical composition of LSCF and LSCF-Hf subjected to redox cycling at up to 1000° C. obtained using AES from points at small segregated particles (1) and non-segregated area of parent particle (2) in FIGS. 32C and 32D. The AES analysis was performed in more than ten areas of LSCF and LSCF-Hf samples and averaged results are given in Table 3.

| Sample | Sr/(Co + La) | (Co + Fe)/(Sr + La) |
|---|---|---|
| LSCF, 1000° C. Segregated | 0.73 ± 0.06 | 0.15 ± 0.02 |
| LSCF, 1000° C. Parent particle | 0.90 ± 0.07 | 0.06 ± 0.02 |

TABLE 3-continued

Chemical composition of LSCF and LSCF-Hf subjected to redox cycling at up to 1000° C. obtained using AES from points at small segregated particles (1) and non-segregated area of parent particle (2) in FIGS. 32C and 32D. The AES analysis was performed in more than ten areas of LSCF and LSCF-Hf samples and averaged results are given in Table 3.

| Sample | Sr/(Co + La) | (Co + Fe)/(Sr + La) |
|---|---|---|
| LSCF-Hf, 1000° C. Segregated | 0.59 ± 0.05 | 0.18 ± 0.04 |
| LSCF-Hf, 1000° C. Parent particle | 0.44 ± 0.05 | 0.25 ± 0.04 |

TABLE 4

Chemical composition of LSCF and LSCF-Hf subjected to redox cycling at up to 1000° C. obtained using XPS. 10% error is associated with general uncertainty of XPS measurements.

| Sample | Sr/(Co + La) | (Co + Fe)/(Sr + La) |
|---|---|---|
| LSCF | 0.36 ± 0.04 | 0.80 ± 0.08 |
| LSCF, 1000° C. | 0.66 ± 0.07 | 0.33 ± 0.03 |
| LSCF-Hf, 1000° C. | 0.57 ± 0.06 | 0.50 ± 0.05 |

In summary, the $H_2$ production rate with the $CeO_2$ and LSCF oxygen carrier materials were compared for chemical looping water splitting. The samples were alternatively exposed to oxidation atmosphere to produce $H_2$ and to reducing atmosphere to remove the lattice oxygen. LSCF can be promising material which can produce more than 3 times higher amount of $H_2$ compared to that of the state-of-art material, $CeO_2$. Moreover, LSCF shows much higher hydrogen production rate than shown by ceria especially at the temperatures below 700° C. However, at temperature around 800° C.-1000° C. the LSCF performance deteriorates due to accumulation of Sr at the perovskite surface and also due to perovskite phase decomposition. It is possible to hinder LSCF degradation by LSCF powder treatment with $HfCl_4$ which results in Hf deposition at LSCF surface and improves the perovskite surface and bulk surface stability. The results show that Hf oxide coating not only helps to stabilize the surface chemistry preventing enrichment of surface with Sr, but also helps to prevent the agglomeration of LSCF particles and perovskite phase decomposition as it was confirmed by XRD and STEM measurements. The results obtained show that LSCF is promising material for thermochemical water splitting, however its application can be limited due to perovskite phase instability which in turn can be overcome by the coating of LSCF particles with low reducible binary oxides such as Hf. The results demonstrate that surface passivation can be effective approach in designing novel stable and reactive materials for practical high temperature electrochemical applications.

Experimental Section

Ceria powder purchased from Sigma Aldrich (99.99% purity) is used for the redox study. The BET surface area is 15.4 m²/g and the average size of the particle is 50 nm. The A-site deficient LSCF powder is obtained from Fuel Cell Materials. The Hf deposition was performed by treatment of the 1 g of LSCF powder in the 40 ml of 0.1 mM aqueous solution of $HfCl_4$ at 70° C. while stirring until water evaporates. The obtained powder was grinded and additionally dried at 150° C. for 20 min. XPS measurements show that the Hf/(La+Sr+Co+Fe+Hf) cation ratio is around 0.2.

The redox kinetics is measured in a button-cell fixed-bed reactor, which consists of a gas delivery system, a control unit, a central quartz reactor tube, and a real time flue gas analysis system using an on-line mass-spectrometer. The central quartz tube is positioned inside a split tube furnace that provides an isothermal environment up to 1100° C. During the kinetics study, the sample undergoes redox cycles with argon as purging gas flowing in between. For CLWS, the oxidation is performed using a gas mixture of water vapor and argon. Ar is slowly bubbled through a 1-gallon bottle filled with de-ionized water maintained at 80° C. (±0.5° C.) in an insulated heat bath to prepare the oxidizing mixture. The steam mixture is further diluted with Ar to achieve the desirable $H_2O$ concentration. The total flow rate into the reactor is maintained constant at 337 sccm, and the $H_2O$ is 26%. $H_2$ is used as the reducing gas instead of $CH_4$ to rule out coke formation and its subsequent contribution towards $H_2$ generation through steam-carbon reaction. The total flow is maintained constant at 350 sccm with the $H_2$ concentration of 14%. All the connecting stainless steel tubes are heated to above 140° C. to avoid water condensation The oxidation and reduction times are fixed at 2 min each for the base case.

The morphology or LSCF powders is characterized with SEM using a Helios Nanolab 600 Dual Beam System. The crystal structure of the samples is examined using a Rigaku Smartlab Multipurpose Diffractometer with Cu $K\alpha_1$ radiation. STEM measurements are carried out with JEOL 2010 FEG microscope. XPS measurements are performed to estimate the surface cation composition using Perkin-Elmer PHI-5500 ESCA Spectrometer with monochromated Al $K\alpha$ (1486.65 eV) X-ray radiation under a base pressure of $10^{-9}$ Torr. The cation compositions on the samples are quantified based on the La 3d, Co 3p, Fe 3p, Sr 3d, and Hf 4p3 peaks using Multipack software. The spectra were taken at a photoelectron emission angle of 45°. The BET surface area is measured using a surface area and porosity analyzer (ASAP 2020 from Micrometritics).

A Physical Electronics Model 700 scanning nanoprobe AES instrument is used to detect lateral heterogeneities in cation compositions with high spatial resolution. Electron beam settings of 20 keV and 10 nA are used for both SEM imaging and the Auger electron excitation. The La MNN, Sr LMM, and Co LMM Auger emissions are measured for quantifying the surface cation composition of the LSC films. The smoothing and differentiation of the AES spectra collected are carried out using the Savitsky-Golay algorithm. Quantification of the AES differential spectra is performed using peak-to-peak intensities of the tight-scans of the noted emissions from the constituent cations. The standard sensitivity factors (Physical Electronics Inc., 2006) were used for the chemical quantification with AES. The actual sensitivity factors for these emissions in the LSCF powders may vary from the provided standards. Thus, the qualitative trends, instead of the absolute values of the surface chemical content, should be taken into account in analyzing the AES results.

Other embodiments are within the scope of the following claims.

What is claimed is:
1. A composition comprising:
a base layer including a material of formula (I), (II) or (III), wherein the formula (I), (II) and (III) are:

  (I)

  (II)

  (III)

wherein each of A and A', independently, is a rare earth metal or an alkaline earth metal, x is in the range of 0 to 1, each of B and B', independently, is a transition metal, y is in the range of 0 to 1, δ is in the range of 0 to 1, and n is a number of layers; and a surface layer including a metal, a metal cation or an oxide of one or more metal elements, or a combination thereof, wherein the cation and the oxide of one or more metal element are more oxidizable, or more difficult to reduce, than the material of the formula (I, II, or III), wherein the material includes a perovskite oxide, brownmillerite or a Ruddlesden Popper and a deposited element that is dissolved into the base layer lattice at or near the surface.

2. The composition of claim 1, wherein the rare earth metal includes Sc, Y, La, Ce, Pr, Nd, Pm, Sm, Eu, Gd, Tb, Dy, Ho, Er, Tm, Yb or Lu.

3. The composition of claim 1, wherein the alkaline earth metal includes Be, Mg, Ca, Sr, Ba or Ra.

4. The composition of claim 1, wherein the metal element includes Sc, Ti, V, Cr, Mn, Fe, Co, Ni, Cu, Zn, Y, Zr, Nb, Mo, Tc, Ru, Rh, Cd, Hf, Ta, W, Re, Os, Ir, Hg, Ce, or La, or any combinations thereof.

5. The composition of claim 1, wherein the metal element includes Ti, Hf, Zr, Nb, Cr, Mn, Fe, Al, Mg, Ce, or La or any combinations thereof.

6. The composition of claim 1, wherein the oxide of a metal element includes a binary oxide of the metal element.

7. The composition of claim 1, wherein the oxide of a metal element includes $TiO_2$, $HfO_2$, $ZrO_2$, $Nb_2O_5$, $Cr_2O_3$, $MnO_2$, $FeO$, $Fe_2O_3$, $Al_2O_3$, $MgO$, or any combinations of thereof.

8. The composition of claim 1, wherein the composition has the formula $La_{0.8}Sr_{0.2}CoO_3$.

9. The composition of claim 1, wherein the metal element is Ti or Hf.

10. The composition of claim 1, wherein the oxide of a metal element is $TiO_2$ or $HfO_2$.

11. A solar cell including the composition of claim 1.

12. An electrode including the composition of claim 1.

13. A catalyst or an electrocatalyst including the composition of claim 1.

14. An oxygen permeation membrane including the composition of claim 1.

15. An electrical device comprising a resistive, memristive or magnetic structure including the composition of claim 1.

16. A composition comprising:
a layer including a material of formula (I)), (II) or (III), wherein the formula (I), (II) and (III) are:

$$A_xA'_{1-x}B_yB'_{1-y}O_{3\pm\delta} \quad (I)$$

$$(A_xA'_{1-x})_2(B_yB'_{1-y})_2O_5 \quad (II)$$

$$(A_xA'_{1-x})_{n+1}(B_yB'_{1-y})_nO_{3n+1} \quad (III)$$

wherein each of A and A', independently, is a rare earth metal or an alkaline earth metal, x is in the range of 0 to 1, each of B and B', independently, is a transition metal, y is in the range of 0 to 1, δ is in the range of 0 to 1, and n is a number of layers;

wherein a surface of the layer includes a metal, a metal cation or an oxide of one or more metal elements, or a combination thereof, wherein the material includes a perovskite or a brownmillerite or a Ruddlesden Popper, wherein the material further includes a deposited element that is dissolved into the layer lattice at or near the surface.

17. The composition of claim 16, wherein the rare earth metal includes Sc, Y, La, Ce, Pr, Nd, Pm, Sm, Eu, Gd, Tb, Dy, Ho, Er, Tm, Yb or Lu.

18. The composition of claim 16, wherein the alkaline earth metal includes Be, Mg, Ca, Sr, Ba or Ra.

19. The composition of claim 16, wherein the metal element includes Sc, Ti, V, Cr, Mn, Fe, Co, Ni, Cu, Zn, Y, Zr, Nb, Mo, Tc, Ru, Rh, Pd, Ag, Cd, Hf, Ta, W, Re, Os, Ir, Hg, Ce, La, or any combinations thereof.

20. The composition of claim 16, wherein the metal element includes Ti, Hf, Zr, Nb, Cr, Mn, Fe, Al, Mg, or any combinations thereof.

21. The composition of claim 16, wherein the oxide of a metal element includes a binary oxide of the metal element.

22. The composition of claim 16, wherein the oxide of a metal element includes $TiO_2$, $HfO_2$, $ZrO_2$, $Nb_2O_5$, $Cr_2O_3$, $MnO_2$, $FeO$, $Fe_2O_3$, $Al_2O_3$, $MgO$, or any combinations thereof.

23. The composition of claim 16, wherein the composition has the formula $La_{0.8}Sr_{0.2}CoO_3$.

24. The composition of claim 16, wherein the metal element is Ti or Hf.

25. The composition of claim 16, wherein the oxide of a metal element is $TiO_2$ or $HfO_2$.

* * * * *